United States Patent
Song et al.

(10) Patent No.: US 10,824,840 B2
(45) Date of Patent: Nov. 3, 2020

(54) ELECTRONIC DEVICE SUPPORTING FINGERPRINT VERIFICATION AND METHOD FOR OPERATING THE SAME

(71) Applicant: Samsung Electronics Co., Ltd., Gyeonggi-do (KR)

(72) Inventors: Kyung Hoon Song, Gyeonggi-do (KR); Kwang Sub Lee, Gyeonggi-do (KR); Gyu Sang Cho, Gyeonggi-do (KR); Yun Jang Jin, Gyeonggi-do (KR); Se Young Jang, Gyeonggi-do (KR); Chi Hyun Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/443,330

(22) Filed: Jun. 17, 2019

(65) Prior Publication Data
US 2019/0303640 A1 Oct. 3, 2019

Related U.S. Application Data

(63) Continuation of application No. 15/491,589, filed on Apr. 19, 2017, now Pat. No. 10,366,272.

(30) Foreign Application Priority Data

Apr. 19, 2016 (KR) ........................ 10-2016-0047727
Mar. 13, 2017 (KR) ........................ 10-2017-0031042

(51) Int. Cl.
*G06K 9/00* (2006.01)

(52) U.S. Cl.
CPC ....... *G06K 9/0004* (2013.01); *G06K 9/00033* (2013.01)

(58) Field of Classification Search
CPC .... G06K 9/0004; G06K 9/00033; G06K 9/20; A61B 5/1172; H01S 5/32308;
(Continued)

(56) References Cited

U.S. PATENT DOCUMENTS 9,577,318 B2   2/2017 Pascolini et al.
9,829,614 B2  11/2017 Smith
(Continued)

FOREIGN PATENT DOCUMENTS

CN    105184228    12/2015
CN    105307453     2/2016
(Continued)

OTHER PUBLICATIONS

Korean Office Action dated Apr. 26, 2017 issued in counterpart application No. 10-2017-0031042, 8 pages.
(Continued)

*Primary Examiner* — John B Strege
(74) *Attorney, Agent, or Firm* — The Farrell Law Firm, P.C.

(57) ABSTRACT

An electronic device is provided that includes a display. The electronic device also includes a fingerprint sensor disposed under one or more pixels. The fingerprint sensor is adapted to acquire image information corresponding to a fingerprint of an external object that is in proximity to or in contact with the display based on at least a light radiated from at least one pixel and reflected by the external object. The electronic device also includes a rear panel disposed under the display. The rear panel includes an aperture corresponding to a disposition of the fingerprint sensor. The electronic device further includes a bracket disposed under the rear panel to support the display, and including a sensor seating area in which the fingerprint sensor is disposed. The fingerprint sensor is affixed to the sensor seating area. An air gap is formed between the display and the fingerprint sensor.

23 Claims, 33 Drawing Sheets

(58) Field of Classification Search
CPC ..... G06F 3/0421; G06F 3/048; H01L 27/323; G02F 1/13338; G02F 1/133385
See application file for complete search history.

(56) References Cited

U.S. PATENT DOCUMENTS

| | | | |
|---|---|---|---|
| 10,002,283 | B2 | 6/2018 | Li et al. |
| 2003/0135247 | A1 | 7/2003 | Zierhofer |
| 2011/0316415 | A1 | 12/2011 | Mizokami |
| 2014/0292184 | A1 | 10/2014 | Lee |
| 2014/0354597 | A1 | 12/2014 | Kitchens, II |
| 2015/0078635 | A1 | 3/2015 | Mankowski |
| 2015/0102829 | A1 | 4/2015 | Son |
| 2015/0177884 | A1 | 6/2015 | Han |
| 2015/0294135 | A1* | 10/2015 | Kim ................. H01L 23/04 382/124 |
| 2015/0331508 | A1 | 11/2015 | Nho |
| 2015/0371073 | A1 | 12/2015 | Cho |
| 2016/0011767 | A1 | 1/2016 | Jung |
| 2016/0029511 | A1 | 1/2016 | Jung et al. |
| 2016/0056527 | A1 | 2/2016 | Pascolini et al. |
| 2017/0046558 | A1 | 2/2017 | Li et al. |
| 2017/0220838 | A1 | 8/2017 | He |
| 2017/0364763 | A1 | 12/2017 | Jin |
| 2018/0196985 | A1 | 7/2018 | Ling |

FOREIGN PATENT DOCUMENTS

| | | |
|---|---|---|
| KR | 1020110095565 | 8/2011 |
| KR | 1020130057637 | 6/2013 |
| KR | 20150056353 | 5/2015 |
| KR | 20150060273 | 6/2015 |
| KR | 1020150073539 | 7/2015 |
| KR | 1020150100472 | 9/2015 |
| KR | 20150131944 | 11/2015 |
| KR | 20150146236 | 12/2015 |
| KR | 20160013602 | 2/2016 |
| KR | 1020160029698 | 3/2016 |

OTHER PUBLICATIONS

Chinese Office Action dated Aug. 22, 2018 issued in counterpart application No. 201711440798.1, 16 pages.
Man Xu et al., "Dual-Gate Photosensitive a-Si:H TFT Array Enabling Fingerprint-Sensor-Integrated Display Application", Journal of Display Technology, Mar. 14, 2016, 5 pages.
Kuduck Kwon et al., A Three-Terminal n+-p-n+ Silicon CMOS Light-Emitting Device for the New Fully Integrated Optical-Type Fingerprint Recognition System, Journal of Display Technology, Jan. 1, 2016, 5 pages.
Hyungsu Jeong et al., "Feasibility Study of a Dual-gate Photosensitive Thin-Film Transistor for Fingerprint Sensor Integrated Active-Matrix Display", SID International Symposium Digest, Jun. 1, 2015, 4 pages.
International Search Report dated Jul. 21, 2017 issued in counterpart application No. PCT/KR2017/004201, 12 pages.
European Search Report dated Sep. 8, 2017 issued in counterpart application No. 17167102.7-1901, 8 pages.
Korean Office Action dated Aug. 4, 2017 issued in counterpart application No. 10-2017-0031042, 5 pages.

* cited by examiner

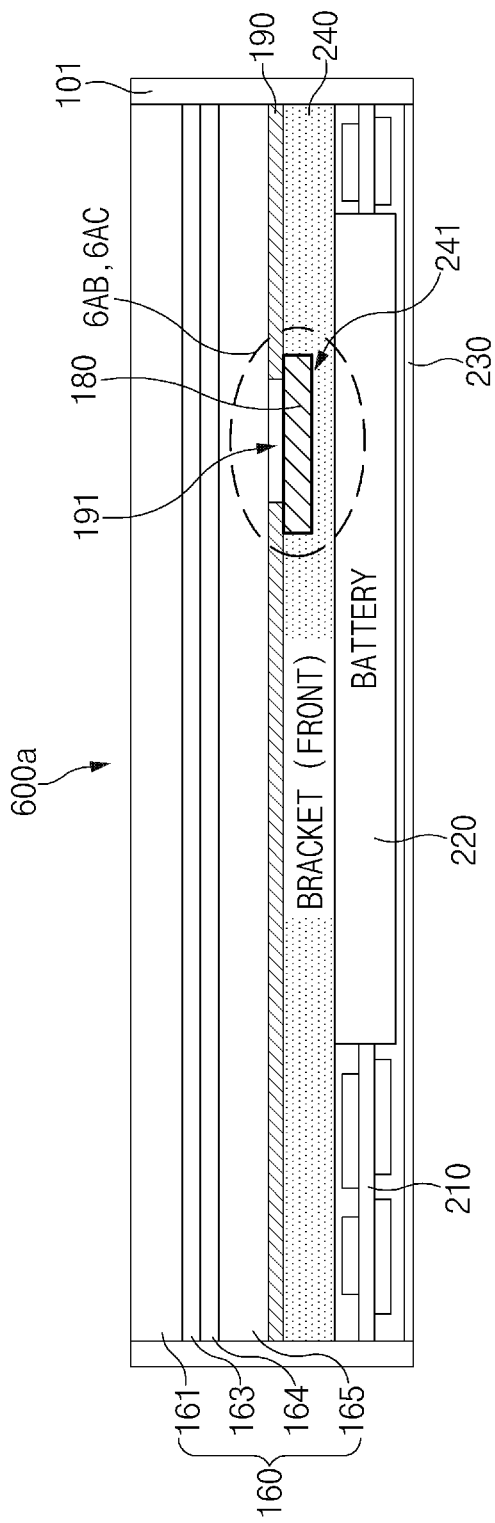
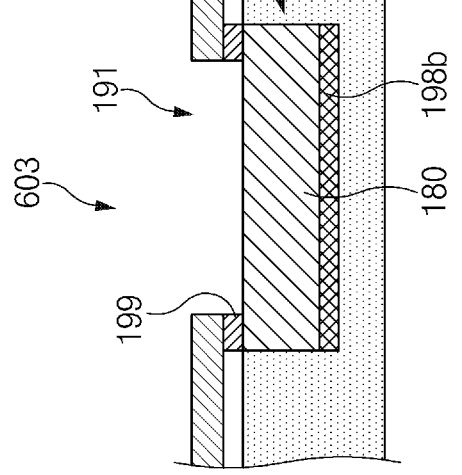
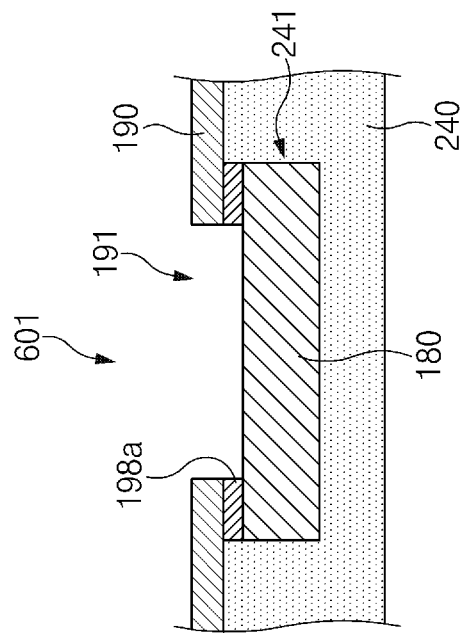
FIG. 6AA
FIG. 6AB
FIG. 6AC

ELECTRONIC DEVICE SUPPORTING FINGERPRINT VERIFICATION AND METHOD FOR OPERATING THE SAME

PRIORITY

This application is a Continuation Application of U.S. application Ser. No. 15/491,589, filed in the U.S. Patent and Trademark Office on Apr. 19, 2017, which claims priority under 35 U.S.C. § 119(a) to a Korean Patent Application filed on Apr. 19, 2016 in the Korean Intellectual Property Office and assigned Serial number 10-2016-0047727 and a Korean Patent Application filed on Mar. 13, 2017 in the Korean Intellectual Property Office and assigned Serial number 10-2017-0031042, the entire contents of each of which is incorporated herein by reference.

BACKGROUND

1. Field of the Disclosure

The present disclosure relates generally to a fingerprint verification function, and more particularly, to an electronic device supporting a fingerprint verification function and a method for operating the same.

2. Description of the Related Art

Conventionally, electronic devices support a fingerprint verification function.

In a conventional electronic device having a fingerprint verification function, a fingerprint sensor is disposed at a periphery of a lower end of a display area or on a rear surface of a case of the electronic device so that the electronic device may support a fingerprint authentication function based on the fingerprint sensor.

Accordingly, in the conventional fingerprint recognition environment, a user must position a finger in an area of a lower end or a rear surface of a case for fingerprint authentication. In the process, if the electronic device having a structure in which a fingerprint sensor is disposed at a lower end of the case, it is difficult for the user to position a finger at a specified point while continuing to grip the electronic device. Further, if an electronic device has a structure in which a fingerprint sensor is disposed on a rear surface of a case, errors may frequently occur in a fingerprint authenticating process because a user must use their senses to position a finger on the fingerprint sensor.

SUMMARY

In accordance with an aspect of the present disclosure, an electronic device is provided. The electronic device includes a display including a plurality of pixels for displaying a screen. The electronic device also includes a fingerprint sensor disposed under one or more pixels of the plurality of pixels. The fingerprint sensor is adapted to acquire image information corresponding to a fingerprint of an external object that is in proximity to or in contact with the display based on at least a light radiated from at least one pixel of the one or more pixels and reflected by the external object. The electronic device also includes a rear panel disposed under the display. The rear panel includes an aperture corresponding to a disposition of the fingerprint sensor. The electronic device further includes a bracket disposed under the rear panel to support the display, and including a sensor seating area in which the fingerprint sensor is disposed. The fingerprint sensor is affixed to the sensor seating area. An air gap is formed between the display and the fingerprint sensor.

In accordance with another aspect of the present disclosure, an electronic device is provided. The electronic device includes a housing, and a display accommodated in at least a portion of the housing. The display includes a pixel layer including a plurality of pixels for displaying a screen. The electronic device also includes a fingerprint sensor disposed in the interior of the housing and disposed under the display. Additionally, the electronic device includes a rear panel disposed under the display. The rear panel includes an aperture aligned with the fingerprint sensor. The electronic device also includes a bracket disposed under the rear panel to support the display, and including a sensor seating area in which the fingerprint sensor is disposed. The electronic device further includes a processor configured to: allow some pixels of the plurality of pixels to display a fingerprint recognition area on the display that corresponds to a disposition of the fingerprint sensor; and allow the some pixels to emit light for obtaining a fingerprint image if a finger of a user is in proximity to or in contact with the fingerprint recognition area. The fingerprint sensor is configured to acquire the fingerprint image based on light reflected in the fingerprint recognition area from the emitted light and delivered to the fingerprint sensor. The fingerprint sensor is affixed to the sensor seating area.

BRIEF DESCRIPTION OF THE DRAWINGS

The above and other aspects, features, and advantages of the present disclosure will be more apparent from the following detailed description, taken in conjunction with the accompanying drawings, in which:

FIG. 6AA is a view illustrating a fingerprint sensor disposition structure of an electronic device according to an embodiment of the present disclosure;

FIGS. 6AB and 6AC are partial views of FIG. 6AA according to embodiments of the present disclosure;

DETAILED DESCRIPTION OF EMBODIMENTS OF THE PRESENT DISCLOSURE

Figure 1:
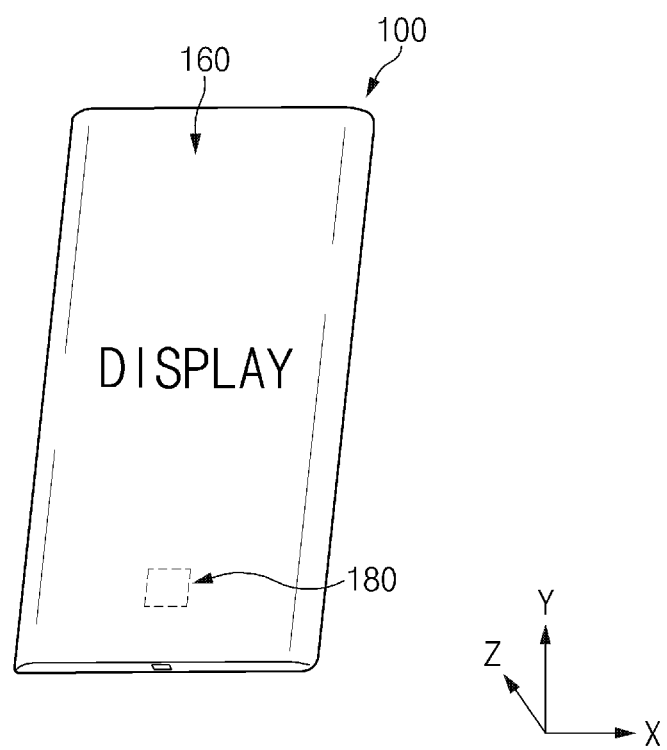
FIG. 1 is a view illustrating an external appearance of an electronic device supporting a fingerprint authentication function according to an embodiment of the present disclosure.

Various embodiments of the present disclosure are described with reference to the accompanying drawings. Accordingly, those of ordinary skill in the art will recognize that a modification, an equivalent, and/or an alternative on the various embodiments described herein may be variously made without departing from the scope and spirit of the present disclosure. With regard to the description of the accompanying drawings, similar elements may be marked by similar reference numerals.

In the present disclosure, the expressions "have", "may have", "include", "comprise", "may include", and "may comprise" used herein indicate the existence of corresponding features (e.g., elements such as numeric values, functions, operations, or components) but do not exclude the presence of additional features.

In the present disclosure, the expressions "A or B", "at least one of A and/or B", "one or more of A and/or B", and the like used herein may include any and all combinations of one or more of the associated listed items. For example, the expressions "A or B", "at least one of A and B", and "at least one of A or B" may refer to all of a case (1) where at least one A is included, a case (2) where at least one B is included, and a case (3) where both of at least one A and at least one B are included.

The terms "first", "second", and the like used herein may refer to various elements of various embodiments, but are not intended to limit the elements. Furthermore, such terms may be used to distinguish one element from another element. For example, "a first user device" and "a second user device" may indicate different user devices regardless of the order or priority thereof. For example, "a first user device" and "a second user device" indicate different user devices.

It is intended that when an element (e.g., a first element) is referred to as being "(operatively or communicatively) coupled with/to" or "connected to" another element (e.g., a second element), the element may be directly coupled with/to or connected to the other element or an intervening element (e.g., a third element) may be present. In contrast, when an element (e.g., a first element) is referred to as being "directly coupled with/to" or "directly connected to" another element (e.g., a second element), it is intended that there are no intervening element (e.g., a third element).

According to the situation, the expression "configured to" may be interchangeably used with the expressions "suitable for", "having the capacity to", "designed to", "adapted to", "made to", or "capable of". The term "configured to" may not indicate only "specifically designed to" in hardware. Instead, the expression "a device configured to" may indicate that the device is "capable of" operating together with another device or other components. A central processing unit (CPU), for example, a "processor configured to perform A, B, and C", may indicate a dedicated processor (e.g., an embedded processor) for performing a corresponding operation or a general purpose processor (e.g., a CPU or an application processor (AP)) which may perform corresponding operations by executing one or more software programs which are stored in a memory device.

Terms used in the present disclosure are used to describe certain embodiments but are not intended to limit the scope of the present disclosure. A term of a singular form may include a plural form unless otherwise indicated. Unless otherwise defined herein, all the terms used herein, may have the same meanings that are generally understood by a person skilled in the art. It may be further understood that terms, which are defined in a dictionary and commonly used, should also be interpreted as is customary in the relevant related art and not in an idealized or overly formal manner unless expressly so defined herein in various embodiments of the present disclosure. In some cases, even if terms are defined in the present disclosure, they are not intended to be interpreted to exclude embodiments of the present disclosure.

An electronic device according to various embodiments of the present disclosure may include at least one of smartphones, tablet personal computers (PCs), mobile phones, video telephones, e-book readers, desktop PCs, laptop PCs, netbook computers, workstations, servers, personal digital assistants (PDAs), portable multimedia players (PMPs), moving picture experts group (MPEG-1 or MPEG-2) audio layer 3 (MP3) players, mobile medical devices, cameras, wearable devices (e.g., head-mounted-devices (HMDs), such as electronic glasses), an electronic apparel, electronic bracelets, electronic necklaces, electronic accessories, electronic tattoos, smart watches, and the like.

According to another embodiment, the electronic devices may be home appliances. The home appliances may include at least one of, for example, televisions (TVs), digital versatile disc (DVD) players, audio players, refrigerators, air conditioners, cleaners, ovens, microwave ovens, washing machines, air cleaners, set-top boxes, home automation control panels, security control panels, TV boxes (e.g., Samsung HomeSync®, Apple TV®, or Google TV®), game consoles (e.g., Xbox® or PlayStation®), electronic dictionaries, electronic keys, camcorders, electronic picture frames, or the like.

According to an embodiment, the electronic devices may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA) device, a magnetic resonance imaging (MRI) device, a computed tomography (CT) device, scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), point of sale (POSs) devices, or Internet of Things devices (e.g., light bulbs, various sensors, electric or gas meters, sprinkler devices, fire alarms, thermostats, street lamps, toasters, exercise equipment, hot water tanks, heaters, boilers, and the like).

According to an embodiment, electronic devices may include at least one of parts of furniture or buildings/structures, electronic boards, electronic signature receiving devices, projectors, or various measuring instruments (e.g., water meters, electricity meters, gas meters, or wave meters, and the like). An electronic device may be one of the above-described various devices or a combination thereof. An electronic device may be a flexible device. Furthermore, an electronic device is not intended to be limited to the above-described electronic devices and may include other electronic devices and newly developed electronic devices.

Hereinafter, an electronic device according to the various embodiments of the present disclosure may be described with reference to the accompanying drawings. The term "user" used herein may refer to a person who uses an electronic device or may refer to a device (e.g., an artificial intelligence electronic device) that uses an electronic device.

FIG. 1 is a view illustrating an external appearance of an electronic device 100 supporting a fingerprint authentication function according to an embodiment of the present disclosure.

Referring to FIG. 1, the electronic device 100, for example, may have a tetragonal shape, and corners of the electronic device 100 may be at least partially rounded. Further, the electronic device 100 may be of an edge type in which at least one of side of the electronic device 100 (e.g., a left side or a right side of the electronic device 100 with reference to a longitudinal display state of a display 160) gradually curves toward a periphery of the electronic device 100. The electronic device 100 may have a form (e.g., a front surface full screen or an edge-to-edge display) in which the display 160 is expanded to at least one of a lower end or an upper end of a screen.

According to an embodiment of the present disclosure, a fingerprint sensor 180 that senses a fingerprint of a user, which contacts at least a partial area of the display 160 may be disposed in a space (e.g., a display pixel layer or under the display pixel layer) that is substantially perpendicular to at least a partial area of an active area, in which a screen of the display 160 is displayed, in a thickness direction (e.g., a z-axis direction). The fingerprint sensor 180 may have a specified (or certain, or specific) size (e.g., a size corresponding to a technical and statistical size, by which a fingerprint of a user may be verified), and may be disposed on one side of a rear surface or an entire area of the display 160, for example, in a form of a substrate or a sheet. The fingerprint sensor 180 may receive at least one portion (e.g., light reflected by a finger in contact with a surface of the display 160) of the light radiated from at least one pixel disposed in the display 160 to constitute image information that is necessary for recognition of a fingerprint, and may store the image information in an internal memory of the fingerprint sensor 180 or a memory (e.g., memory 130 of FIG. 13 described below) of the electronic device 100 such that a processor (e.g. an AP, a DDI, and a low-power processor) of the electronic device 100 may access the image information.

At least one portion of the display 160 may be transparent. For example, the display 160 may have a specified transparency (e.g., about 2 to 5%) for light of a specified wavelength band (a wavelength band of 550 nm). Further, an area of the display 160, which includes at least one portion of an area in which the fingerprint sensor 180 is disposed, may be transparent. In this case, the fingerprint sensor 180 may include a light emitting unit and a light receiving unit, and may radiate light by using the light emitting unit in correspondence with the control of the processor, may receive the radiated light, and may collect image information that is necessary for fingerprint verification.

As described above, the electronic device 100 having the fingerprint verification function may collect image information that is necessary for fingerprint verification by using the light radiated from a pixel included in the display 160. In this case, the fingerprint sensor 180 may be located below locations of the pixels of the display 160, and may collect and process light that returns through a transparent substrate in which pixels are disposed.

Figure 2:
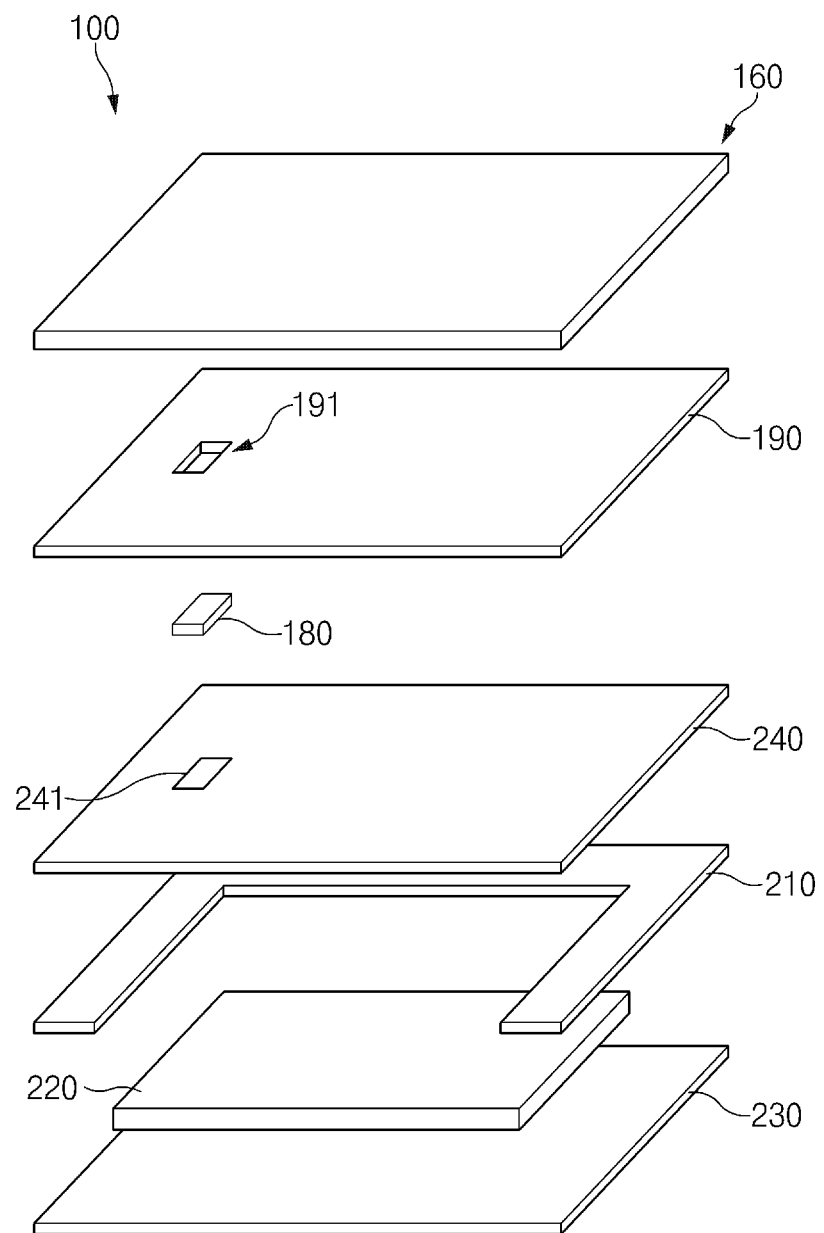
FIG. 2 is an exploded perspective view of an electronic device according to an embodiment of the present disclosure.

FIG. 2 is an exploded perspective view of an electronic device 100 according to an embodiment of the present disclosure.

Referring to FIG. 2, the electronic device 100 may include a display 160, a rear panel 190, a fingerprint sensor 180, a printed circuit board 210, a battery 220, and a rear cover 230. Additionally, the electronic device 100 may further include a case surrounding side surfaces of the display 160. The electronic device 100 may further include a bracket 240 fixing the display 160, the rear panel 190, the printed circuit board 210, and the battery 220 between the rear panel 190 and the printed circuit board 210. The bracket 240 may be provided as a part of the case (e.g., integrally formed with the case) or may include the case.

The display 160 may include a plurality of pixels disposed in a matrix form, wiring lines adapted (or configured) to supply electrical power to the pixels, a DDI adapted (or configured) to supply a signal to the wiring lines, and a substrate on which the pixels, the wiring lines, and the DDI are positioned. At least an area of the display 160 may be transparent (or have a specified transparency). For example, the gaps between the wiring lines of the display 160 may have a specified transparency (e.g., 2 to 5% at a wavelength around 550 nm) such that light may pass through the gaps. The display 160 may occupy at least one portion of a front surface of the electronic device 100. The pixels disposed in the display 160 may radiate light based on the control of the processor or the DDI. The light radiated from the pixel is reflected by an object (e.g., a finger) disposed on a front surface of the display 160, and may be delivered to the light receiving unit of the fingerprint sensor 180 after passing through the display 160.

The fingerprint sensor 180 is disposed under the rear panel 190 located under the display 160, and may face an area of the display 160 through a sensor disposition area 191 (e.g., an aperture or a hole) formed in the rear panel 190. Based on the above-described structure, the fingerprint sensor 180 may sense a fingerprint of a finger touching an area of the display 160. The fingerprint sensor 180 may be disposed on a rear surface of the display 160, at least an area of which is formed to be transparent through a sensor disposition area 191 to collect light introduced through the display 160. For example, the fingerprint sensor 180 may be radiated from at least one pixel (or at least one pixel disposed in a fingerprint authentication area) included in the display 160 and may receive light reflected by an object located in a fingerprint authentication area through the sensor disposition area 191. The fingerprint authentication area may include an area of the display 160, in which the fingerprint sensor 180 is disposed. Further, the fingerprint authentication area may take an area of the display 160, which faces the fingerprint sensor 180 as a minimum size area, and may further include an area (e.g., an area that is larger than an area corresponding to the size of the fingerprint sensor 180 by a specified size or more) of a specified size, which is touched by a finger of the user or the like with respect to an area facing the fingerprint sensor 180.

According to various embodiments of the present disclosure, the fingerprint sensor 180 may include a light emitting unit that may radiate light that is to be used as a light source for authentication of a fingerprint, and a light receiving unit that may collect the light reflected by the body (e.g., a finger) of the user. If the light is collected, the fingerprint sensor 180 may produce image information corresponding to the collected light, and may store the produced image information such that the image information may be used by a processor disposed in the printed circuit board 210. The fingerprint sensor 180 may deliver an event (e.g., information indicating whether image information is acquired) on acquisition of image information to the DDI included in the display 160.

In this case, the electronic device 100 may further include a signal line that may deliver the event between the fingerprint sensor 180 and the DDI.

The rear panel 190 may be disposed on a rear surface of the display 160 to protect the display 160 from an impact, support the display 160 on the housing (e.g., a bracket), or emit (or spread) heat generated by the display 160. For example, the rear panel 190 may include a protective layer (e.g., interchangeably a support layer) (e.g., an embossing layer or a cushion layer) having an embossing pattern, and a heat radiating layer, at least one portion of which is metallic. The protective layer, for example, may include a cushion for absorbing an impact, sponge, or a light shielding member (e.g., a black sheet or a black printing layer) for shielding light, and the configurations may be integrally formed or a plurality of layers for the configurations may be stacked. The rear panel 190 may include an electromagnetic induction panel (or a digitizer). The electromagnetic induction panel may detect an approach of an electromagnetic inductor such as a stylus pen. The electromagnetic induction panel may be disposed between the protective layer and the heat radiating layer. The rear panel 190 may include a hole type sensor disposition area 191, into which the fingerprint sensor 180 is inserted or which is vertically aligned with at least one portion of the fingerprint sensor 180. The sensor disposition area 191 may include a hole passing through the front and rear surfaces of the front panel 190 while having a specified size corresponding to the size of the fingerprint sensor 180. For example, a hole that passes through the rear panel 190 may pass through the front and rear sides (or vertically) of the protective layer, the electromagnetic induction panel, and the heat radiating layer.

The bracket 240 may be disposed between the rear panel 190 and the printed circuit board 210. The bracket 240 may include a first sensor accommodating area 241, in which the fingerprint sensor 180 is accommodated to be affixed. The first sensor accommodating area 241, for example, may have a hole passing through the front and rear surfaces of the bracket 240 or a recess engraved to a specified depth while having a specified size corresponding to the size of the fingerprint sensor 180. The bracket 240 may further include a wiring hole or a wiring recess in which wiring lines for electrical connection of the accommodated (or seated) fingerprint sensor 180 and the processor disposed in the printed circuit board 210 are disposed.

The printed circuit board 210 may be disposed under the bracket 240. One or more hardware components (e.g., a camera module, a microphone, a speaker, or a universal serial bus (USB) interface) of the electronic device 100 may be disposed in the printed circuit board 210. A processor adapted (or configured) to perform processing related to fingerprint authentication may be disposed in the printed circuit board 210. Further, the printed circuit board 210 may include a contact point electrically connected to the battery 220, and may include a wiring line that may deliver electrical power provided by the battery 220 to the fingerprint sensor 180 and the display 160. A processor disposed in the printed circuit board 210 may be connected to the display 160. The processor may output a fingerprint authentication guide UI on the display 160 in correspondence with a request for fingerprint authentication. The processor may control a screen of the display 160 or may control at least one of the luminance or the color of the fingerprint authentication area such that the fingerprint authentication area has a specified luminance or a specified color during a fingerprint authentication process.

The battery 220 may be disposed in a layer that is under the rear panel 190 and parallel to the printed circuit board 210. The battery 220 may supply electrical power to the printed circuit board 210 electrically connected to the battery 220, and may supply electrical power to components (e.g., the display 160 and the fingerprint sensor 180) in correspondence to the control of a processor of the printed circuit board 210.

The rear cover 230 may be disposed under the printed circuit board 210 and the battery 220 to at least partially surround the printed circuit board 210 and the battery 220. The rear cover 230 may be formed of various materials (e.g., plastic, metal, or glass). The rear cover 230 may be affixed to the above-described case or bracket 240.

Figure 3A:
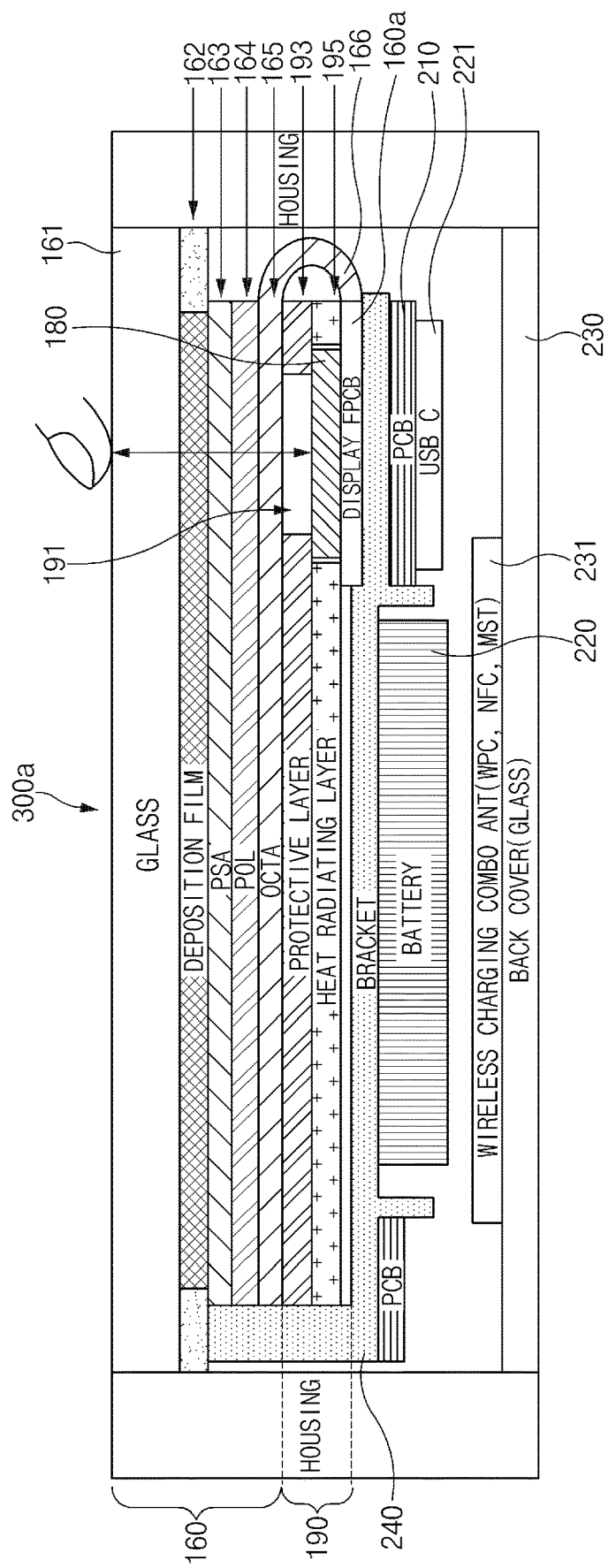
FIG. 3A is a view illustrating an electronic device having a fingerprint sensor according to an embodiment of the present disclosure.

FIG. 3A is a view illustrating an electronic device having a fingerprint sensor according to an embodiment of the present disclosure.

Referring to FIG. 3A, the electronic device 300a may include a display 160, a rear panel 190, a fingerprint sensor 180, a bracket 240, a battery 220, and a printed circuit board 210, a wireless charging circuit 231, and a rear cover 230. The wireless charging circuit 231, for example, may include a circuit (e.g., a wireless power transfer (WPC) circuit) that may wirelessly charge the battery 220. The wireless charging circuit 231 may further include a near field communication (NFC) antenna or a magnetic secure transmission (MST) antenna.

The display 160 may include an external protective layer 161 (e.g., a glass cover), a design layer 162, a bonding layer 163 (e.g., a pressure sensitive adhesive), a polarizer layer 164, and a display panel 165 (for example, an active-matrix organic light-emitting diode (AMOLED) panel). Here, the design layer 162 may be omitted, through a change in a design method. The external protective layer 161 may be formed of a transparent material, such as glass or a polymer. The external protective layer 161 may correspond to 0.1 t ("t" means "millimeter") to 1.0 t (for example, 0.5 t (mm)). The design layer 162 may be a layer in which a pattern, a logo or the like is printed. The remaining areas of the design layer 162, except for the area in which a logo or the like is disposed, may be transparent. The bonding layer 163 may be disposed between the external protective layer 161 and the polarizer layer 164 to affix the external protective layer 161 to the polarizer layer 164. Light (e.g., natural light) introduced from the external protective layer 161 or light (e.g., a pixel light) radiated from the display panel 165 to the outside vibrates in various directions, and the bonding layer 163 may correspond to 0.05 t to 0.3 t (for example, 0.15 t (mm)). The polarizer layer 614 may transmit light, which vibrates only in a specified direction). The polarizer layer 164 may correspond to 0.05 t to 0.3 t (for example, 0.147 t (mm)).

The display panel 165 may include a touch sensor and a display unit. The display panel 165 may correspond to 0.1 t to 0.3 t (for example, 0.14 t (mm)). The touch sensor may be disposed in a matrix form. The touch sensor may be electrically connected to a touch driving module. The touch driving module, for example, may be positioned in the flexible printed circuit board 160a, may be electrically connected to the touch sensor, and/or may be electrically connected to the touch sensor and the printed circuit board 210 through the flexible printed circuit board 160a. The display unit may include at least one pixel. The display unit, for example, may include organic light-emitting diode (OLED) based pixels that may emit light by themselves. The display unit may output light related to a specified image in correspondence with control of the processor or the DDI based on the electrical power supplied by the battery 220.

The display panel 165 may further include a DDI (or a display driving module, display driving module may include the DDI) related to the control of the display unit is disposed. For example, the DDI may be mounted in a COP type on a non-display area of the display panel 165. The DDI disposed in the display panel 165 may be connected to the printed circuit board 210 through the flexible printed circuit board 160a. In this regard, a hole that vertically passes through the bracket 240 may be provided on at least one portion of the bracket 240, and the flexible circuit board 160a may be electrically connected to the printed circuit board 210. In this case, the display panel 165 may be of a flexible type, and a portion (e.g., a right periphery) of the display panel 165 may be curved. A portion that extends from the display panel 165 to be curved may be electrically connected to the flexible printed circuit board 160a. A display driving module (e.g., a DDI or a touch driver IC (TDI)) may be disposed in a COF type on at least one side surface of the flexible printed circuit board 160a. The DDI and the TDI mounted in a COF type may be integrally embodied on the flexible printed circuit board 160a. Further, a fingerprint sensor may be disposed on the flexible printed circuit board 160a, and the DDI and the TDI of the fingerprint sensor may be integrally embodied. Further, a pressure sensor may be disposed on the flexible printed circuit board 160a, and the pressure sensor may be integrally embodied in at least one of the DDI and the TDI.

The fingerprint sensor 180 may be accommodated (or seated) in the sensor disposition area 191 in which a hole is formed by removing at least a partial area of at least one layer of the protective layer 193 or the heat radiating layer 195 of the rear panel 190. Further, the fingerprint sensor 180 may be arranged under the sensor disposition area 191 of the rear panel 190. The fingerprint sensor 180 may collect light radiated from a light source (e.g., the pixels of the display panel 165), reflected by a body (e.g., a finger) of a user, and introduced to the rear surface of the display 160 through a transparent area of the display 160. The fingerprint sensor 180 may be disposed on the flexible printed circuit board 160a. The electronic device 300a may further include a wiring line that may deliver image information generated by the fingerprint sensor 180 to the processor. The wiring line connected to the fingerprint sensor 180, for example, may be disposed on one side of the flexible printed circuit board 160a and may be electrically connected to the processor of the printed circuit board 210. In the electronic device 300a, the DDI related to driving of the display panel 165 may include an integrated circuit (IC) that drives the fingerprint sensor 180, and in this case, the electronic device 300a may further include a wiring line that connects the fingerprint sensor 180. The fingerprint sensor 180 may deliver an event based on recognition of an approach of a finger to the DDI through the wiring line. In relation to the determination of the approach of the finger, if the fingerprint sensor 180 acquires image information of the finger or the fingerprint and stores the image information in a memory (e.g., an internal register or a buffer of the fingerprint sensor 180, the processor may determine an approach of an object based on the image information stored in the memory. The processor may determine an approach of an object (or an approach of a finger) if the intensity of illumination of a fingerprint decreases to a specified intensity of illumination or less. In this case, the electronic device 300a may further include a luminance sensor which is described below with reference to in FIG. 23. When the electronic device 300a includes a separate luminance sensor, the processor may acquire luminance information in a specified direction of the electronic device based on the luminance sensor and may identify an approach of a fingerprint according to the luminance information in advance. For example, the processor may activate the fingerprint sensor 180 if a luminance of the outside is a specified value or less, based on the luminance sensor. The luminance sensor may be disposed in an area that is adjacent to a location of the fingerprint sensor 180 or may be disposed at a location at which the electronic device 300a is gripped.

The rear panel 190 may be disposed on the whole rear surface of the display 160, except for an area in which the fingerprint sensor 180 is disposed. As described above, the rear panel 190 may include a protective layer 193 having an embossing pattern, and a heat radiating layer 195 (e.g., a copper layer) having a heat radiating function. The protective layer 193 may restrain or prevent an impact from being applied to the display panel 165 based on the black embossing cushion, or may improve the visibility of the display panel 165. The protective layer 193 may correspond to 0.1 t to 0.3 t (for example, 0.14 t (mm)). The heat radiating layer 195 may be electrically connected to the display driving module to function as a ground (e.g., shielding of noise) of the display driving module. The heat radiating layer 195 may correspond to 0.02 t to 0.1 t (for example, 0.04 t (mm)). A portion of the protective layer 193 may be disposed under the display panel 165, and a remaining portion of the protective layer 193 may be positioned on the heat radiating layer 195. For example, the protective layer 193 may include an embossing layer and a cushion layer, the embossing layer may be disposed under the display panel 165 and the cushion layer may be positioned under the heat radiating layer 195.

The bracket 240 may support the display 160 while electrically insulating the rear panel 190, the printed circuit board 210, or the battery 220. At least one portion of the bracket 240 may be formed of a nonmetallic material, and the remaining areas (e.g., a side surface of the case) of the bracket 240 may be formed of a metallic material. For example, the whole bracket 240 may be formed of a nonmetallic material, or may be formed of a metallic material.

The battery 220 may be accommodated in and affixed to one side of the bracket 240. The printed circuit board 210 may be disposed on the bracket 240 to surround the battery 220. The printed circuit board 210 may include a first part, to which a USB interface 221 is coupled, and a second part electrically connected to the flexible printed circuit board 160a in which a processor is disposed, and may include a third part connecting the first part of the printed circuit board 210 and the second part of the printed circuit board 210.

Although FIG. 3A illustrates that the fingerprint sensor 180 is disposed on the bracket 240 in an area in which the USB interface 221 is disposed, the present disclosure is not limited thereto. At least one portion of the fingerprint sensor 180 may be disposed on the bracket 240 in an area in which the battery 220 is disposed.

Figure 3B:
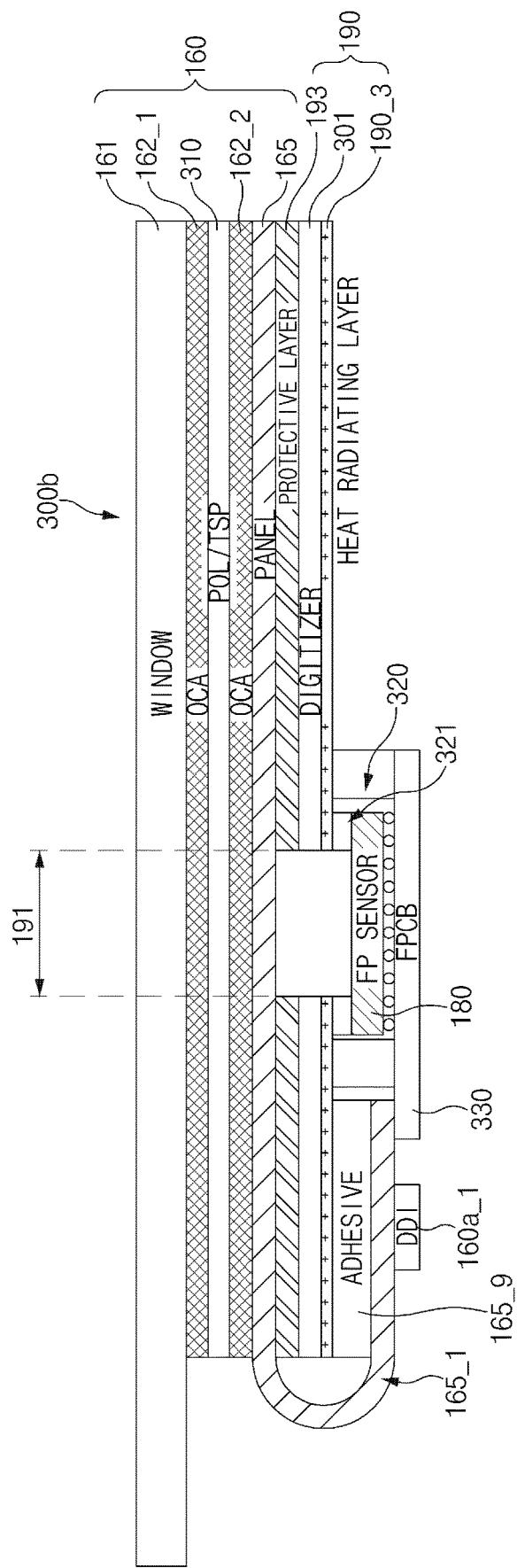
FIG. 3B is a view illustrating a chip on panel (COP) type electronic device according to an embodiment of the present disclosure.

FIG. 3B is a view illustrating an example of a COP type electronic device according to an embodiment of the present disclosure.

Referring to FIG. 3B, an electronic device 300b according to an embodiment may include a display 160, a rear panel 190 including a digitizer 301, a fingerprint sensor 180, and a pressure sensor 320. Additionally or alternatively, the electronic device 300b may further include a bracket or a battery.

The display 160 may include an external protective layer 161, a first bonding layer 162_1, a polarizer layer 310, a second bonding layer 162_2, and a display panel 165. Further, the display 160 may include a display driving module 160a_1, and may further include a display panel extension 165_1 in which the display driving module 160a_1 is disposed. The display panel 165 may include a touch panel. A bonding layer 165_9 may be disposed between the display panel extension 165_1 and a heat radiating layer 190_3.

The external protective layer 161 may have a configuration that is the same as or similar to that of the external protective layer 161 described above with regard to FIG. 3A. The first bonding layer 162_1 may bond the external protective layer 161 and the polarizer 310. The second bonding layer 162_2 may bond the polarizer layer 310 and the display panel 165. In relation to visual recognition of an image embodied on the display panel 165, the first bonding layer 162_1 and the second bonding layer 162_2 may be formed of an optically clear adhesive.

The display panel 165 may be formed of a flexible panel, and as illustrated, the display panel extension 165_1 may be disposed at a portion of a rear surface of the display panel 165 while being curved by a specified angle (e.g., 180 degrees or more) with respect to the display panel 165. The display driving module 160a_1 may be disposed on the display panel extension 165_1 (e.g., a COP type). Additionally or alternatively, the display panel 165 may include a touch panel. A signal circuit related to the driving of the touch panel may be disposed on the display panel extension 165_1, and the touch panel driving IC may be disposed in and integrated with the display driving module 160a_1.

The display driving module 160a_1 may include a DDI that drives the display panel 165, and a touch driving module that drives the touch panel included in the display panel. The display driving module 160a_1 may be disposed on the display panel extension 165_1. Additionally, signal lines for supplying a data signal and a gate signal to the display panel 165 may be disposed on the display panel extension 165_1.

The display panel extension 165_1 may be disposed on a rear surface of one side of the display panel 165 to be curved after extending from one side of the display panel 165 by a specified length. At least one portion of the display panel extension 165_1 may include a non-display area, and at least one signal line may be disposed at the at least one portion of the display panel extension 165_1 to supply a signal to the display panel 165. The display driving module 160a_1 may be disposed on one side of the display panel extension 165_1. An end of the display panel extension 165_1 may be electrically connected to one side of the circuit board 330 for sensors, in which a fingerprint sensor 180 is accommodated (or seated). The display panel extension 165_1 may be formed when the display panel 165 is formed. The circuit board 330 for sensors, for example, may be included in the fingerprint sensor 180.

The rear panel 190 may include a protective layer 193, a heat radiating layer 190_3, and a digitizer 301 disposed between the protective layer 193 and the heat radiating layer 190_3. A hole may be formed in an area of the rear panel 190, in which the sensor disposition area 191 is formed. The sizes of the holes formed in the protective layer 193 and the heat radiating layer 190_3 of the rear panel 190 may be the same as or similar to the size of the hole formed in the digitizer 301.

The digitizer 301 may be included in the rear panel 190. For example, the digitizer 301 may be disposed between the protective layer 193 and the heat radiating layer 190_3 of the rear panel 190. The digitizer 301, for example, may recognize an approach or contact of an accessory (e.g., a stylus pen). The digitizer 301 may include a panel that may recognize an approach or contact of the accessory in an electromagnetically inductive manner. The digitizer 301 may be electrically connected to the main printed circuit board 210 (as shown FIG. 3A) through a separate flexible printed circuit board (FPCB) 330. The digitizer 301 may be electrically connected to one side of a rear surface of the display panel extension 165_1, and may be connected to the display driving module 160a_1 through the display panel extension 165_1. In this case, the display driving module 160a_1 may further include a driving module related to driving of the digitizer 301, and may transmit and receive signals to and from the digitizer 301 through at least one signal line disposed on the rear surface of the display panel extension 165_1. One side of the digitizer 301 may have a hole for forming the sensor disposition area 191. The size of the hole, for example, may correspond to the size of the fingerprint sensor 180, or may correspond to the size of the sensor disposition area 191 for sensing a fingerprint.

The fingerprint sensor 180 may be arranged under a hole corresponding to the sensor disposition area 191 of the rear panel 190. The fingerprint sensor 180 may acquire a fingerprint image by outputting light and receiving the reflected light. The fingerprint sensor 180 may be electrically mounted (for example, soldered) on the circuit board 330 for sensors. A third bonding layer 321 may be disposed between one side of the fingerprint sensor 180 and the rear panel 190. The third bonding layer 321 may be disposed at a periphery of the fingerprint sensor 180 to have a band shape.

The pressure sensor 320 may be disposed on the circuit board 330 for sensors, and may surround the fingerprint sensor 180. Further, the pressure sensor 320 may be disposed to surround the sensor disposition area 191. For example, the pressure sensor 320 may have a circular, elliptical, or polygonal band shape. The driving IC that drives the pressure sensor 320 may be disposed in any one of the printed circuit board 210 or the circuit board 330 for sensors, and a sensing part for sensing a pressure may be disposed between the rear panel 190 and the circuit board 330 for sensors. A bonding layer may be disposed between an upper end of the sensing part and the rear panel 190.

At least one of the fingerprint sensor 180 and the pressure sensor 320 may be accommodated on the circuit board 330 for sensors. The circuit board 330 for sensors may be aligned with and disposed in the sensor disposition area 191. One side of the circuit board 330 for sensors may be electrically or physically connected to one side of the display panel extension 165_1. The circuit board 330 for sensors may receive a signal or an electric voltage related to driving from the display driving module 160a_1 disposed in the display panel extension 165_1.

As described above, the electronic device 300b may include a digitizer 301 disposed under the display panel 165, and a partial area of the digitizer 301 may include a hole area that passes through the digitizer 301 in consideration of the sensor disposition area 191 of the fingerprint sensor 180.

Figure 3C:
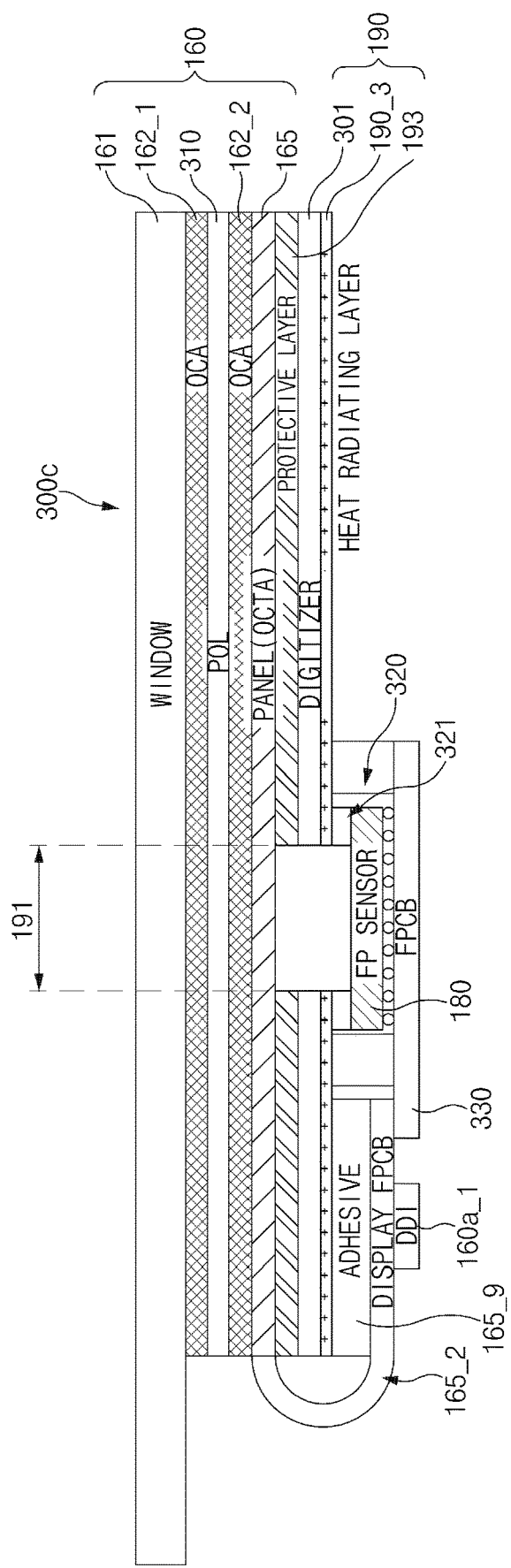
FIG. 3C is a view illustrating a chip on film (COF) type electronic device according to an embodiment of the present disclosure.

FIG. 3C is a view illustrating an example of a configuration of a COF type electronic device according to an embodiment of the present disclosure.

Referring to FIG. 3C, an electronic device 300c may include a display 160, a rear panel 190 including a digitizer 301, a protective layer 193, and a heat radiating layer 190_3, a fingerprint sensor 180, and a pressure sensor 320. Additionally or alternatively, the electronic device 300c may further include a bracket or a battery.

The display 160 may include an external protective layer 161, a first bonding layer 162_1, a polarizer layer 310, a second bonding layer 162_2, and a display panel 165, and may include a display panel connector 165_2 connected to one side of the display panel 165. The display panel 165 may include a touch panel. A bonding layer 165_9 may be disposed between the display panel connector 165_2 and the heat radiating layer 190_3.

Among the above-mentioned configurations, the external protective layer 161, the first bonding layer 162_1, the polarizer layer 310, the second bonding layer 162_2, and the display panel 165 may be substantially the same as or similar to the configuration of FIG. 3B described above.

One side of the display panel connector 165_2 may be electrically connected to one side of the display panel 165, and an opposite side of the display panel connector 165_2 may be disposed on a rear surface of the display panel 165 while being curved to be connected to the circuit board 330 for sensors. A display driving module 160a_1 may be disposed at an upper portion of one side of the display panel connector 165_2. The display panel connector 165_2 may be a flexible circuit film or a flexible circuit board of a film form. Signal lines related to driving of the display panel 165 may be disposed on an upper surface (or a lower surface) of the display panel connector 165_2, and signal lines related to driving of the digitizer 301 may be disposed on a lower surface (or an upper surface) of the display panel connector 165_2. Further, signal lines related to driving of the display panel 165 may be disposed on one side of an upper portion (or one side of a lower portion) of the display panel connector 165_2, and signal lines related to driving of the digitizer 301 may be disposed at an opposite side of the upper portion (an opposite side of the lower portion) of the display panel connector 165_2. After being provided independently from the display panel 165, the display panel connector 165_2 may be electrically connected to one side of the display panel 165. Signal lines related to driving of the touch panel may be disposed on one side of the display panel connector 165_2, and the touch panel driving circuit may be included in the display driving module 160a_1.

Although it has been described that the display driving module 160a_1 includes the touch panel driving module, the present disclosure is not limited thereto. For example, the touch panel driving module may be separately disposed on the display panel extension 165_1 (As shown FIG. 3B) or the display panel connector 165_2, and the touch panel driving module may transmit and receive a signal to and from the touch panel through a signal line disposed on the display panel connector 165_2.

Figure 4:
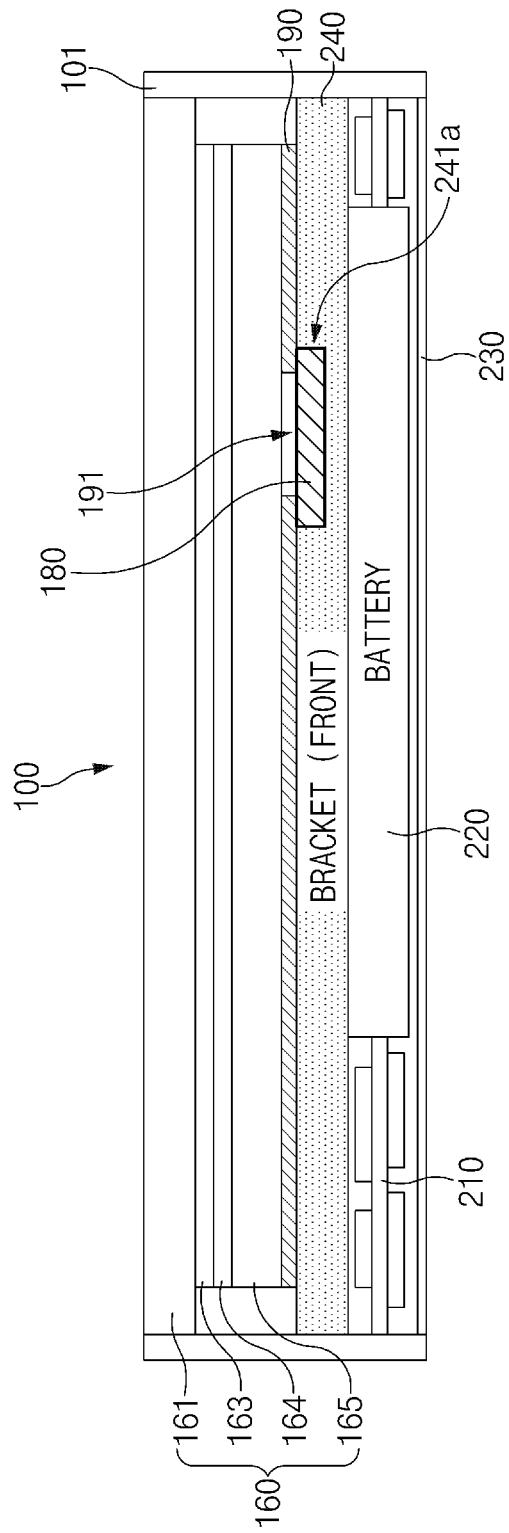
FIG. 4 is a view illustrating a fingerprint sensor of an electronic device according to an embodiment of the present disclosure.

FIG. 4 is a view illustrating a fingerprint sensor of an electronic device 100 according to an embodiment of the present disclosure.

Referring to FIG. 4, the electronic device 100 may include a case 101, a display 160, a rear panel 190, a fingerprint sensor 180, a bracket 240, a printed circuit board 210, a battery 220, and a rear cover 230.

As described above, the display 160 may include an external protective layer 161, a bonding layer 163 (e.g., an optically clear adhesive (OCA)), a polarizer layer 164, and a display panel 165. In addition, the display 160 may further include a design layer in which a logo or the like is printed based on a design method. At least one portion (e.g., a fingerprint authentication area in which the fingerprint sensor 180 is disposed) of the above-described display 160 may be transparent. Light radiated from at least one pixel (e.g., pixels disposed in the fingerprint authentication area or pixels disposed in an area of a specified size including the fingerprint authentication area) included in the display panel 165 of the display 160 may be introduced into the fingerprint sensor 180 after passing through the interior of the transparent display 160.

The rear panel 190 may be disposed under the display 160 and may include a sensor disposition area 191. The fingerprint sensor 180 may be disposed under the sensor disposition area 191. Through the sensor disposition area 191, the fingerprint sensor 180 may collect light passing through the display 160.

The fingerprint sensor 180 may be disposed under the rear panel 190, and as illustrated, may be disposed in a first sensor accommodating area 241a provided on one side of the bracket 240. At least one portion (e.g., the light receiving unit that may collect light) of an upper portion of the fingerprint sensor 180 may be exposed through the sensor disposition area 191 of the rear panel 190. Further, when the fingerprint sensor 180 is provided in a form including both the light emitting unit and the light receiving unit, a part in which the light emitting unit and the light receiving unit are disposed may be exposed towards the display 160 through the sensor disposition area 191. The light introduced through the transparent area of the display 160 may be delivered to the fingerprint sensor 180 through the sensor disposition area 191.

The bracket 240 is disposed under the rear panel 190 to support the rear panel 190, the display 160, and the like. At least one portion of the bracket 240 may be formed of a nonmetallic material or at least one portion of the bracket 240 may be formed of a metallic material. The bracket 240 may include a first sensor accommodating area 241a. The first sensor accommodating area 241a may be formed by engraving an area of a surface of the bracket 240, which is disposed towards the display 160. The depth of the first sensor accommodating area 241a may correspond to the height of the fingerprint sensor 180. The area of the first sensor accommodating area 241a may correspond to the size of the fingerprint sensor 180. The first sensor accommodating area 241a may include at least one of a wiring recess or a wiring hole, in which the wiring lines of the accommodated fingerprint sensor 180 are disposed. The wiring recess or the wiring hole may function as a path electrically connecting the wiring lines connected to the fingerprint sensor 180, to the printed circuit board 210 disposed under the bracket 240. Further, a wiring line electrically connecting the display driving module disposed in the display 160 and the fingerprint sensor 180 may be disposed in the wiring recess or the wiring hole disposed in the first sensor accommodating area 241a.

The printed circuit board 210 may be disposed under the bracket 240, and may be electrically connected to the display 160 and the fingerprint sensor 180. The processor related to driving of the display 160 and driving of the fingerprint sensor 180 may be accommodated in the printed circuit board 210. The battery 220 may be disposed in a layer that is under the bracket 240 and parallel to the printed circuit board 210. The rear cover 230 may surround the printed circuit board 210, the battery 220, and the like.

Figure 5:
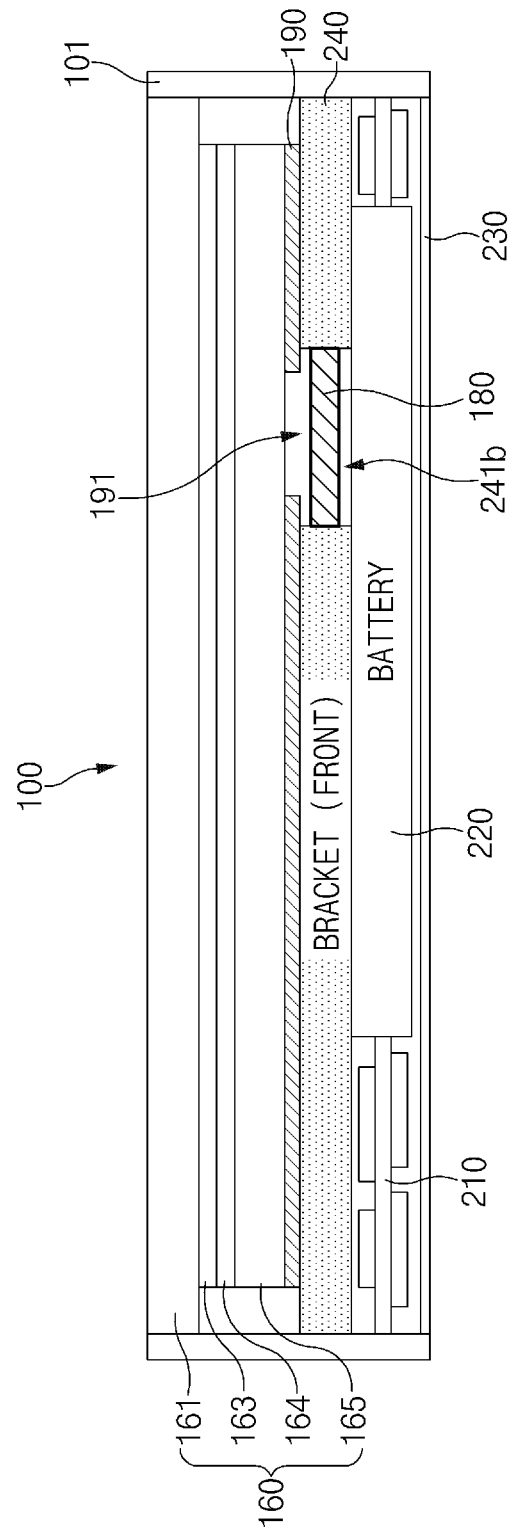
FIG. 5 is a view illustrating a fingerprint sensor of an electronic device according to an embodiment of the present disclosure.

FIG. 5 is a view illustrating a fingerprint sensor of an electronic device 100 according to an embodiment of the present disclosure.

Referring to FIG. 5, the electronic device 100 according to the present disclosure may include a case 101, a display 160, a rear panel 190, a fingerprint sensor 180, a bracket 240, a printed circuit board 210, a battery 220, and a rear cover 230. The display 160, the rear panel 190, the printed circuit board 210, the battery 220, and the rear cover 230 may have the same configurations as those of FIG. 4 described above. Further, the fingerprint sensor 180 may be arranged under the sensor disposition area 191 of the rear panel 190.

The bracket 240 may include a second sensor accommodating area 241b, in which the fingerprint sensor 180 is disposed. The second sensor accommodating area 241b may have a hole passing through the front and rear surfaces of the bracket 240. The fingerprint sensor 180 may be accommodated in and affixed to the second sensor accommodating area 241b. Accordingly, the area of the second sensor accommodating area 241b may correspond to an area corresponding to the size of the fingerprint sensor 180. A bonding layer may be disposed between a side surface of the second sensor accommodating area 241b and the fingerprint sensor 180 such that the fingerprint sensor 180 may be affixed to the second sensor accommodating area 241b. If the fingerprint sensor 180 is accommodated in a seating hole, the fingerprint sensor may not be connected to a display FPCB but may be directly connected to a main PCB.

The front surface of the fingerprint sensor 180 may be affixed at the same height as that of the bracket 240 to be relatively close to the display 160. If the fingerprint sensor 180 includes a light emitting unit and a light receiving unit, the light emitting unit of the fingerprint sensor may be disposed at an outer side of the fingerprint sensor and the light receiving unit of the fingerprint sensor 180 may be disposed at the center of the fingerprint sensor 180. The light receiving unit of the fingerprint sensor 180 may face an area of the display 160 through the sensor disposition area 191 of the rear panel 190. The fingerprint sensor 180 of the present disclosure may include only a light receiving unit. The light radiated from a light source at a specified location of the electronic device 100 may be reflected or refracted and be collected by the fingerprint sensor 180. The light source may be disposed at a specified location of the interior of the electronic device 100 that is adapted such that the radiated light may reach the fingerprint area directly or indirectly, or by using refraction or reflection.

FIG. 6AA is a view illustrating a fingerprint sensor fixing structure of an electronic device according to an embodiment of the present disclosure.

FIGS. 6AB and 6AC are partial views of FIG. 6AA according to an embodiment of the present disclosure.

Referring to FIGS. 6AA, 6AB, and 6AC, the electronic device 600a may include a case 101, a display 160, a rear panel 190, a fingerprint sensor 180, a bracket 240, a printed circuit board 210, a battery 220, and a rear cover 230. The display 160, the rear panel 190, the printed circuit board 210, the battery 220, and the rear cover 230 may have the same configurations as those of FIG. 4 described above. The fingerprint sensor 180 may be aligned with the sensor disposition area 191 of the rear panel 190 to face an area (e.g., a transparent area) of the display 160. The fingerprint sensor 180 may be accommodated in the first sensor accommodating area 241.

According to an embodiment of the present disclosure, the fingerprint sensor 180 may be affixed to the rear panel 190 as in FIG. 6AB in case 601. The light receiving unit (or the light emitting unit and the light receiving unit) of the fingerprint sensor 180 may be disposed at the center of a fingerprint sensor housing. Accordingly, one side of the sensor bonding layer 198a, except for a central area of the fingerprint sensor housing in which the light receiving unit is disposed, may be bonded to a peripheral area of the fingerprint sensor housing. An opposite side of the sensor bonding layer 198a may be bonded to a periphery of the sensor disposition area 191 of the rear panel 190 disposed on the fingerprint sensor 180.

The fingerprint sensor 180 may be accommodated in and affixed to the above-described sensor accommodating area

241. Then, a bonding material is applied to an inside of the sensor accommodating area 241 to affix the fingerprint sensor 180. Further, the sensor accommodating area 241 may have the same size as that of the fingerprint sensor 180 such that the fingerprint sensor 180 may be interference-fitted with the sensor accommodating area 241.

According to an embodiment of the present disclosure, the fingerprint sensor 180 may be affixed to the bracket 240 as in FIG. 6AC in case 603. For example, the fingerprint sensor 180 may include a sensor bonding layer 198b disposed on at least one portion of the rear surface or the side surface thereof. The fingerprint sensor 180 provided with the sensor bonding layer 198b may be bonded to the sensor accommodating area 241 of the bracket 240. Additionally, a sealant 199 may be disposed so as to an aperture (or gap) between the fingerprint sensor 180 and the rear panel 190 may be removed by the sealant 199. The sealant 199 may have an annular shape (e.g., an elliptical ring or polygonal ring shape), and may be disposed at a peripheral portion of the fingerprint sensor 180. An area in which the sealant 199 is disposed may be an area except for a central area in which the light receiving unit (or the light emitting unit and the light receiving unit) of the fingerprint sensor 180 is disposed. The sealant 199 is based on a selective design, and may be omitted based on a design policy or method. Further, the sealant 199 may include a bonding substance (e.g., an OCA or an optically clear resin (OCR) to affix the fingerprint sensor 180 to the rear panel 190.

The following corresponds to a method for maintaining an air gap between a display panel and a fingerprint sensor. It may be necessary to maintain an air gap for improving a recognition rate of a fingerprint. If a state when the fingerprint sensor is calibrated and a state when the fingerprint is actually used are different, recognition rate may severely deteriorate due to a low image quality. Accordingly, a step of an air gap in a manufacturing process may be minimized through a structure of attaching the fingerprint sensor to a rear surface of the display.

Figure 6B:
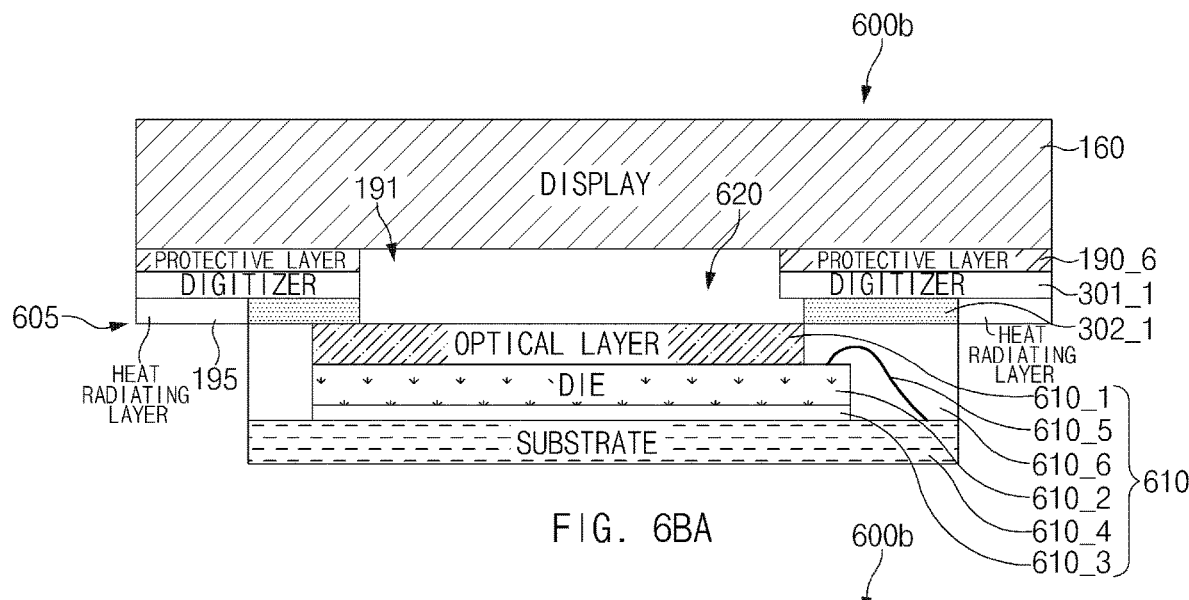
FIGS. 6BA, 6BB, and 6BC are views illustrating a fingerprint sensor disposition structure of an electronic device according to embodiments of the present disclosure.
Figure 6B:
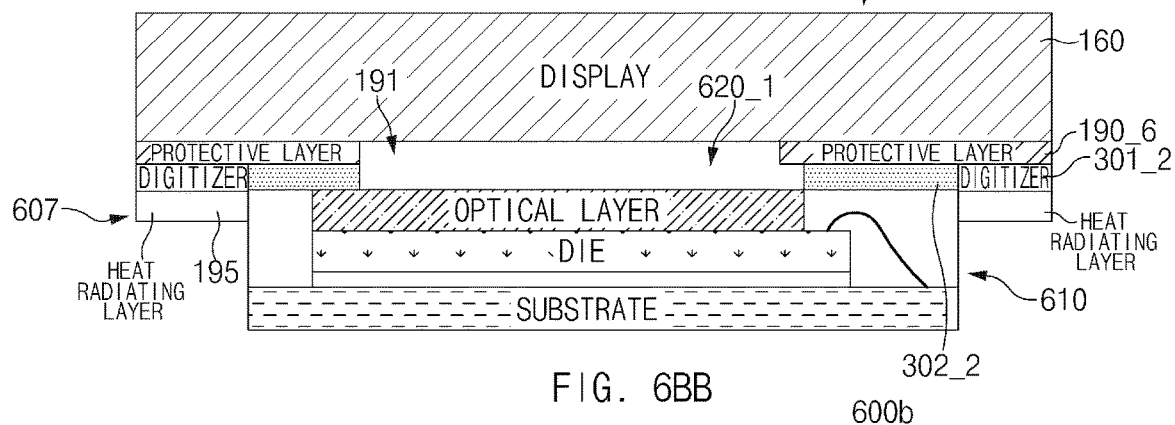
Figure 6B:
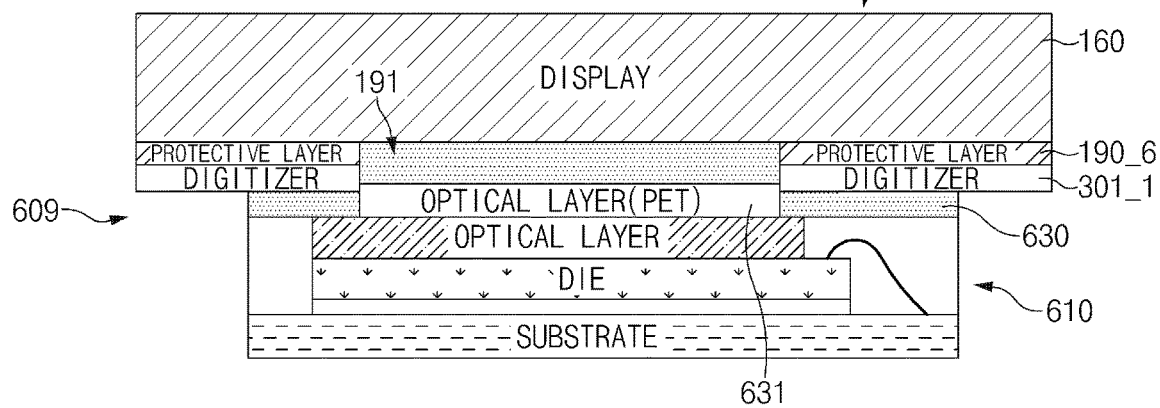

FIGS. 6BA, 6BB, and 6BC are views illustrating a fingerprint sensor disposition structure of an electronic device according to an embodiment of the present disclosure.

Referring to FIGS. 6BA, 6BB, and 6BC, a configuration of an electronic device 600b may include a display 160, a protective layer 190_6, a digitizer 301_1, a bonding layer 302_1, and a fingerprint sensor 610 (e.g., the fingerprint sensor 180). The protective layer 190_6 and the digitizer 301_1 may be included in the above-described rear panel. Additionally or alternatively, a heat radiating layer 195 (e.g., copper/graphite (Cu/Gr)) may be further disposed under the digitizer 301_1. The protective layer 190_6 may be separated to be disposed at an independent location. For example, a portion (e.g., an embossing layer) of the protective layer 190_6 may be disposed on the digitizer 301_1, and another portion (e.g., a cushion layer) of the protective layer 190_6 may be disposed between a lower portion of the digitizer 301_1 and the heat radiating layer 195.

The drawing illustrates only a portion including the sensor disposition area 191 related to sensing of a fingerprint, and as already described above with reference to FIG. 6AA, additionally or alternatively, the electronic device 600b may further include a bracket having a recess in which the fingerprint sensor 610 is accommodated, a printed circuit board in which a processor that supplies a signal related to driving of the fingerprint sensor 610 is accommodated, a battery that supplies electric power, and a rear cover.

According to various embodiments of the present disclosure, as in FIG. 6BA in state 605, the fingerprint sensor 610 may have an air gap 620 between the display 160 and the fingerprint sensor 610 (e.g., at least one portion of the sensor disposition area 191 or at least one portion of the opening of the rear panel provided in the sensor disposition area 191). The fingerprint sensor 610, for example, may include an optical layer 610_1, a die 610_2, a sensor bonding layer 610_3, a substrate 610_4, and a sensor case 610_6. The optical layer 610_1 may include a lens (e.g., micro array lens) layer that receives light related to sensor of a fingerprint and/or an optical filter layer. The die 610_2 may include a semiconductor (e.g., a photodiode array) that, after converting the light collected by the optical layer 610_1, delivers the electrical signal to the substrate 610_4. The sensor bonding layer 610_3 may affix the die 610_2 to the substrate 610_4. The substrate 610_4 may deliver an electrical signal delivered from the die 610_2 to a component (e.g., a processor). In this case, one or more signal lines are disposed on the substrate 610_4, and the signal lines may be connected (e.g., wire-bonded) to the die 610_2 through leads 610_5. The sensor case 610_6 may be a structure that surrounds the optical layer 610_1 and the die 610_2, and may be formed of non-conductive materials (e.g., a plastic structure, a polymer structure or epoxy). Upper and lower sides of the sensor case 610_6 may be opened to have a passage adapted such that light related to sensing of a fingerprint may be received through the upper side of the sensor case 610_6 and an electrical signal for the sensed light may be delivered to the substrate 610_4 may be delivered to the lower side of the sensor case 610_6.

The display 160 may have a configuration that is the same as or similar to the display described above with reference to FIG. 3A. For example, the display 160 may include an external protective layer including glass, an optical bonding layer, a polarizer layer, a touch panel, an optical bonding layer, and a display panel. Additionally, at least one portion of the display 160 may further include a design layer. A hole related to sensing of a fingerprint may be formed at a lower portion of one side of the display 160, and a protective layer 190_6 aligned with the sensor disposition area 191, the digitizer 301_1, the heat radiating layer 195, and the bonding layer 302_1 may be disposed.

The protective layer 190_6, for example, may include an embossing layer or a cushion layer, and may include a hole of a specified size formed in an area corresponding to the sensor disposition area 191. A configuration (e.g., the embossing layer) of the protective layer 190_6 may be disposed under the display to minimize a distance between the fingerprint sensor 610 and the display 160, and the remaining layers (e.g., the cushion layer) may be disposed under the digitizer 301_1. Further, the electronic device may further include a heat radiating layer 195, and the heat radiating layer 195 may be positioned under the digitizer 301_1. A cushion layer may be further disposed under the heat radiating layer 195. Further, the heat radiating layer 195 may be disposed in parallel to the bonding layer 302_1.

The digitizer 301_1 may be disposed under the protective layer 190_6, and may include a hole of a specified size formed in an area corresponding to the sensor disposition area 191. The hole disposed in the digitizer 301_1 may be aligned with and disposed vertically with respect to the hole formed in the protective layer 190_6. The bonding layer 302_1 may be disposed between the digitizer 301_1 and a peripheral area of the fingerprint sensor 610, and the fingerprint sensor 610 may be affixed to a lower portion of the digitizer 301_1. The bonding layer 302_1 may have a band shape having an empty area at the center thereof. Accordingly, an air gap 620 may be formed in the sensor disposition area 191 between the lower surface of the display 160 and the upper surface of the fingerprint sensor 610. The air gap 620 is an area in which air is disposed as a medium, and may be operated such that more light related to a fingerprint may be provided to the fingerprint sensor 610 while the light reflected to the surface of the fingerprint positioned on the display 160 are scattering through the air gap 620. For example, when the display 160 and the optical layer 610_1 of the fingerprint sensor 610 directly contact each other, light that travels from the display 160 towards the fingerprint sensor 610 may be significantly reflected on a contact surface of the two objects due to a difference between the permittivity of the media of the objects. The air gap 620 may reduce the abrupt difference between the permittivity of the display 160 and the fingerprint sensor 610, and thus reduces reflectivity on the contact surface of the display 160 and the fingerprint sensor 610 to increase the light that enters the fingerprint sensor 610.

In the electronic device 600b having the above-described structure, if at least some pixels of the display 160 disposed on the sensor disposition area 191 or at least some pixels of the sensor disposition area 191 and an area of the display 160, which is adjacent to the sensor disposition area 191 within a specified distance emit light of a specified color (e.g., a white color or a green color), the light reflected from a surface of the fingerprint in contact with an upper portion of the display 160 may pass through the display 160 of the sensor disposition area 191, pass the air gap 620, and be delivered to the fingerprint sensor 610.

According to various embodiments of the present disclosure, as in FIG. 6BB in state 607, the electronic device 600b may have a structure in which the protective layer 190_6 having a hole corresponding to the sensor disposition area 191 is disposed under the display 160, the digitizer 301_2, the heat radiating layer 195, and the bonding layer 302_2 are disposed under the protective layer 190_6, and the fingerprint sensor 610 is disposed under the bonding layer 302_2. In this case, the digitizer 301_2 may have a hole corresponding to the size of one surface (e.g., an upper surface) of the fingerprint sensor 610. The heat radiating layer 195 included in the above-described rear panel may be further disposed under the digitizer 301_2. The fingerprint sensor 610 in state 607 may include an optical layer, a die, a sensor bonding layer, a substrate, and a sensor case as described above with reference to FIG. 6BA in state 605.

The bonding layer 302_2 may be disposed in the same layer as the digitizer 301_2, and may directly bond the protective layer 190_6 and the fingerprint sensor 610. Accordingly, an air gap 620_1 having a specified thickness may be formed in the sensor disposition area 191 between the lower surface of the display 160 and the fingerprint sensor 610. The thickness of the air gap 620_1, for example, may have a thickness including the thickness of the protective layer 190_6 and the bonding layer 302_2 (or the digitizer 301_2). The thickness of the air gap 620_1 is a thickness that is operated when light enters the fingerprint sensor 610 from the display 160, and may be designed to have a thickness of the protective layer 190_6 and the bonding layer 302_2 based on the optical characteristics of the fingerprint sensor 610 as described above with reference to FIG. 6BB in state 607 or to have the thickness of the protective layer, the digitizer, and the bonding layer as described above with reference to FIG. 6BA in state 605.

The size of the hole at the center of the bonding layer 302_2 may have a size that is not less than the size of the hole of the rear panel 190.

According to various embodiments of the present disclosure, as in FIG. 6BC in state 609, the electronic device 600b may have a structure in which the protective layer 190_6 having a hole corresponding to the sensor disposition area 191 is disposed under the display 160, the digitizer 301_1 is disposed under the protective layer 190_6, and the fingerprint sensor 610 is disposed under the digitizer 301_1, and the optical bonding layer 630 may be disposed between the display 160 and the fingerprint sensor 610. The digitizer 301_1 may have a size that is the same as or similar to the size of the hole of the area corresponding to the sensor disposition area 191 of the rear panel 190, and may have a hole arranged vertically with respect to the hole of the protective layer 190_6. The interior of the hole of the protective layer 190_6 and the interior of the hole of the digitizer 301_1 may be filled with a portion of the optical bonding layer 630. The optical bonding layer 630 may be disposed under a periphery of the area in which the hole of the digitizer 301_1 is formed to have a specified thickness to affix the fingerprint sensor 610 to the digitizer 301_1. The optical layer (PET) 631 may be disposed in the optical bonding layer 630. The upper surface of the optical layer 631 may contact one side of the lower surface of the display 160, and a portion of the lower surface of the optical layer 631 may contact the upper surface (e.g., the optical layer) of the fingerprint sensor 610. At least one portion of the optical bonding layer 630 may be disposed between the display 160 of the sensor disposition area 191 and the fingerprint sensor 610. Accordingly, the optical layer 631 may have a vertical width including the thickness of the protective layer 190_6, the thickness of the digitizer 301_1, and a spacing distance between the digitizer 301_1 and the fingerprint sensor 610. The optical layer 631 is operated as a medium having a permittivity that is different from those of the display 160 and the fingerprint sensor 610, and accordingly, may function to affix the protective layer 190_6, the digitizer 301_1, and the fingerprint sensor 610 while being operated such that more light may enter the fingerprint sensor 610 from the display 160. The heat radiating layer 195 (As shown FIG. 6BA or 6BB) included in the above-described rear panel 190 may be further disposed under the digitizer 301_1.

Figure 6C:
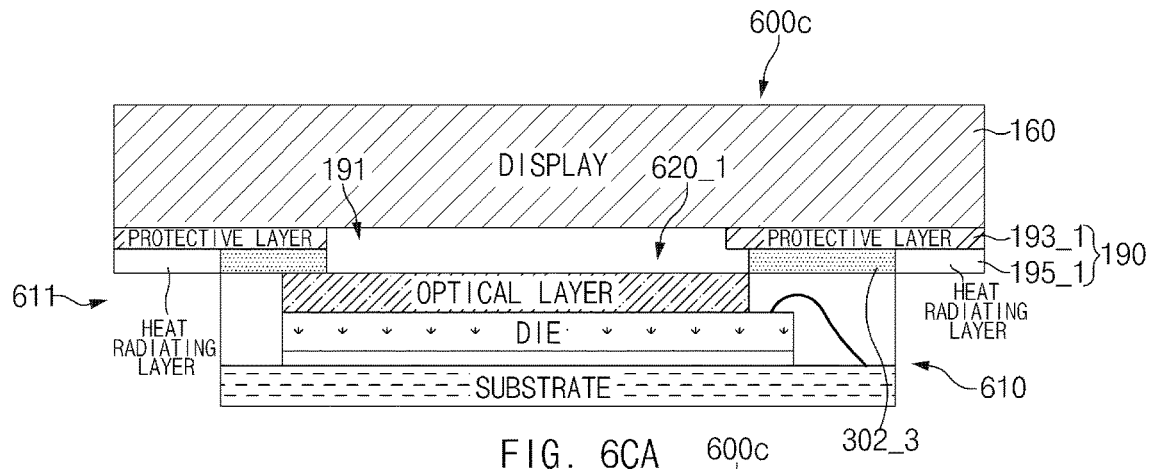
FIGS. 6CA, 6CB, and 6CC are views illustrating a fingerprint sensor disposition structure of an electronic device according to an embodiment of the present disclosure.
Figure 6C:
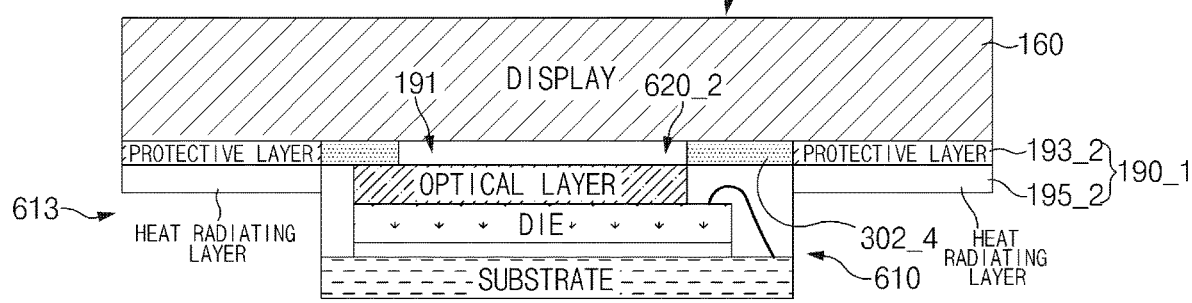
Figure 6C:
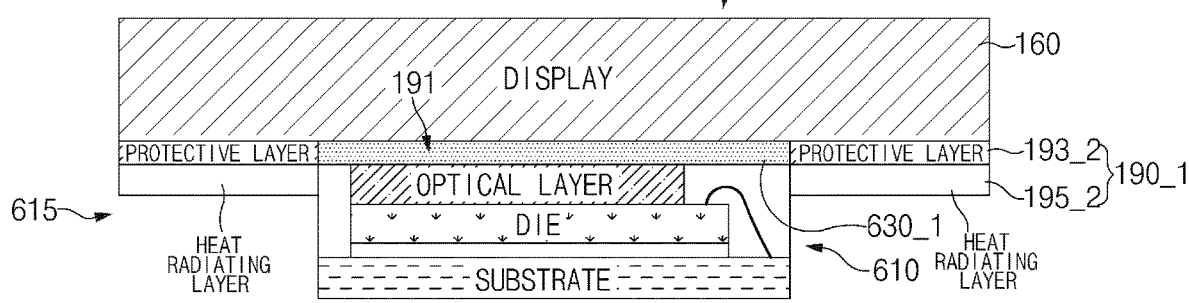

FIGS. 6CA, 6CB, and 6CC are views illustrating a fingerprint sensor disposition structure of an electronic device 600c according to an embodiment of the present disclosure.

Referring to FIGS. 6CA, 6CB, and 6CC, a configuration of the electronic device 600c may include a display 160, a rear panel 190 (e.g., the protective layers 193_1 and 193_2 and the heat radiating layers 195_1 and 195_2), bonding layers 302_3 and 302_4, and a fingerprint sensor 610 (e.g., the fingerprint sensor 180). Additionally or alternatively, the electronic device 600c may include an optical bonding layer 630_1 disposed between the display 160 and the fingerprint sensor 610. The protective layers 193_1 and 193_2 may be separated to be disposed at different locations. For example, the protective layers 193_1 and 193_2 (e.g., embossing layers) may be disposed on the heat radiating layers 195_1 and 195_2, respectively, and a support layer (e.g., a cushion layer) may be disposed under the heat radiating layers 195_1 and 195_2, respectively.

FIGS. 6CA, 6CB, and 6CC illustrate only a portion of the sensor disposition area 191 related to sensing of a fingerprint, and as described above in FIG. 6AA, additionally or alternatively, the electronic device 600c may further include a bracket having a recess in which the fingerprint sensor 180 is accommodated, a printed circuit board in which a processor that supplies a signal related to driving of the fingerprint sensor 610 is accommodated, a battery that supplies electric power, and a rear cover.

According to various embodiments of the present disclosure, as in FIG. 6CA in state 611, the display 160 may include a configuration that is the same as or similar to the display described above with reference to FIGS. 6AA, 6AB, and 6AC or with reference to FIGS. 6BA, 6BB, and 6BC. For example, the display 160 may include at least one of an external protective layer including glass, an optical bonding layer, a polarizer layer, a touch panel, an optical layer, a display panel, and a design layer. A hole related to sensing of a fingerprint may be formed at a lower portion of one side of the display 160, and a rear panel 190 and a fingerprint sensor 610 may be disposed.

The rear panel 190, for example, may include at least one layer of the protective layer 193_1 and the heat radiating layer 195_1, and may include a hole of a specified size formed in an area corresponding to the sensor disposition area 191. For example, the hole formed in the rear panel 190 may have a size that is not more than the size of the front surface of the optical layer of the fingerprint sensor 610. A bonding layer 302_3 may be disposed between one side of the rear panel 190 and a peripheral area of the fingerprint sensor 610. Accordingly, the fingerprint sensor 610 may be affixed to a lower portion of the rear panel 190. The bonding layer 302_3 may have a band shape having an empty area at the center thereof. The size of the inner hole of the bonding layer 302_2, for example, may have a size that is not less than the size of the hole of the rear panel 190. Accordingly, an air gap 620_1 of a specified thickness may be formed in the sensor disposition area 191 between the lower surface of the display 160 and the upper surface of the fingerprint sensor 610. For example, the air gap 620_1 may have a thickness including a thickness of the protective layer 193_1 and a thickness of the bonding layer 302_3. The sectional area of the air gap 620_1 may become larger as it goes from the display 160 towards the fingerprint sensor 610.

According to various embodiments of the present disclosure, as in FIG. 6CB in state 613, the rear panel 190_1, for example, may include a protective layer 193_2 and a heat radiating layer 195_2, and may include a hole of a specified size corresponding to the fingerprint sensor 610. For example, the hole formed in the rear panel 190_1 may have a size that is not more than the size of the front surface of the fingerprint sensor 610. A bonding layer 302_4 may be disposed at an inner periphery of the hole of the rear panel 190_1. The central portion of the bonding layer 302_4 may have a band shape having an empty area at the center thereof. Accordingly, an air gap 620_2 corresponding to the thickness of the bonding layer 302_4 may be formed between the display 160 and the fingerprint sensor 610.

According to various embodiments of the present disclosure, as in FIG. 6CC in state 615, an optical bonding layer 630_1 may be disposed between the display 160 and the fingerprint sensor 610. The optical bonding layer 630_1 may be uniformly distributed on a front surface of an upper portion of the fingerprint sensor 610. The rear panel 190_1 may include a protective layer 193_2 and a heat radiating layer 195_2. The rear panel 190_1 may include a hole formed in an area corresponding to the sensor disposition area 191 and having a size that is not less than the size of the front surface of the fingerprint sensor 610. Accordingly, the fingerprint sensor 610 may be positioned in the interior of the rear panel 190_1. Accordingly, the hole of the rear panel 190_1 may surround a peripheral part of the fingerprint sensor 610. As compared with a state in which the display 160 and the fingerprint sensor 610 directly contact each other, the optical bonding layer 630_1 may be operated such that more light may enter the fingerprint sensor from the display 160 (or light reflection rate may be reduced).

The fingerprint sensor 610 described above with reference to FIG. 6CA in state 611, FIG. 6CB in state 613, and FIG. 6CC in state 615, as described above in FIGS. 6BA, 6BB, and 6BC may include an optical layer, a die, a sensor bonding layer, a substrate, and a sensor case.

Figure 7:
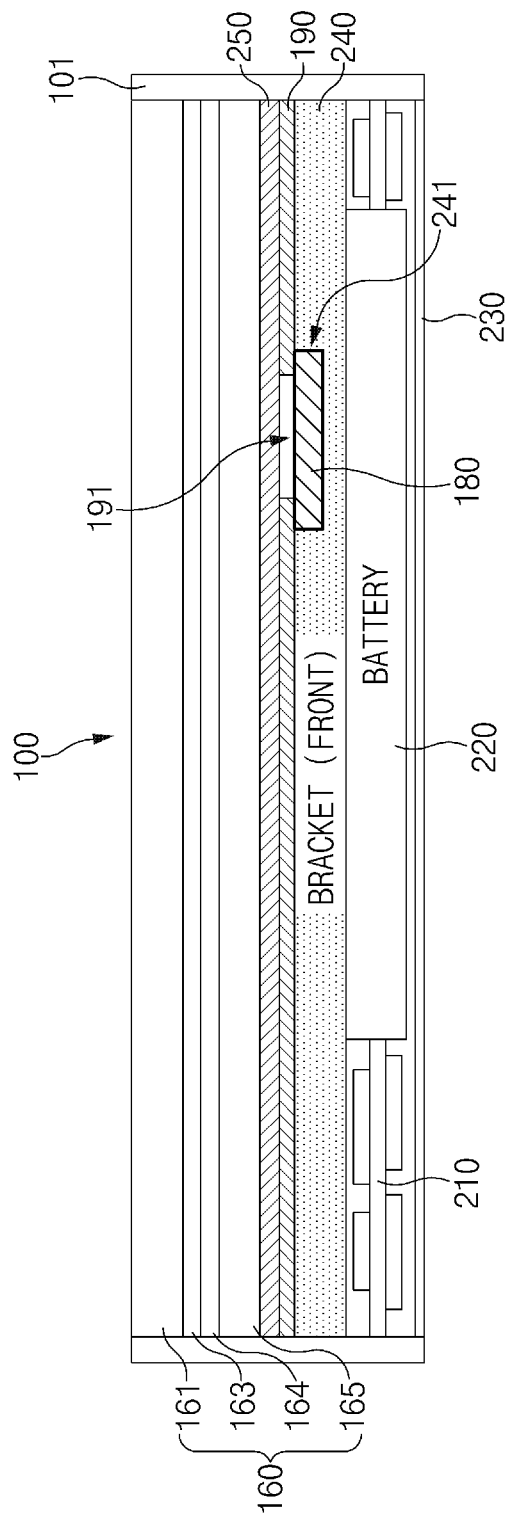
FIG. 7 is a view illustrating a disposition of a wavelength selection substrate of an electronic device according to an embodiment of the present disclosure.

FIG. 7 is a view illustrating a disposition of a wavelength selection substrate of an electronic device 100 according to an embodiment of the present disclosure.

Referring to FIG. 7, the electronic device 100 may include a case 101, a display 160, a wavelength selection substrate 250 a rear panel 190, a fingerprint sensor 180, a bracket 240, a printed circuit board 210, a battery 220, and a rear cover 230. The wavelength selection substrate 250 may be selectively applied based on a change in a design method. For example, the wavelength selection substrate 250 may be removed, and a disposition location thereof may be changed. The wavelength selection substrate 250 may be locally disposed in an area that is smaller than the display 160 (e.g., the wavelength selection part 251 in FIG. 8), and additional information, for example, is described below with reference to FIGS. 8 and 9A.

As described above, the display 160 may include an external protective layer 161, a bonding layer 163 (e.g., an OCA), a polarizer layer 164, and a display panel 165. At least one portion (e.g., a fingerprint authentication area in which the fingerprint sensor 180 is disposed) of the above-described display 160 may be transparent. Light radiated from at least one pixel (e.g., pixels disposed in the fingerprint authentication area or pixels disposed in an area of a specified size including the fingerprint authentication area) included in the display panel 165 of the display 160 may be introduced into the fingerprint sensor 180 after passing through the interior of the transparent display 160.

The wavelength selection substrate 250 may be disposed under the display panel 165 of the display 160. For example, the wavelength selection substrate 250 may be disposed on a whole lower area (or a whole lower area of an active area of the display panel 165, in which pixels are disposed) of the display panel 165. The wavelength selection substrate 250 may include a substrate adapted to transmit a specified frequency band of a frequency spectrum of light radiated from a light source. At least a partial layer of the wavelength selection substrate 250 may include an optical filter layer that may selectively transmit only light of a specified wavelength band (e.g., a permittivity of a specified wavelength of about 90% or more). The optical filter layer may be flexibly or rigidly constituted to have a thickness of 0.15 t ("t" means "millimeter") by using an optical passive element that passes only light of a specified wavelength. The optical filter layer, for example, be glass, plastic (e.g., polyethylene terephthalate (PET)), a film, a dielectric thin film filter (TFT), or a liquid material (e.g., a black ink layer that may pass light (e.g., near infrared (NIR) ray of a specified band).

According to an embodiment of the present disclosure, the wavelength selection substrate 250 may transmit at least some frequency bands (or wavelength bands) corresponding to a visible ray band, a visual ray band, and an infrared ray band. For example, the wavelength selection substrate 250 may transmit a wavelength band of 500 nm to 800 nm, a wavelength band of a transmissivity of 3% or more, or a frequency band of the green series (e.g., a wavelength of about 490 nm to 570 nm). Further, the wavelength selection substrate 250 may transmit even frequencies (e.g., red light having a wavelength of about 650 nm to 780 nm or NIR having a wavelength of about 780 nm to 1100 nm) corresponding to colors located on the left and right sides of the frequencies of green series in a range. The rear panel 190 disposed under the wavelength selection substrate 250 includes a sensor disposition area 191 (e.g., a hole), and accordingly, light of a specified frequency band, which has passed through the wavelength selection substrate 250, may be delivered to the fingerprint sensor 180 through the sensor disposition area 191. As described above, the wavelength selection substrate 250 may be omitted. Further, a location of the wavelength selection substrate 250 may be changed to another location.

The rear panel 190 may be disposed under the wavelength selection substrate 250 and may include a sensor disposition area 191. The fingerprint sensor 180 may be disposed under the sensor disposition area 191. Through the sensor disposition area 191, the fingerprint sensor 180 may collect at least one portion of the light passing through the display 160.

The fingerprint sensor 180 may be disposed under the rear panel 190, and as illustrated, may be disposed in a sensor accommodating area 241 provided on one side of the bracket 240. At least one portion (e.g., the light receiving unit or the light emitting unit and the light receiving unit that may collect light) of the fingerprint sensor 180 may be exposed through the sensor disposition area 191 of the rear panel 190.

The bracket 240 is disposed under the rear panel 190 to support the rear panel 190, the display 160, and the like. The printed circuit board 210 may be disposed under the bracket 240, and may be electrically connected to the display 160 and the fingerprint sensor 180. A processor related to driving the display 160 and the fingerprint sensor 180 may be accommodated in the printed circuit board 210. The battery 220 may be disposed in a layer that is under the bracket 240 and parallel to the printed circuit board 210. The rear cover 230 may surround the printed circuit board 210, the battery 220, and the like.

As described above, in the electronic device 100, the wavelength selection substrate 250 may be disposed at at least one portion of (in a specified area or in the whole lower area) of the display 160 to reduce the amount of light of an unintended frequency band, which is introduced into the fingerprint sensor 180, as compared with the case in which the wavelength selection substrate 250 is not disposed.

Figure 8:
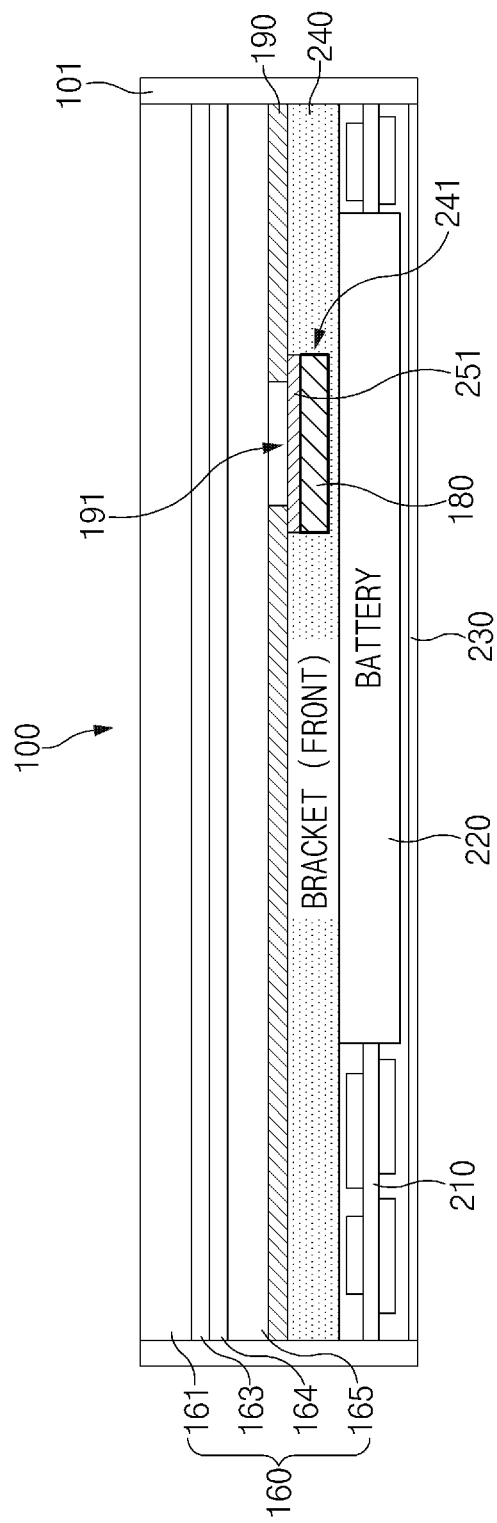
FIG. 8 is a view illustrating a disposition of a wavelength selection substrate of an electronic device according to an embodiment of the present disclosure.

FIG. 8 is a view illustrating a disposition of a wavelength selection substrate of an electronic device 100 according to an embodiment of the present disclosure.

Referring to FIG. 8, the electronic device 100 may include a case 101, a display 160 (e.g., external protective layer 161, a bonding layer 163 (e.g., an OCA), a polarizer layer 164, and a display panel 165), a rear panel 190, a wavelength selection unit 251, a fingerprint sensor 180, a bracket 240, a printed circuit board 210, a battery 220, and a rear cover 230. The display 160, the rear panel 190, the printed circuit board 210, the battery 220, and the rear cover 230 may have the same configurations as those of FIG. 4 described above. The wavelength selection part 251 may have the same material, thickness, or optical characteristics (e.g., by which light of a specified wavelength band mainly passes the wavelength selection substrate 250 in FIG. 7 described above), may have a size that is the same as or similar to the size of the fingerprint sensor 180, and may be disposed on the fingerprint sensor 180. Further, the wavelength selection part 251 may have a size that is similar to or the same as the size of the sensor disposition area 191.

The fingerprint sensor 180, in which the wavelength selection unit 251 is disposed on the front surface thereof, may be disposed on one side of the bracket 240. For example, the fingerprint sensor 180 may be disposed in a sensor accommodating area 241 provided in the bracket 240.

The bracket 240 may include a sensor accommodating area 241 disposed under the rear panel 190 and in which the fingerprint sensor 180 is accommodated on one side thereof. The depth of the sensor accommodating area 241 may have a height corresponding to the heights of the fingerprint sensor 180 and the wavelength selection unit 251. In order to affix the fingerprint sensor 180 to the sensor accommodating area 241, a bonding layer may be disposed in at least an area between an inner wall of the sensor accommodating area 241 and the fingerprint sensor 180.

Figure 9A:
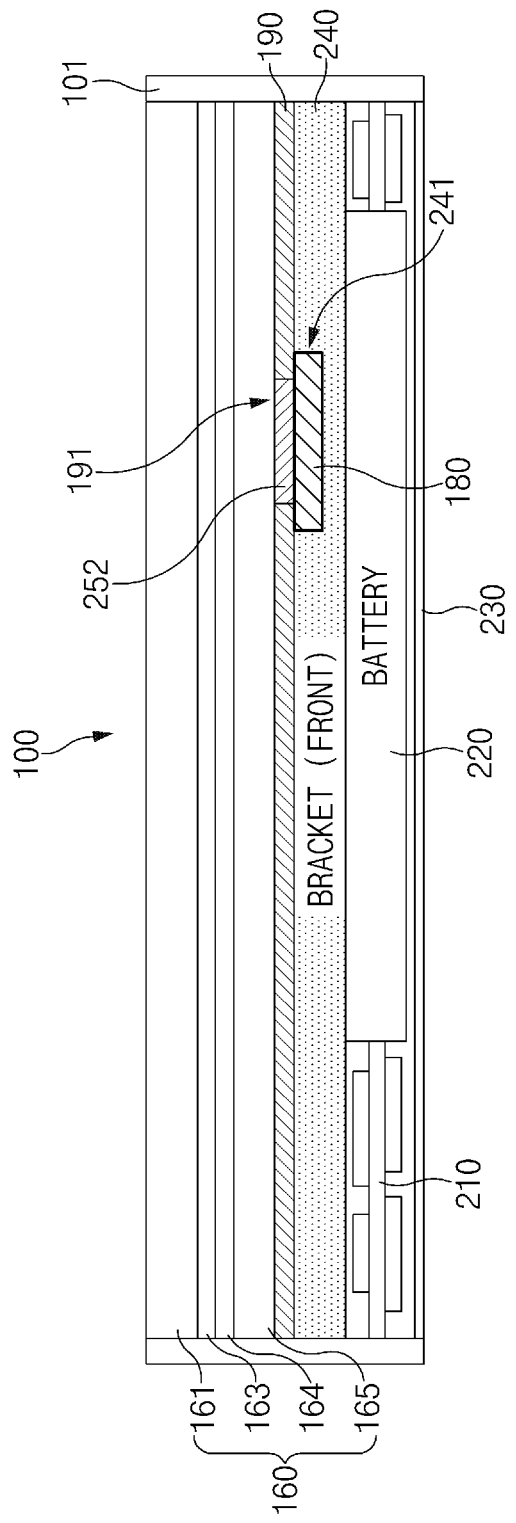
FIG. 9A is a view illustrating a disposition of a wavelength selection substrate of an electronic device according to an embodiment of the present disclosure.

FIG. 9A is a view illustrating a disposition of a wavelength selection substrate of an electronic device 100 according to an embodiment of the present disclosure.

Referring to FIG. 9A, the electronic device 100 may include a case 101, a display 160 (e.g., external protective layer 161, a bonding layer 163 (e.g., an OCA), a polarizer layer 164, and a display panel 165), a rear panel 190, a wavelength selection unit 252, a fingerprint sensor 180, a bracket 240, a printed circuit board 210, a battery 220, and a rear cover 230. The display 160, the rear panel 190, the bracket 240, the printed circuit board 210, the battery 220, and the rear cover 230 may have the same configurations as those of FIG. 4 described above.

The rear panel 190 may be disposed under the display 160 to protect the display 160 or emit heat generated by the display 160. The rear panel 190 may include a sensor disposition area 191 (e.g., a hole) such that the fingerprint sensor 180 faces the display 160.

The wavelength selection part 252 may have the same material, thickness, or optical characteristics (e.g., by which light of a specified wavelength band mainly passes the wavelength selection substrate 250 in FIG. 7 described above), and may be disposed on one side of the sensor disposition area 191. For example, the wavelength selection unit 252 may be disposed parallel to the rear panel 190 while being inserted into the sensor disposition area 191. The wavelength selection unit 252 may have a size corresponding to the size of the sensor disposition area 191. The wavelength selection unit 252 may be affixed to the sensor disposition area 191. The size of the sensor disposition area 191 may be substantially the same as, larger than (e.g., about 20% larger than the size of the front surface of the fingerprint sensor 180), or smaller (e.g., about 50% to 100% smaller than the size of the front surface of the fingerprint sensor) than the size of the front surface of the fingerprint sensor 180. The fingerprint sensor 180 may be disposed under the sensor disposition area 191 in which the wavelength selection unit 252 is disposed. The fingerprint sensor 180 may be accommodated in the sensor accommodating area 241 of the bracket 240. Accordingly, if light is radiated from a pixel of the display 160, a portion of the light radiated from the pixel, which corresponds to a frequency of a specified band (e.g., green light having a wavelength of about 490 nm to 570 nm, red light having a wavelength of about 650 nm to 780 nm, or NIR having a wavelength of about 780 nm to 1100 nm) while passing through the wavelength selection unit 252 disposed in the sensor disposition area 191. Some light may be delivered to a light receiving unit of the fingerprint sensor 180.

Figure 9B:
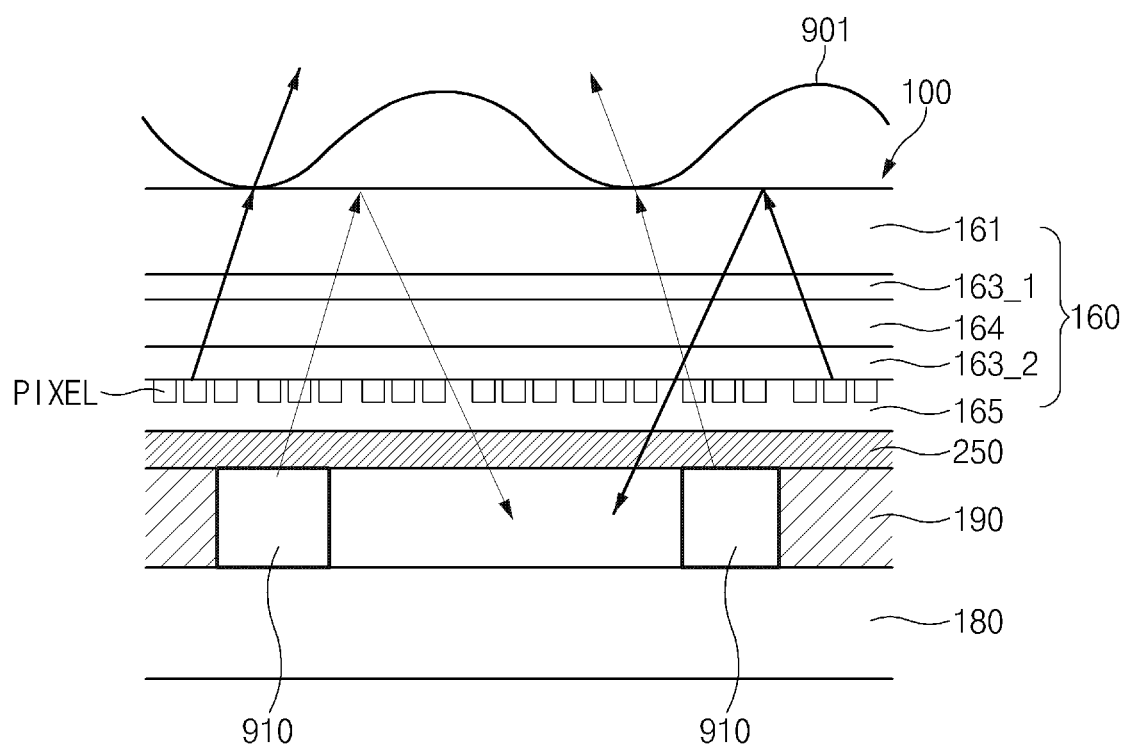
FIG. 9B is a view illustrating a light path related to fingerprint authentication according to an embodiment of the present disclosure.

FIG. 9B is a view illustrating a light path related to fingerprint authentication according to an embodiment of the present disclosure.

Referring to FIG. 9B, while an object 901 (e.g., a finger) including a fingerprint is positioned at a specified point (e.g., an external protective layer 161) on the display 160 of the electronic device 100, the light generated by at least one pixel of the display panel 165 may be radiated upwards with respect to FIG. 9B. The travel direction of light of the light radiated upwards, which collides with the object 901, may be changed. For example, light of the light radiated from the pixel, which is reflected by the object 901, may travel to an area in which the fingerprint sensor 180 is located. Then, the light reflected by the object 901 may pass through a first bonding layer 163_1, the polarizer layer 164, a second bonding layer 163_2, and the display panel 165, and may be delivered to the fingerprint sensor 180 through a wavelength selection layer (e.g., the wavelength selection substrate 250 in FIG. 7 or the wavelength selection units 251 or 252 in FIGS. 8 and 9A, respectively, described above) and the sensor disposition area 191 of the rear panel 190. In this process, light (e.g., a noise source) of a wavelength band, which is not used for sensing a fingerprint, of the light radiated from the pixel is filtered by the wavelength selection substrate 250, and only light of a wavelength used for sensing a fingerprint may be delivered by the fingerprint sensor 180. If the light emitting unit 910 is disposed in the fingerprint sensor 180 and a wavelength selection substrate 250 is disposed on the fingerprint sensor 180, light of a wavelength band other than a specified wavelength band is reduced while light radiated from the light emitting unit 910 passes through the wavelength selection substrate 250 and is then reflected and received by the fingerprint area.

Figure 10:
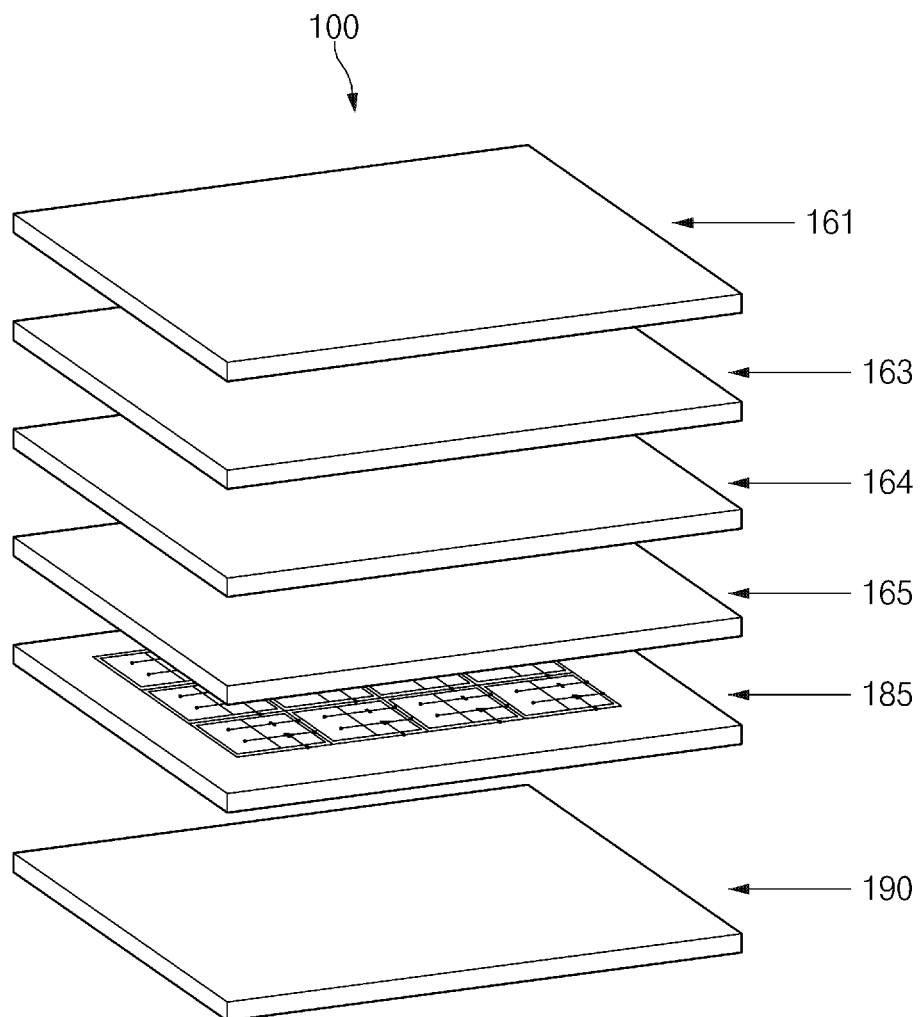
FIG. 10 is an exploded perspective of an electronic device including a fingerprint sensor sheet according to an embodiment of the present disclosure.

FIG. 10 is an exploded perspective view of an electronic device including a fingerprint sensor sheet according to an embodiment of the present disclosure.

Referring to FIG. 10, an electronic device 100 may include an external protective layer 161, a bonding layer 163, a polarizer layer 164, a display panel 165, a fingerprint sensor sheet 185 (e.g., a complementary metal oxide semiconductor (CMOS) image sensor layer) in which a plurality of fingerprint sensors designed to sense a fingerprint in an area are disposed, and a rear panel 190. Additionally, the electronic device 100 may further include a bracket disposed under the rear panel 190, a printed circuit board, a battery, and a rear cover. The external protective layer 161, the bonding layer 163, the polarizer layer 164, the display panel 165, and the rear panel 190 may have substantially the same or similar configurations as those of FIG. 2 described above.

The fingerprint sensor sheet 185 may radiate and receive light related to recognition of a fingerprint of a user in a wider area than the above-described fingerprint sensor 180. In this case, the fingerprint sensor sheet 185 may include a form in which a plurality of fingerprint sensors are disposed in an area having a size that is the same as or similar to the size of the display 160. The fingerprint sensor sheet 185 may be laminated under the display panel 165. The fingerprint sensor sheet 185 may collect light related to detecting a fingerprint in at least an area of the whole sheet. The fingerprint sensor sheet 185 may collect light radiated from a light source and reflected by a part (e.g., a finger) of a body of a user, may generate image information corresponding to a fingerprint image based on the collected light, and may store the image information in an internal memory (or a buffer) of the fingerprint sensor 180 such that the image information may be used by a processor. The fingerprint sensor sheet 185 may collect light reflected after being radiated from the pixels of the display 160, and may produce image information corresponding to a fingerprint image based on the collected light to store the produced image information in an internal memory (or a buffer) of the fingerprint sensor 180. In a process of acquiring the fingerprint image, the fingerprint sensor sheet 185 may collect information on a location on the display at which a fingerprint image is acquired, and may store the collected location information together, for example, the fingerprint sensor sheet 185 may acquire image information of an area corresponding to an area touched by a finger or the like corresponding to control of a processor of an electronic device, and may store the acquired image information in a memory such that the image information may be used by the processor. In this case, the fingerprint sensor sheet 185 may acquire and store an image of, for example, a finger related to a fingerprint authentication operation, and accordingly, the processor may help determine an approach of the finger at least partially based on the images. When the processor designates a fingerprint authentication area, the fingerprint sensor sheet 185 may acquire image information acquired only from the corresponding area and provide the image information to the processor. If the processor identifies an area in which the touch sensor included in the display 160 senses a touch of a finger, the fingerprint sensor sheet 185 may acquire image information in the corresponding touch area in correspondence to control of the processor. After acquiring information corresponding to a fingerprint image, information corresponding to a fingerprint image, or location information corresponding to a finger or a fingerprint, the fingerprint sensor sheet 185 (e.g., the fingerprint sensor 180) may deliver at least one portion of the acquired information to the processor.

Figure 11A:
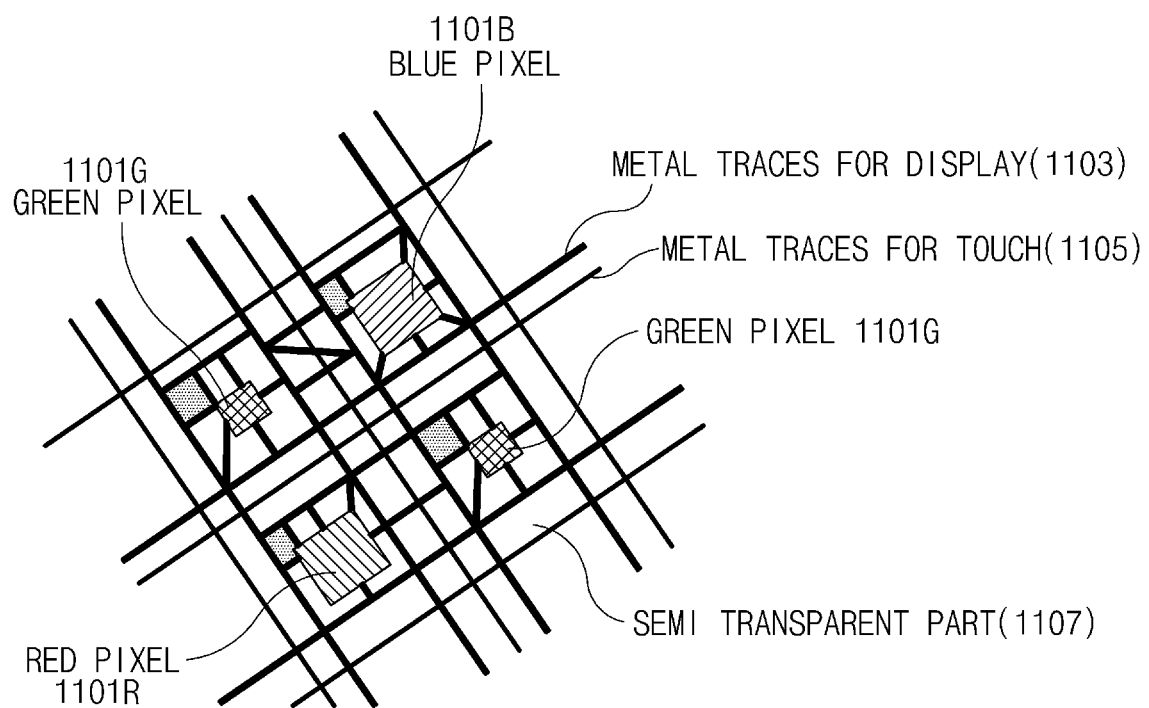
FIG. 11A is a view illustrating a pixel structure of an electronic device according to an embodiment of the present disclosure.
Figure 11B:
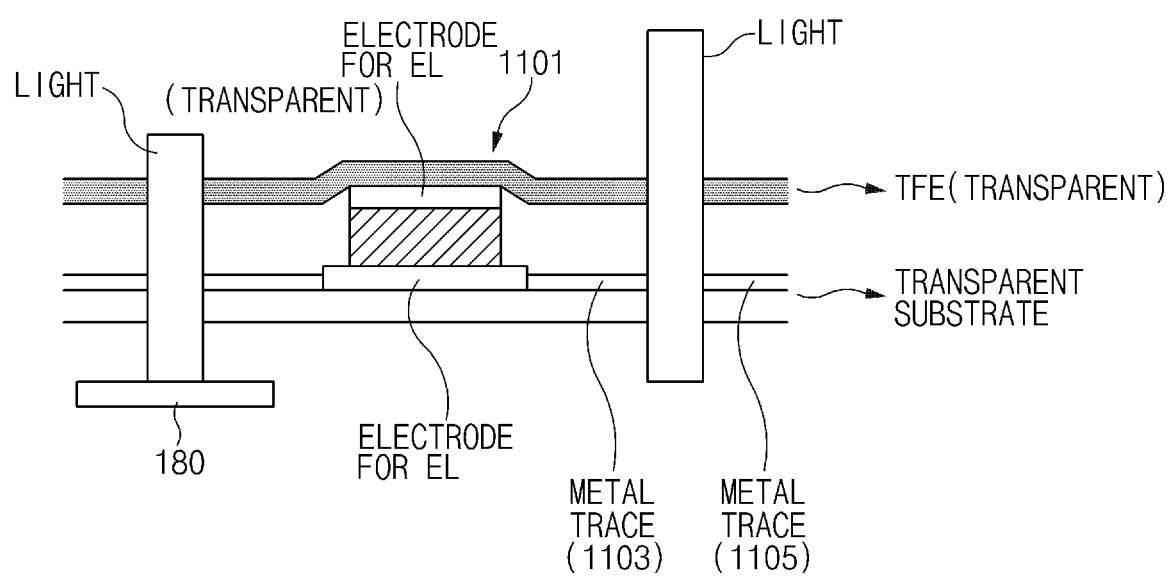
FIG. 11B is a view illustrating a fingerprint sensor in a pixel structure of an electronic device according to an embodiment of the present disclosure.

FIG. 11A is a view illustrating a pixel structure of an electronic device according to an embodiment of the present disclosure. FIG. 11B is a view illustrating a fingerprint sensor in a pixel structure of an electronic device according to an embodiment of the present disclosure.

Referring to FIGS. 11A and 11B, the pixel structure of a display (e.g., display 160 described above), for example, may include a plurality of sub-pixels 1101R, 1101G, and 1101B, signal lines 1103 and 1105 connecting the sub-pixels 1101R, 1101G, and 1101B, and semi-transparent areas 1107 having a specified transparency. For example, the plurality of sub-pixels 1101R, 1101G, and 1101B may include a red sub-pixel 1101R, a blue sub-pixel 1101B, and a green sub-pixel 1101G. The red sub-pixel 1101R, the blue sub-pixel 1101B, and the two green sub-pixel 1101G may be operated as one pixel.

The signal lines 1103 and 1105, for example, may be a display line for controlling radiating light by the sub-pixels, and a touch line related to sensing of a touch, accordingly. An area in which the sub-pixels 1101R, 1101G, and 1101B and the signal lines 1103 and 1105 are not disposed may be semi-transparent area 1107. Through the semi-transparent area 1107, light radiated from the sub-pixels 1101R, 1101G, and 1101B may be delivered to a fingerprint sensor 180 disposed on a rear surface of a display. The light of the pixels disposed in the fingerprint authentication area in which the fingerprint sensor 180 is located or the light of the pixels of a peripheral area of the fingerprint authentication area may be introduced to the fingerprint sensor 180 through the transparent area 1107 between the signal lines 1103 and 1105.

Figure 12A:
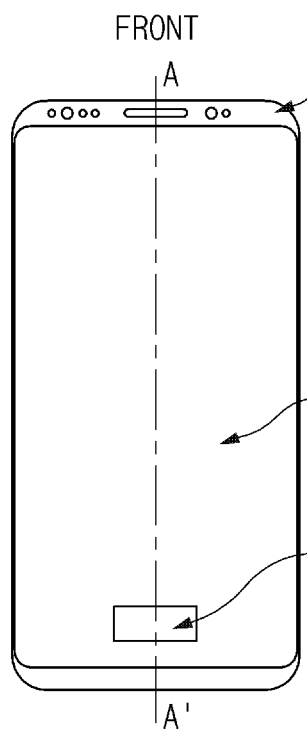
FIGS. 12AA, 12AB, and 12AC are views illustrating changing a touch sensitivity of an electronic device according to an embodiment of the present disclosure.
Figure 12A:
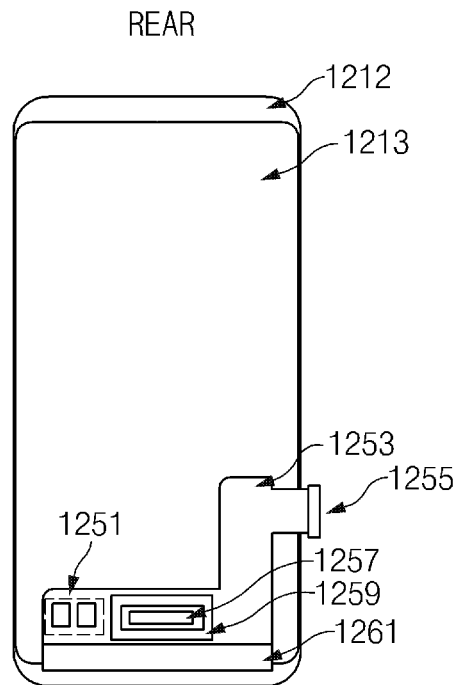
Figure 12A:
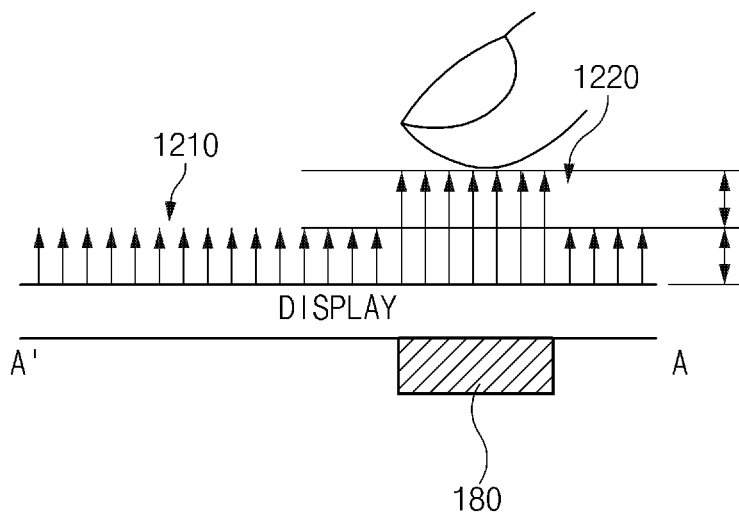

FIGS. 12AA, 12AB, and 12AC are views illustrating changing a touch sensitivity of an electronic device according to an embodiment of the present disclosure.

Referring to FIGS. 12AA, 12AB, and 12AC, the electronic device (e.g., an electronic device 100 described above) may include a display area 1210, a front non-display area 1211, and a fingerprint authentication area 1220 in which the fingerprint sensor 180 for fingerprint authentication is disposed. Further, the electronic device may include a rear non-display area 1212 and a rear area 1213. At least one of the fingerprint sensors 1257 (e.g., the fingerprint sensor 180 and the pressure sensor 1259) may be disposed under a display (e.g., a display 160 described above) of the fingerprint authentication area 1220 of the display area 1210. The size of the fingerprint authentication area 1220 may correspond to a size by which the fingerprint sensor 1257 may verify a fingerprint. For example, when the fingerprint sensor 180 acquires a fingerprint image of a relatively wide area, the size of the fingerprint authentication area 1220 may be defined to be larger. The information of a location at which the fingerprint authentication area 1220 is disposed on the display area 1210 may be stored in a memory of the electronic device to be managed.

The display disposed in the display area 1210 and the fingerprint authentication area 1220 may include a touch sensor. Accordingly, the display area 1210 and the fingerprint authentication area 1220 may collect information on a touch event based on an approach of an object.

A processor of the electronic device may change a color and a brightness of a fingerprint recognition area in correspondence to satisfaction of a specified condition. For example, the processor may change at least one of a color and a brightness of the fingerprint recognition area to a specified form if an object contacts (e.g., touches) an upper side of the display. The fingerprint recognition area is an area on the display corresponding to the sensor disposition area in which the fingerprint sensor 180 related to recognition of a fingerprint, and may include at least an area of external glass under which the fingerprint sensor 180 is disposed, among the area of the display which a fingerprint of the user contacts. The fingerprint recognition area is an area in which the fingerprint of the user contacts an upper side of the display, and the sensor disposition area described in the following may correspond to the fingerprint recognition area and may include an area (e.g., at least one portion of a rear panel or at least one portion of a bracket) in which the fingerprint sensor for recognizing the fingerprint is disposed.

According to various embodiments of the present disclosure, a processor (e.g., the processor 120 described above) may change at least one of a color and a brightness of the fingerprint recognition area after a pressure of a touch is recognized. For example, if a touch input having a pressure of a specified value or more is made on the display, the processor may change at least one of the color and the brightness of the fingerprint recognition area in correspondence to the input. In this regard, a pressure sensor 1259 may be disposed under the fingerprint authentication area 1220 of the display.

According to an embodiment of the present disclosure, if a touch having a pressure of a specified value or more is made while the display is turned off, the processor may convert the electronic device into an insertion state (e.g., supply electrical power to the display 160) and provide an unlock function based on the authentication of the fingerprint. In this operation, the processor may change at least one of a color and a brightness of the fingerprint recognition area or may output a haptic feedback of a specified pattern in correspondence to the pressure touch.

According to various embodiments of the present disclosure, the processor may detect an approach of a finger through touch hovering to improve fingerprint recognition speed, and when the fingerprint approaches the display within a specified distance, may perform a high-luminance mode (or control light emission of a pixel or a light emitting unit such that luminance having a specified value or more may be provided to the fingerprint recognition area). The processor may improve power consumption by not adjusting the brightness of the fingerprint recognition area to a specified color and a specified brightness in relation to the recognition of the fingerprint.

According to various embodiments of the present disclosure, if a specified touch event occurs in a specified area of the display area 1210 or the fingerprint authentication area 1220 while an application related to fingerprint authentication is executed, the processor of the electronic device may change the color and the luminance of the area (or the fingerprint authentication area 1220) in which the touch event occurs to a specified color and a luminance. The specified color may be a color of a wavelength band that is relatively advantageous for fingerprint authentication. If the fingerprint authentication is completed, the processor may restore the color of the area in which the touch event occurs to a color before the occurrence of the touch.

According to an embodiment of the present disclosure, the touch sensor disposed in the fingerprint authentication area 1220 may adjust the touch sensitivity in correspondence to control of the processor. For example, the touch sensitivity of the fingerprint authentication area 1220 may be adjusted more precisely while the fingerprint authentication is requested. In this case, the processor of the electronic device may adjust the touch sensitivity of the whole area of the display more precisely than in the previous state, or may adjust the touch sensitivity of an area including the fingerprint authentication area 1220 more precisely. A hovering signal (or a hovering signal detected as an object approaches the display) generated in the fingerprint authentication area 1220 may be delivered to the processor.

For example, a request for authentication of a fingerprint is made, the electronic device may adjust a touch sensitivity of the entire display more precisely (or higher) to provide a touch hovering state (e.g., a state in which an approach of a finger within a specified distance from a surface of the display may be detected) corresponding to a specified magnitude. Further, the electronic device may provide a state in which a contact (or touch) of a finger with the surface of the display may be detected with higher sensitivity. Further, if a request for authentication of a fingerprint is made, the electronic device may adjust the sensitivity of the pressure sensor. The electronic device may detect whether a touch having a pressure of a specified value is made more minutely, by adjusting the pressure sensor. If a signal (e.g., a touch signal, a pressure signal, and a hovering signal) due to the approach (e.g., a finger touch of a user, a pressure touch having a specified value, or hovering) of an object is generated in the fingerprint authentication area 1220 of the display, the electronic device may change the color and luminance of the fingerprint authentication area 1220 based on the signal. The electronic device may change the color of the fingerprint authentication area 1220 to a color of a specified wavelength band (e.g., at least one of green light of a wavelength of about 490 nm to 570 nm, red light of a wavelength of 650 nm to 780 nm, or NIR of a wavelength of 780 nm to 1100 nm). Further, the electronic device may change the luminance of the fingerprint authentication area 1220 to a specified luminance (e.g., not less than 600 nit). If the hovering signal is removed (or the touch is released or the pressure touch having a pressure of a specified value is released), the electronic device may restore the color of the corresponding area to a color before the generation of the hovering signal (or the touch or the pressure touch). If the hovering signal is removed, the electronic device may restore the luminance of the corresponding area to a luminance before the generation of the hovering signal. When a touch signal is generated in an area in which the hovering signal is generated, the electronic device may maintain the currently displayed color. If the touch signal is released or the fingerprint authentication is completed, the electronic device may restore the touch sensitivity to an original state (a state before the request for the fingerprint authentication). Further, if the touch signal is released or the fingerprint authentication is completed, the electronic device may restore the changed color to a color before the request for the fingerprint authentication.

According to various embodiments of the present disclosure, the processor of the electronic device may adjust the touch sensitivity of the fingerprint authentication area 1220 more precisely than in the peripheral area or than in the previous state. If a specified hovering signal is detected in the fingerprint authentication area 1220, the processor may allow the fingerprint authentication area 1220 to display one of a specified luminance and a specified color. If the fingerprint authentication is completed, the processor may allow the fingerprint authentication area 1220 to return to a state before the fingerprint authentication operation or a state before the generation of the hovering signal. The processor may change at least one of the luminance and the color of the fingerprint authentication area 1220 in correspondence to occurrence of a specified event (e.g., occurrence of a touch event or a finger approach recognition event).

In consideration of the rear surface of the electronic device, in relation to the driving of the display, an extension area 1261 extending from the display to be bent towards the rear side of the electronic device, a display FPCB 1253 connected to the extension area 1261, and a display connector 1255 for connecting the display FPCB 1253 to the printed circuit board may be disposed. The fingerprint sensor 1257 and the pressure sensor 1259 may be disposed on the display FPCB 1253. Additionally or alternatively, a driving IC 1251 (e.g., a fingerprint sensor IC and a pressure sensor IC) for driving the fingerprint sensor 1257 and the pressure sensor 1259 may be disposed on the display FPCB 1253. The rear surface is an area corresponding to the rear surface of the display, and the rear area 1213, for example, may be at least one portion of the above-described rear panel or may be at least one portion of the bracket positioned in the rear area 1213.

Figure 12B:
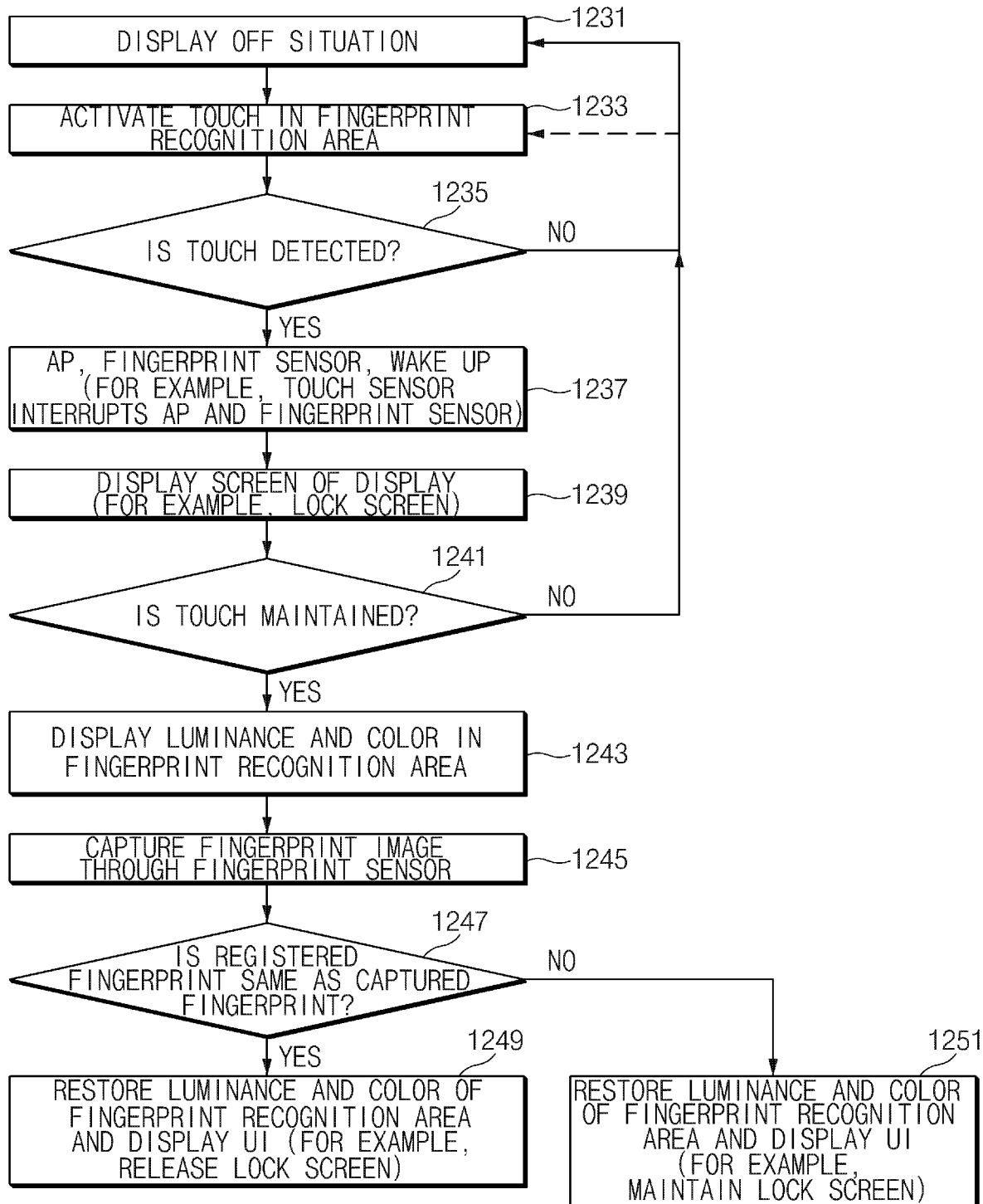
FIG. 12B is a flowchart of a method of operating an electronic device in relation to recognition of a fingerprint according to an embodiment of the present disclosure.

FIG. 12B is a flowchart of a method of operating an electronic device in relation to recognition of a fingerprint according to an embodiment of the present disclosure.

Referring to FIG. 12B, in relation to the method for operating an electronic device related to recognition of a fingerprint, in step 1231, the display may maintain a turned-off state according to settings. In step 1233, the electronic device may activate a touch function of the fingerprint recognition area. In the step 1233, the electronic device (e.g., a processor or the low-power processor) may activate a touch function of the fingerprint recognition area based on an always-on touch (AOT) function.

In step 1235, the electronic device may identify whether a touch is detected. If there is no touch, the electronic device 100 may return to step 1231. Further, the electronic device 100 may return to step 1233 to maintain the AOT state. If a touch is detected, in step 1237, the electronic device 100 (e.g., the low-power processor) may wake up an AP (or a processor) or a fingerprint sensor. In step 1237, the touch sensor provides an interrupt to the AP and the fingerprint sensor and the AP and the fingerprint sensor may be activated in correspondence to the interrupt.

In step 1239, the processor may display a screen (e.g., a lock screen) on the display. In step 1241, the processor may identify whether a touch is maintained for a specified period of time. If a touch is not maintained for a specified period of time, the processor may proceed to a step before step 1231 or step 1233. In step 1241, the processor may transit to a low power or sleep state, and the low-power processor (or a sensor hub) may maintain an AOT function of the electronic device.

If the touch is maintained for a specified period of time, in step 1243, the processor may display a specified luminance and a specified color in the fingerprint recognition area. For example, the processor may control at least one pixel or control a light emitting unit included in the fingerprint sensor such that the at least one pixel or the light emitting unit may output green light of 600 nit or more. In step 1245, the processor may capture a fingerprint image through the fingerprint sensor.

In step 1247, the processor may identify whether the registered fingerprint and the captured fingerprint are the same. If the registered fingerprint and the captured fingerprint are the same, in step 1249, the processor may display a UI that restores the luminance and the color of the fingerprint recognition area. In step 1249, the processor may release a locked screen. When the registered fingerprint and the captured fingerprint are not the same, in step 1251, the processor may display a UI that restores the luminance and the color of the fingerprint recognition area but maintains the locked screen.

Figure 12C:
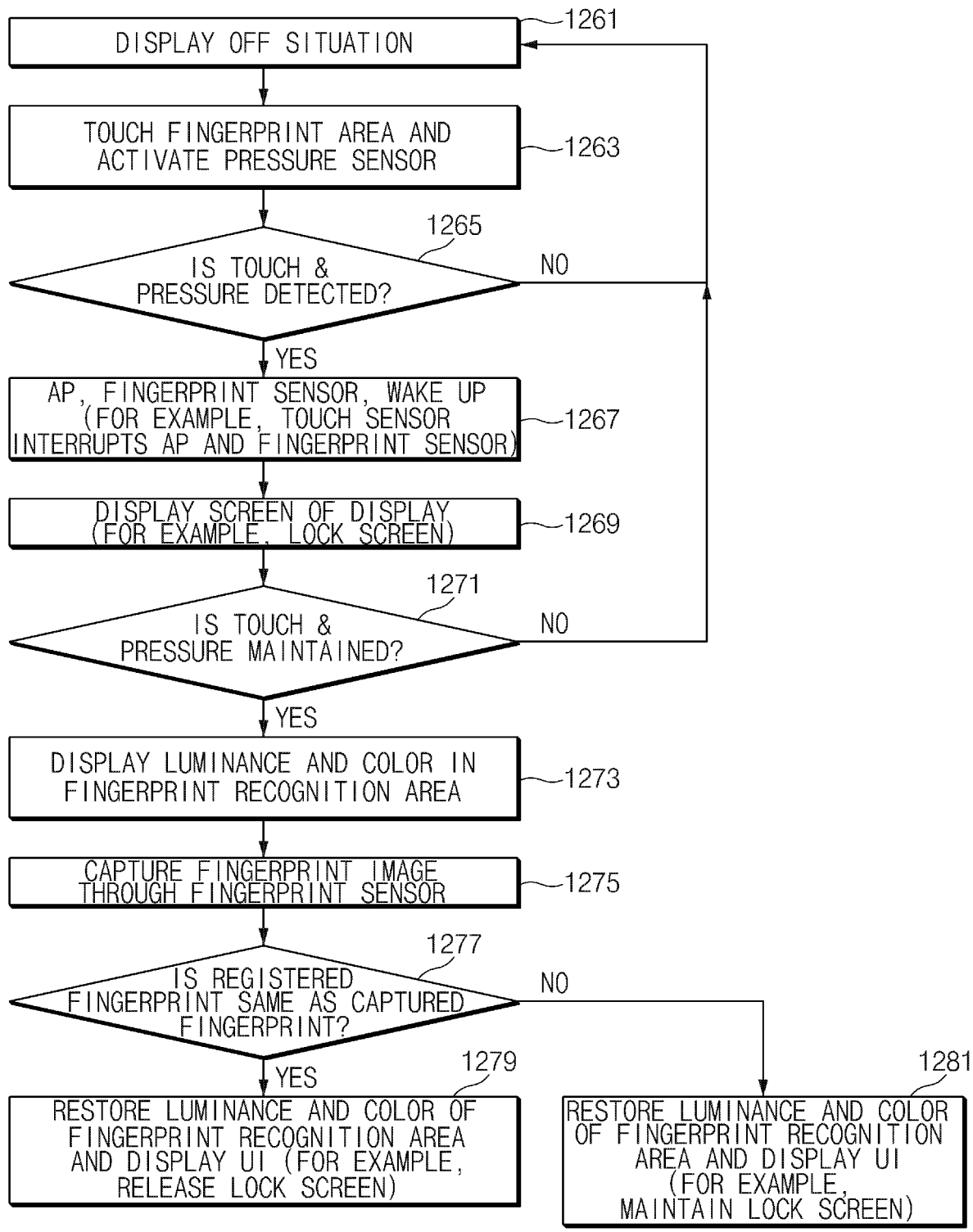
FIG. 12C is a flowchart of a method of operating an electronic device in relation to recognition of a fingerprint according to an embodiment of the present disclosure.

FIG. 12C is a flowchart of a method of operating an electronic device in relation to recognition of a fingerprint according to an embodiment of the present disclosure.

Referring to FIG. 12C, in relation to the method for operating an electronic device related to recognition of a fingerprint, in step 1261, the display may maintain an off state according to the settings. In step 1263, the electronic device may activate a touch of the fingerprint recognition area. In step 1263, the electronic device (e.g., the low-power processor) may activate a touch function of the fingerprint recognition area based on an AOT function.

In step 1265, the electronic may identify whether a touch and a pressure of a specified value are detected. If there is neither a touch nor a pressure of a specified value, the electronic device may return to step 1261. Further, the electronic device may return to step 1263 to maintain the AOT state. If a touch and a pressure of a specified value is detected, in step 1267, the electronic device (e.g., the low-power processor) may wake up an AP (or a processor) or a fingerprint sensor. In step 1267, the touch sensor provides an interrupt to the AP and the fingerprint sensor and the AP and the fingerprint sensor may be activated in correspondence to the interrupt.

In step 1269, the processor may display a screen (e.g., a lock screen) on the display. In step 1271, the processor may identify whether the touch and the pressure of a specified value are maintained for a specified period of time. If the touch and the pressure are not maintained for a specified period of time, the processor may proceed to a step before step 1261 or step 1263. In step 1271, the processor may transit to a sleep state, and the low-power processor (or a sensor hub) may maintain an AOT function of the electronic device.

When the touch and the pressure are maintained for a specified period of time, in step 1273, the processor may display a specified luminance and a specified color in the fingerprint recognition area. For example, the processor may control at least one pixel or control a light emitting unit included in the fingerprint sensor such that the at least one pixel or the light emitting unit may output green light of 600 nit or more. In step 1275, the processor may capture a fingerprint image through the fingerprint sensor.

In step 1277, the processor may identify whether the registered fingerprint and the captured fingerprint are the same. If the registered fingerprint and the captured fingerprint are the same, in step 1279, the processor may display a UI that restores the luminance and the color of the fingerprint recognition area. In step 1279, the processor may release a locked screen. If the registered fingerprint and the captured fingerprint are not the same, in step 1281, the processor may display a UI that restores the luminance and the color of the fingerprint recognition area but maintain the locked screen.

Figure 13:
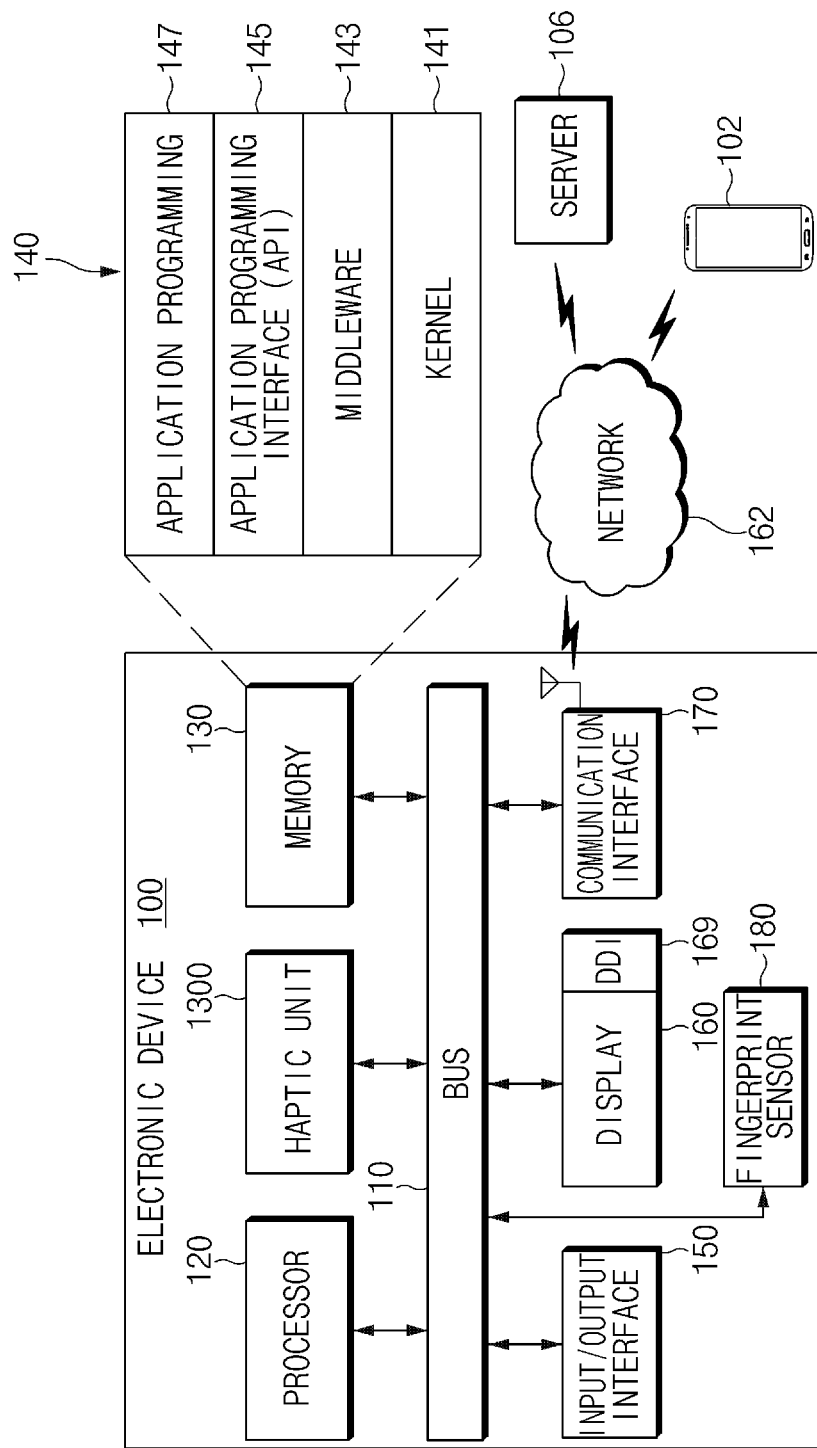
FIG. 13 is an electronic device operating environment according to an embodiment of the present disclosure.

FIG. 13 is an electronic device operating environment according to an embodiment of the present disclosure.

Referring to FIG. 13, an electronic device 100 in a network environment according to various embodiments is described below. The electronic device 100 may include a bus 110, a processor 120, a memory 130, an input/output interface 150, a display 160, a communication interface 170, a haptic part 1300, and a fingerprint sensor 180. The electronic device 100 may exclude at least one of the elements or may additionally include another element. The display 160 may include a DDI 169, at least one of a touch panel and a touch IC or a pressure sensor and a sensor IC.

The bus 110 may include, for example, a circuit that connects the components 120 to 180 and 1300 and transfers communications (e.g., control messages and/or data) between the components.

The processor 120 may include one or more of a CPU, an AP, or a communication processor (CP). The processor 120, for example, may execute operations or data processing related to the control and/or communication of at least one other component of the electronic device 100. The processor 120 may perform processing related to an operation of a fingerprint authentication area and fingerprint authentication. If fingerprint authentication is requested (e.g., an application related to fingerprint authentication is executed), the processor 120 may output a specified fingerprint authentication guide UI on the display 160. The fingerprint authentication guide UI may include visual information (e.g., a text or an image) that indicates an area of the display 160, which a finger of the user is to contact. After the fingerprint authentication guide UI is output, the processor 120 may identify whether a specified event (e.g., a touch event, a pressure touch event, a hovering event, or a finger approach recognition event) occurs. If a specified event occurs, the processor 120 may change the display state of the fingerprint authentication area to a state having at least one of a specified luminance or a specified color. If the fingerprint authentication succeeds, the processor 120 may process a function based on the success of the fingerprint authentication. The processor 120 may request changes of the fingerprint authentication guide UI and the display state of the fingerprint authentication area from the DDI 169.

According to various embodiments of the present disclosure, if an application related to the fingerprint authentication is executed, the processor 120 may output a predefined area (e.g., an area of the display 160, for example, an area in which a card image is displayed). If contacting a specified object (e.g., a finger) in the predefined area, the touch sensor may deliver the corresponding coordinate information to the processor 120. The processor 120 may output a specified UI (e.g., a fingerprint authentication guide UI or an area having a specified luminance or a specified color) in an area of the display 160 corresponding to the corresponding coordinate information.

The memory 130 may include volatile and/or nonvolatile memory. The memory 130, for example, may store a command or data related to at least one other component of the electronic device 100. The memory 130 may store software and/or a program 140. The program 140, for example, may include a kernel 141, middleware 143, an application programming interface (API) 145, and/or application programming (or an application program, application, or applications) 147. At least some of the kernel 141, the middleware 143, or the API 145 may be referred to as an operating system (OS). The kernel 141, for example, may control or manage system resources (e.g., the bus 110, the processor 120, and the memory 130) that are used to execute operations or functions implemented in the other programs (e.g., the middleware 143, the API 145, or the applications 147). The kernel 141 may provide an interface through which the middleware 143, the API 145, or the applications 147 access individual components of the electronic device 100 to control or manage the system resources.

The middleware 143, for example, may function as an intermediary that allows the API 145 or the applications 147 to communicate with the kernel 141 to exchange data. The middleware 143 may process one or more work requests received from the application programs 147, according to their priorities. For example, the middleware 143 may give a priority, by which a system resource (e.g., the bus 100, the processor 120, or the memory 130) of the electronic device 100 may be used, to at least one of the application programs 147 and process the one or more request for work. The API 145 is an interface used, by the application 147, to control a function provided from the kernel 141 or the middleware 143, and may include, for example, at least one interface or function (e.g., instruction) for file control, window control, image processing, and text control. The application 147 may include an application (e.g., Samsung Pay® or an unlock function) that is necessary for authenticating a fingerprint.

The memory 130 may store a fingerprint table. The fingerprint table may include a first preset value indicating a first luminance and a first color, a second preset value indicating a second luminance and a second color, a third preset value indicating a third luminance and a third color, and the like. If the brightness of the display area is collectively controlled as a whole, the first luminance may correspond to 600 nit, the second luminance may correspond to 500 nit, and the third luminance may correspond to 400 nit. If the brightness of an area of the display area corresponding to the fingerprint sensor is controlled (only the bright of a partial area of the display is controlled), the first luminance may correspond to 1,000 nit, the second luminance may correspond to 900 nit, and the third luminance may correspond to 800 nit. The first color may be a red color, the second color may be a green color, and the third color may be a purple color. The third luminance may have a preset value of 0 nit (e.g., turning-off of the corresponding display area). The preset values may be applied based on a success or a failure of the fingerprint authentication. Further, even if a quality of the image provided by the fingerprint sensor 180 is less than or equal to a specified level and the fingerprint authentication fails, the fingerprint table may be used in relation to a change of the display state of the fingerprint authentication area.

The processor 120 may control the display state of the fingerprint authentication area based on a preset value set to a default, and may adjust the preset value based on the fingerprint table according to a failure of the fingerprint authentication or an acquisition of an image quality of a specified level or more. The fingerprint table may include a processor fingerprint table operated by the processor and a DDI fingerprint table operated by the DDI 169. The processor fingerprint table may be used when being adapted to control a display state of the fingerprint authentication area by the processor 120. The DDI fingerprint table may be stored in a memory area (e.g., a dynamic random access memory (DRAM) or a memory for the DDI 169) included in the DDI 169, and may be used such that the fingerprint authentication area has a specified display state in correspondence to the control of the DDI 169. The electronic device 100 may provide a user interface by which the user may select a preset value, which is to be applied as a default in the fingerprint authentication area, of the preset values included in the fingerprint table.

The input/output interface 150, for example, may deliver commands or data input from the user or another external device to another element(s) of the electronic device 100, or may output commands or data received from another element(s) of the electronic device 100 to the user or another external device. The input/output interface 150 may include an audio processing module. The audio processing module may output at least one piece of audio information related to an operation of the fingerprint authentication function. For example, the audio processing module may output audio information that guides the user to bring a finger into contact with the fingerprint authentication area during a fingerprint authentication operation. Further, the audio processing module may output audio information to guide the user to maintain the touch of the finger during the fingerprint authentication operation, audio information to guide the user to release the finger touch, or audio information to provide guidance as to the success or failure of the fingerprint authentication. The audio processing module may help execute the fingerprint authentication function in correspondence to a user voice input.

According to an embodiment of the present disclosure, the display 160 may include a liquid crystal display (LCD), a light emitting diode (LED) display, an organic light emitting diode (OLED) display, a micro electromechanical system (MEMS) display, and an electronic paper display. The display 160, for example, may display various contents (e.g., a text, an image, a video, an icon, and a symbol). The display 160 may include a touch screen and receive, for example, a touch, a gesture, a proximity, or a hovering input using an electronic pen or the user's body.

As described above, the display 160 may include a display area in which a specified screen interface is output, and a fingerprint authentication area in which the fingerprint sensor 180 is disposed. As illustrated in FIG. 10, if the fingerprint sensor 180 is provided in a form of a sheet, the whole display area may be the fingerprint authentication area. The display 160 may output guide information (or visual information) to guide the fingerprint authentication area. The display 160 may convert the display state of the display 160 such that the fingerprint authentication area has a specified luminance or a specified color in correspondence to the control of the processor 120. The display 160 may convert the fingerprint authentication area having the specified luminance or the specified color to the previous state (e.g., the state before the fingerprint authentication area having the specified luminance or the specified color) in correspondence to the control of the processor 120.

The display 160 may include a DDI 169. The DDI 169 may collect data stored in a frame memory related to driving of the display 160, and may output the collected data on the display 160. The DDI 169 according to an embodiment of the present disclosure may store a guide UI adapted to guide a fingerprint authentication area and a DDI fingerprint table in a memory (e.g., a DRAM or a DDI memory) included in the display 160. The DDI 169 may output the guide UI stored in the DDI memory in the fingerprint authentication area in correspondence to occurrence of an event. The DDI 169 may change the display state of the fingerprint authentication area such that the fingerprint authentication area has a first luminance and a first color with reference to the DDI fingerprint table stored in the DDI memory in correspondence to the occurrence of the event (e.g., at least one of a hovering event occurring in an area in which the guide UI is output, a touch event, and a finger approach recognition event). The DDI 169 may change the display state of the fingerprint authentication area such that the fingerprint authentication area has a second luminance and a second color in correspondence to an additional occurring event (e.g., if the quality of a fingerprint authentication failure event or acquired image information is less than or equal to a specified value). The hovering event or the touch event may be acquired by the touch sensor included in the display 160. The finger approach recognition event may be acquired by the fingerprint sensor 180.

The communication interface 170, for example, may set a communication between the electronic device 100 and a first external electronic device 102, or a server 106. For example, the communication interface 170 may be connected to a network 162 through a wireless communication or a wired communication to communicate with the external electronic device 102 or the server 106.

The wireless communication, for example, may include a cellular communication that uses at least one of long-term evolution (LTE), LTE-advanced (ATE-A), 5G, code division multiple access (CDMA), wideband CDMA (WCDMA), a universal mobile telecommunications system (UMTS), wireless broadband (WiBro), or a global system for mobile communications (GSM). The wireless communication, for example, may include at least one of wireless fidelity (Wi-Fi), Bluetooth (BT), Bluetooth low energy (BLE), Zigbee, NFC, magnetic secure transmission, radio frequency, or a body airless network (BAN) The wireless communication may include GNSS. The GNSS, for example, may be a global positioning system (GPS), a global navigation satellite system (Glonass), a Beidou navigation satellite system (Beidou), or the European global satellite-based navigation system (Galileo). "GPS" may be interchangeably used with the "GNSS". The wired communication may include at least one of, for example, a USB, a high definition multimedia interface (HDMI), recommended standard 232 (RS-232), and a plain old telephone service (POTS). The network 162 may include at least one of communication networks, for example, a computer network (e.g., a local area network (LAN) or a wide area network (WAN)), the Internet, or a telephone network. Further, the electronic device 100 may communicate with another electronic device based on short range communication.

The haptic unit 1300 may output a haptic feedback of the electronic device 100 in correspondence to control of the processor 120. The haptic unit 1300 may be disposed in an area that is adjacent to the fingerprint sensor 180 disposed in the display 160. The haptic unit 1300 may output a haptic feedback (or a vibration pattern) of a specified pattern while a fingerprint is authenticated through the fingerprint sensor 180. Further, the haptic unit 1300 may output anther haptic feedback by which it may be distinguished whether the authentication of a fingerprint was successful or failed.

As described above, the processor 120 may include a low-power processor and a general purpose processor, where the low-power processor may support an AOT state in which the display 160 performs a touch function in an off state. Further, if a touch is made to the fingerprint recognition area in the AOT state, the low-power processor may control the haptic unit 1300 such that a haptic feedback of a specified pattern related to activation of a fingerprint sensor may be output.

The external electronic device 102 may be a device that is the same as or different from the electronic device 100. According to various embodiments of the present disclosure, all or some of the operations executed by the electronic device 100 may be executed by another or a plurality of electronic devices (e.g. the electronic devices 102 or the servers 106). If the electronic device 100 executes some functions or services automatically or upon request, it may request at least some functions associated with the functions or services from the electronic devices 102 or the server 106, in place of or in addition to directly executing the functions or services. The electronic device 102 or the server 106 may execute a requested function or an additional function, and may transfer the result to the electronic device 100. The electronic device 100 may process the received result directly or additionally, and may provide a requested function or service. To this end, for example, cloud computing, distributed computing, or client-server computing technologies may be used.

Figure 14:
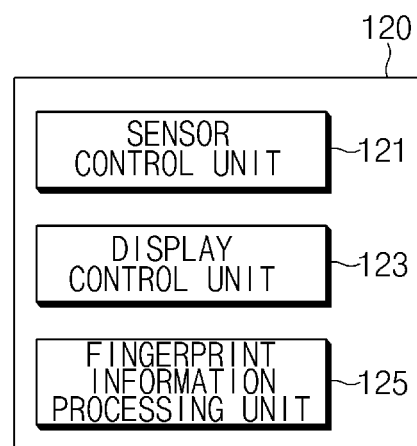
FIG. 14 is a processor according to an embodiment of the present disclosure.

FIG. 14 is a processor according to an embodiment of the present disclosure.

Referring to FIG. 14, the processor 120 may include a sensor control unit 121, a display control unit 123, and a fingerprint information processing unit 125.

The sensor control unit 121 may perform control of a sensor related to the performance of a fingerprint authentication function. If a request for fingerprint authentication is made, the sensor control unit 121 may adjust the sensitivity of the touch sensor. For example, the sensor control unit 121 may identify whether a hovering event based on an approach of an object occurs by adjusting the touch sensitivity of the fingerprint authentication area. Further, the sensor control unit 121 may identify whether a touch event occurs in the fingerprint authentication area. Further, if a request for fingerprint authentication occurs, the sensor control unit 121 activates the fingerprint sensor 180, and may determine whether an object such as a finger approaches the fingerprint sensor 180 based on image information acquired by the fingerprint sensor 180. If at least one of a hovering event, a touch event, or a finger approach event occurs, the sensor control unit 121 may deliver the corresponding event to the display control unit 123. If the state of the fingerprint authentication area is changed by the display control unit 123, the sensor control unit 121 may restore the touch sensor area, of which the sensitivity has been adjusted, to an original state. Further, if the fingerprint authentication is completed, the sensor control unit 121 may restore the touch sensor area, of which the sensitivity has been adjusted, to an original state.

If a request for fingerprint authentication is made, the display control unit 123 may output a guide UI corresponding to the fingerprint authentication area. In this regard, the display control unit 123 may output the fingerprint authentication guide UI stored in the memory 130, in the fingerprint authentication area, or may request output of the guide UI from the DDI 169. If an event (e.g., a hovering event, a touch event, or a finger approach recognition event) is delivered from the sensor control unit 121, the display control unit 123 may display the fingerprint authentication area in a specified display state. For example, the display control unit 123 may display the fingerprint authentication area such that the fingerprint authentication area has a first luminance (e.g., 600 nit) and a first color (e.g., a green series color). In this case, the display control unit 123 may refer to a fingerprint table stored in the memory 130. Further, the display control unit 123 may request a preset value from the DDI 169 such that the fingerprint authentication area has a first luminance (e.g., 600 nit) and a first color (e.g., green). The DDI 169 may output data, for example, a display set such that the fingerprint authentication area is displayed in a specified display state while referring to the DDI fingerprint table in correspondence to the request of the display control unit 123.

If the fingerprint authentication fails or the quality of the acquired image information is a specified value or less, the display control unit 123 may change a display state of the fingerprint authentication area. For example, the display control unit 123 may display the fingerprint authentication area such that the fingerprint authentication area has a second luminance (e.g., 1000 nit) and a second color (for example, green). Further, the display control unit 123 may change only the luminance of the fingerprint authentication area. In this regard, the display control unit 123 may refer to a fingerprint table stored in the memory 130. Further, the display control unit 123 may request the DDI 169 to change the display state of the fingerprint authentication area. When the fingerprint authentication fails or image information of a low quality is acquired, the display control unit 123 may output a message to indicate a failure of the fingerprint verification or a failure in acquisition of a normal image. The display control unit 123 may output a specified guide message (e.g., a message to maintain a finger contact state related to redo the acquisition of the fingerprint information or a message to guide adjustment of a contact location of a finger in relation to acquisition of additional fingerprint information).

If the fingerprint authentication succeeds, the display control unit 123 may restore the display state of the fingerprint authentication area to a state before the fingerprint authentication. For example, the display control unit 123 may remove the fingerprint authentication guide UI or the display state having a specified luminance and a specified color, and may output a screen based on execution of an application related to the fingerprint authentication on the display 160.

The fingerprint information processing unit 125 may execute a fingerprint authentication application in correspondence to a user input or an advent of a scheduled event. The fingerprint information processing unit 125 may request activation of the fingerprint sensor 180 or adjustment of the sensitivity of the touch sensor from the sensor control unit 121 in correspondence to execution of a fingerprint authentication application. If the image information is acquired from the fingerprint sensor 180, the fingerprint information processing unit 125 may process fingerprint authentication by comparing the acquired fingerprint information and the stored fingerprint information. In this operation, the fingerprint information processing unit 125 may request comparison of fingerprint information from a separate trustable operating system environment (e.g., trusted execution environment (TEE)). If the fingerprint authentication fails or the quality of the image information acquired from the fingerprint authentication area is a specified value or less, the fingerprint information processing unit 125 may request change of a display state of the fingerprint authentication area from the display control unit 123. The fingerprint information processing unit 125 may redo the fingerprint authentication based on the image information acquired by the fingerprint sensor 180 after the display state of the fingerprint authentication area is changed. The fingerprint information processing unit 125 may perform a comparison of fingerprint information a specified number of times, and if the specified number of times elapses, may determine that the fingerprint authentication fails. At least one of the luminance and the color of the fingerprint authentication area may be changed for the specified number of times. If the fingerprint authentication succeeds, the fingerprint information processing unit 125 may execute a function based on the success of the fingerprint authentication.

According to various embodiments of the present disclosure, an electronic device according to an embodiment may include a display including at least one pixel and at least a partial area of which is transparent, a fingerprint sensor disposed in an area of a lower part of the display, on which a screen is displayed, and adapted to collect light radiated from a pixel disposed in the display and a direction of which has been changed by an object that approached an upper side of the display and acquire image information related to authentication of a fingerprint, and a processor adapted to control an operation of acquiring image information of the fingerprint sensor.

According to various embodiments of the present disclosure, an electronic device may include a display in which a fingerprint recognition area is formed in at least one portion thereof a fingerprint sensor disposed under the display and adapted to acquire image information to be used for authentication of a fingerprint corresponding to an object that approaches a fingerprint recognition area based at least partially on a light radiated from at least one pixel of the display and reflected by the object and a processor adapted to control at least one function of the fingerprint sensor in relation with the acquiring of the image information.

According to various embodiments of the present disclosure, the electronic device may further include a rear panel formed under the display, the rear panel includes an opening aligned with the fingerprint sensor and the fingerprint recognition area.

According to various embodiments of the present disclosure, the rear panel includes a protective layer formed adjacent to the display, and at least one portion of the opening is formed in the protective layer.

According to various embodiments of the present disclosure, the rear panel further includes a digitizer formed in or under the protective layer, and wherein a portion of the opening is formed in the digitizer.

According to various embodiments of the present disclosure, the rear panel further includes a heat radiating layer formed under the digitizer.

According to various embodiments of the present disclosure, the electronic device may further include a bracket disposed under the rear panel to support the display, the bracket includes a sensor accommodating area in which at least one portion of the fingerprint sensor is accommodated.

According to various embodiments of the present disclosure, the electronic device may further include a wavelength selecting element aligned with the opening and adapted to pass only a portion of the reflected light of having a specified wavelength.

According to various embodiments of the present disclosure, the electronic device may further include a wavelength selecting element disposed between the display and the fingerprint sensor and adapted to pass only a portion of the reflected light having a specified wavelength.

According to various embodiments of the present disclosure, the fingerprint recognition area occupies substantially an entire area of a display area, and the fingerprint sensor is aligned with the fingerprint recognition area.

According to various embodiments of the present disclosure, the processor is further adapted to output a color having a specified wavelength via the fingerprint recognition area in response to a request to authenticate the fingerprint.

According to various embodiments, of the present disclosure the processor may be adapted to output a specified luminance via the fingerprint recognition area in response to a request to authenticate the fingerprint.

According to various embodiments of the present disclosure, the processor may be adapted to control the fingerprint recognition area based at least in part on a first display attribute in relation with the acquiring of the image information and control the fingerprint recognition area based at least in part on a second display attribute if the acquired image information satisfies a specified condition.

According to various embodiments of the present disclosure, the processor may be adapted to adjust a color or a luminance as at least part of the controlling the fingerprint recognition area based at least in part on the second display attribute.

According to various embodiments of the present disclosure, the processor may be adapted to output, via the display, a user interface to guide the approaching of the object to the fingerprint recognition area in response to the request to authenticate the fingerprint.

According to various embodiments of the present disclosure, the processor may be adapted to control the fingerprint recognition area based at least in part on a first touch sensitivity and control a peripheral area of the fingerprint recognition area of the display based at least in part on a second touch sensitivity.

According to various embodiments of the present disclosure, the processor may be adapted to output a specified luminance, or a color having a specified wavelength via the fingerprint recognition area if a hovering input is detected with respect to the approaching of the object to the fingerprint recognition area based at least in part on the first touch sensitivity.

According to various embodiments of the present disclosure, the fingerprint sensor is in contact with a lower surface of the display corresponding to the fingerprint recognition area.

According to various embodiments of the present disclosure, an optical bonding layer is formed in at least one portion of the opening. The fingerprint sensor may be disposed in a form of a sheet such that a fingerprint may be recognized in a whole active area of the display, on which a screen is displayed.

According to various embodiments of the present disclosure, when a request for authentication of a finger is made, the processor may output at least one portion of the display in a color of a specified wavelength band selected from various wavelength bands, such as 650 to 780 nm, 490 to 570 nm, or 780 to 1100 nm.

According to various embodiments of the present disclosure, the processor may output a fingerprint authentication area of the display corresponding to the area in which the fingerprint sensor is disposed, in a color of a specified wavelength band selected from various wavelength bands, such as 650 to 780 nm, 490 to 570 nm, or 780 to 1100 nm.

According to various embodiments of the present disclosure, when the finger verification fails or acquisition of image information having a quality of a specified value or more fails, the processor outputs a display state of a display area in which the object in contact is disposed differently from the previous state.

According to various embodiments of the present disclosure, the processor may process such that a luminance of a display area in which an object in contact is disposed increases by a specified value (e.g., 300 to 1000 nit, for example, 600 nit or 1000 nit).

According to various embodiments of the present disclosure, the processor may output a guide UI to guide disposition of a user finger in the fingerprint authentication area of the display corresponding to an area in which the fingerprint sensor is disposed, based on the request for the fingerprint authentication. The processor may output a haptic feedback when recognition of a fingerprint is started or completed. The processor may output a haptic feedback based on a success of recognition of a fingerprint and a haptic feedback based on a failure of recognition of a fingerprint in different patterns.

According to various embodiments of the present disclosure, if a touch signal is detected in the fingerprint authentication area, the processor may output the fingerprint authentication area in a color of a specified wavelength band (e.g., 490 nm to 570 nm, 650 nm to 780 nm, 780 nm to 1100 nm, or 500 nm to 800 nm) of a specified luminance (e.g., not less than 600 nit).

According to various embodiments of the present disclosure, if a touch signal is detected in the fingerprint authentication area, the processor may output the fingerprint authentication area in a color of a specified wavelength band (e.g., 490 nm to 570 nm, 650 nm to 780 nm, 780 nm to 1100 nm, or 500 nm to 800 nm) of a specified luminance (e.g., not less than 600 nit).

According to various embodiments of the present disclosure, the processor may process the touch sensitivity of the fingerprint authentication area differently from a peripheral portion to detect a hovering signal.

According to various embodiments of the present disclosure, if a hovering signal is received in the fingerprint authentication area, the processor may output the fingerprint authentication area in a color of a specified wavelength band (e.g., 490 nm to 570 nm, 650 nm to 780 nm, 780 nm to 1100 nm, or 500 nm to 800 nm) of a specified luminance (e.g., not less than 600 nit).

According to various embodiments of the present disclosure, when a request for authentication of a fingerprint is made, the processor may recognize approach of a finger based on the image information acquired by the fingerprint sensor, and if the approach of the finger is recognized, may output the area in which the finger is recognized, in a color of a specified wavelength band (e.g., 490 nm to 570 nm, 650 nm to 780 nm, 780 nm to 1100 nm, or 500 nm to 800 nm) of a specified luminance (e.g., not less than 600 nit).

According to various embodiments of the present disclosure, the processor may output a guide UI to guide disposition of a user finger in the fingerprint authentication area of the display corresponding to an area in which the fingerprint sensor is disposed, based on the request for the fingerprint authentication.

According to various embodiments of the present disclosure, the electronic device may further include at least one of a first bonding layer (302_4 of FIG. 6CB) disposed between the fingerprint sensor and the display, a second bonding layer (302_1 of FIG. 6BA) disposed between the fingerprint sensor and the digitizer, and a third bonding layer (302_2 of FIG. 6BB) disposed between the fingerprint sensor and the protective layer.

According to various embodiments of the present disclosure, the electronic device may further include at least one of an air gap formed between a lower surface of the display and the fingerprint sensor, and an optical bonding layer disposed between the lower surface of the display and the fingerprint sensor.

According to various embodiments of the present disclosure, the electronic device may further include any one of a display panel extension extending from one side of the display, disposed on a rear surface of the display area of the display to be curved, and in which a display driving module is mounted on one side thereof, and a display panel connector electrically connected to an end of one side of the display and disposed on the rear surface of the display area of the display to be curved, and in which a display driving module is mounted on one side thereof.

According to various embodiments of the present disclosure, the digitizer may be disposed between the display and the rear panel.

According to various embodiments of the present disclosure, the processor may be adapted to control the fingerprint recognition area based on a first display attribute (e.g., a luminance, a color, and a pattern form of the display) in relation to the operation of acquiring the image information, and may be adapted to control the fingerprint recognition area based on a second display attribute when the acquired image information satisfies a specified condition (e.g., when the image information has a resolution of a specified value or less or has a low contrast or an image having a quality that is necessary for recognition of a fingerprint is not acquired).

According to various embodiments of the present disclosure, the electronic device according to an embodiment may include a fingerprint sensor, a display including a fingerprint recognition area, and a processor, and the processor may be adapted to receive a request for authentication of a fingerprint, output a user interface for guiding approach of an object to the fingerprint recognition area through the display in response to the request, and adjust at least one display attribute for the fingerprint recognition area at least partially based on occurrence of a specified event related to the approach of the object.

According to various embodiments of the present disclosure, the processor may be adapted to radiate light used for acquiring image information of the object by using at least one pixel corresponding to the fingerprint recognition area in response to the request.

According to various embodiments of the present disclosure, the electronic device according to an embodiment may include a fingerprint sensor, a display including a fingerprint recognition area formed in at least one portion thereof and a processor, the processor may be adapted to receive a request for authentication of a fingerprint, output a user interface via the display in response to the request, the user interface to guide an approach of an object to the fingerprint recognition area and adjust at least one display attribute to be used for the fingerprint recognition area based at least in part on an occurrence of a specified event with respect to the approach of the object.

According to various embodiments of the present disclosure, the processor is adapted to radiate, using at least one pixel of the display corresponding to the fingerprint recognition area, a light to be used to acquire image information corresponding to the object based at least in part on the request.

According to various embodiments of the present disclosure, the processor is adapted to output, using at least one pixel of the display corresponding to the fingerprint recognition area, a color having a specified wavelength based at least in part on the request.

According to various embodiments of the present disclosure, the processor is adapted to output, using at least one pixel of the display corresponding to the fingerprint recognition area, a light having a specified luminance based at least in part on the request.

According to various embodiments of the present disclosure, the processor is adapted to control the fingerprint recognition area based at least in part on a first display attribute to acquire image information corresponding to the object and control the fingerprint recognition area based at least in part on a second display attribute if the acquired image information satisfies a specified condition.

Figure 15A:
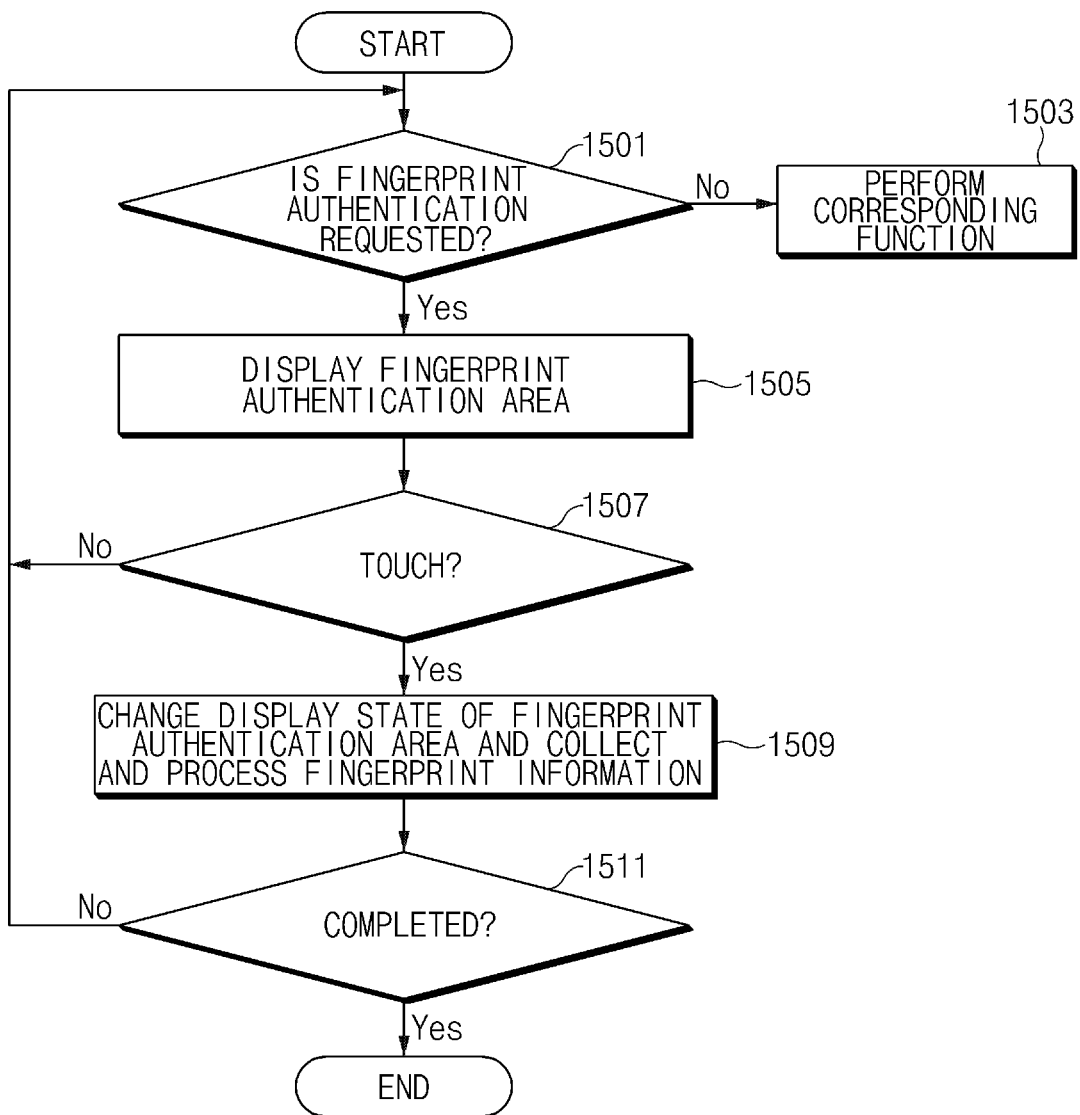
FIG. 15A is a flowchart of a fingerprint operating method based on a change in a display state value of a fingerprint authentication area according to an embodiment of the present disclosure.

FIG. 15A is a flowchart of a fingerprint operating method based on a change in a display state value of a fingerprint authentication area according to an embodiment of the present disclosure.

Referring to FIG. 15A, in relation to the fingerprint operating method, in step 1501, if an event occurs, a processor 120 (e.g., the sensor control unit 121) of the electronic device 100 may identify whether the event is related to a request for fingerprint authentication. If the event is not related to a request for fingerprint authentication, in step 1503, the processor 120 may execute a function related to the occurring event. For example, the processor 120 may output a home screen or a webpage in correspondence to the type of the event. Further, the processor 120 may execute a communication function based on the event.

If an event related to a request for fingerprint authentication, the processor 120 (e.g., the sensor control unit 121) may activate the fingerprint sensor 180. In step 1505, the processor 120 (e.g., the display control unit 123) may output information to guide a fingerprint authentication area. For example, the processor 120 may output a box or a closed curve to indicate an area in which the user input is to be located, in a specified area of the display 160. At least one of a text or an image for guiding a contact of a finger may be displayed in the interior of the box or the closed curve.

In step 1507, the processor 120 (e.g., the sensor control unit 121) may identify whether a touch occurs in a specified area (e.g., the fingerprint authentication area). If a touch does not occur, the processor 120 branches to step 1501 to identify whether the request for fingerprint authentication is available (e.g., within a specified time period after the request for fingerprint authentication), and may process the step that follows. According to the situation, an operation of inspecting the availability of the request for fingerprint authentication may be omitted.

If a touch occurs in the fingerprint authentication area, in step 1509, the processor 120 (e.g., the display control unit 123) may change the display state of the fingerprint authentication area such that the fingerprint authentication area has a specified luminance, a specified color, and a specified phase (or form). For example, the processor 120 may process the fingerprint authentication area such that the fingerprint authentication area has a specified luminance and at least one color. The fingerprint sensor 180 may collect image information based on light, which is reflected by a touched object and received by the fingerprint sensor 180, of the light of the pixels corresponding to the fingerprint authentication area, and may store the collected image information in a memory such that the processor 120 (e.g., the fingerprint information processing unit 125) may use the image information. The fingerprint information processing unit 125 may perform fingerprint authentication based on the received image information. For example, the fingerprint information processing unit 125 may compare the fingerprint information stored in advance and the acquired fingerprint information, and may identify whether the two pieces of fingerprint information coincides with each other by a specified ratio or more.

The specified ratio, for example, may be a ratio of false rejection ratio (FRR) to false acceptance ratio (FAR) (FRR/FAR) of 10% or less (e.g., 3% or less). Further, the specified ratio may be a ratio of FRR of 3% in the case of 1/50000 (FAR). The FAR and the FRR may include a reference for measuring a security and a usage of a biometric recognition security solution.

In step 1509, the fingerprint information processing unit 125 may extract a feature point of the acquired fingerprint information and may compare the feature point with a feature point of the fingerprint information stored in advance. The fingerprint information, for example, may be compared in a reliable operating system environment (e.g., TEE, trusted zone (TZ), or secure world).

In step 1511, the processor 120 may identify whether an event related to completion of the fingerprint authentication function occurs. If an event related to completion of the fingerprint authentication function occurs, the processor 120 may perform processing such that the state of the fingerprint authentication area returns to the state before execution of the function or returns to a specified state (e.g., a standby screen display state). In step 1511, the processor 120 (e.g., the sensor control unit 121) may deactivate the activated fingerprint sensor 180. Further, the processor 120 (e.g., the display control unit 123) may restore the fingerprint authentication area having a specified display state to a previous state. In step 1511, if an event related to completion of the fingerprint authentication function does not occur, for example, if the fingerprint authentication fails, the processor 120 may be branched to an operation before step 1501 to re-perform the steps that follow. Then, the state of the electronic device 100 is a state in which a request for fingerprint authentication is available, and may be a state of step 1509 in which the fingerprint authentication area has a specified luminance and a specified color. In this case, the fingerprint sensor 180 may newly produce image information based on the light collected for a specified period of time, and the processor 120 (e.g., the fingerprint information processing unit 125) may re-perform fingerprint authentication based on the produced image information.

According to various embodiments of false acceptance ratio, in step 1509, the processor 120 (e.g., the display control unit 123) may change the display state of the fingerprint authentication area again. The processor 120 may display at least one of the luminance, the color, and the phase of the fingerprint authentication area different from the previous state. For example, the processor 120 may process the fingerprint authentication area such that the luminance of the fingerprint authentication area is greater than before. The processor 120 may re-perform fingerprint authentication based on image information collected based on the light produced according to the relatively high luminance. Further, the processor 120 may adjust a luminance of a fingerprint authentication area to a maximum brightness (e.g., is different based on the physical characteristics of the display) that may expressed by the display, and may perform authentication of a fingerprint based on the adjusted luminance.

Figure 15B:
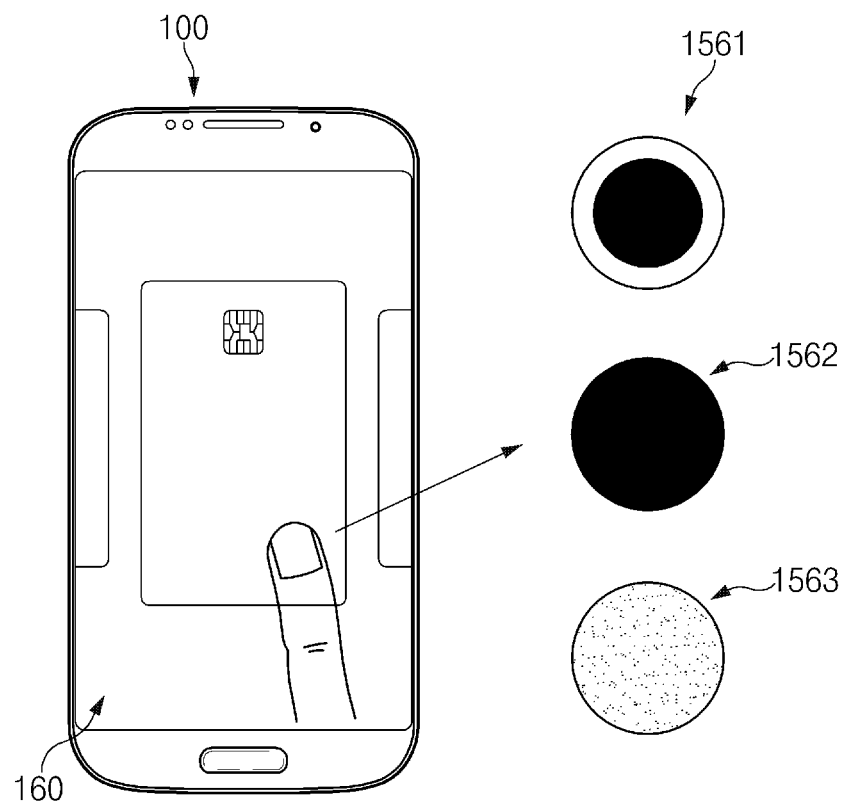
FIG. 15B is a view of a screen interface related to a change in a display state value of a fingerprint authentication area according to an embodiment of the present disclosure.

FIG. 15B is a view of a screen interface related to a change in a display state value of a fingerprint authentication area according to an embodiment of the present disclosure.

Referring to FIG. 15B, the electronic device 100 may output an execution screen of an application related to fingerprint authentication on the display 160. The electronic device 100 may change a specified area (e.g., a fingerprint authentication area or an area which an object related to fingerprint authentication approaches) such that the specified area has a specified color. For example, if a touch event (or a hovering event) occurs on an area in which a card image is output in relation to fingerprint authentication, the electronic device 100 may output any one of a first object 1561, a second object 1562, or a third object 1563.

The first object 1561, for example, may include a central circle and an external circle. The central circle may function as a light emitting unit. The external circle may function as a path of light reflected by a ridge of a fingerprint and received by the fingerprint sensor. Further, the central circle may function as a path of light reflected by a ridge of a fingerprint and the external circle may function as a light emitting unit adapted to radiate light towards the fingerprint. Accordingly, the central circle (e.g., a color of a wavelength of 780 to 1100 nm) and the external circle (e.g., a color of a wavelength of 650 to 780 nm or 490 to 570 nm) may have colors of different wavelength bands.

The second object 1562 may include an object having a specified color corresponding to a touch area of the user or a hovering area. The second object 1562 may be changed based on the size of a touch area of the user or a hovering area. The second object 1562 may have a color of a wavelength (e.g., a wavelength of 780 to 1100 nm) that is advantageous for fingerprint authentication. Although FIG. 15B illustrates that the shape of the second object 1562 is circular, the second object 1562 may have an elliptical or polygonal shape in correspondence to the shape of the touch area.

The third object 1563 may be an object displayed in the touch area or the hovering area of the user and including a specified pattern. The pattern of the third object 1563, for example, may change a path of the light reflected by a ridge of a fingerprint or the like to a specified form. The size and shape of the pattern of the third object 1563 may be changed based on setting of the user.

Figure 16:
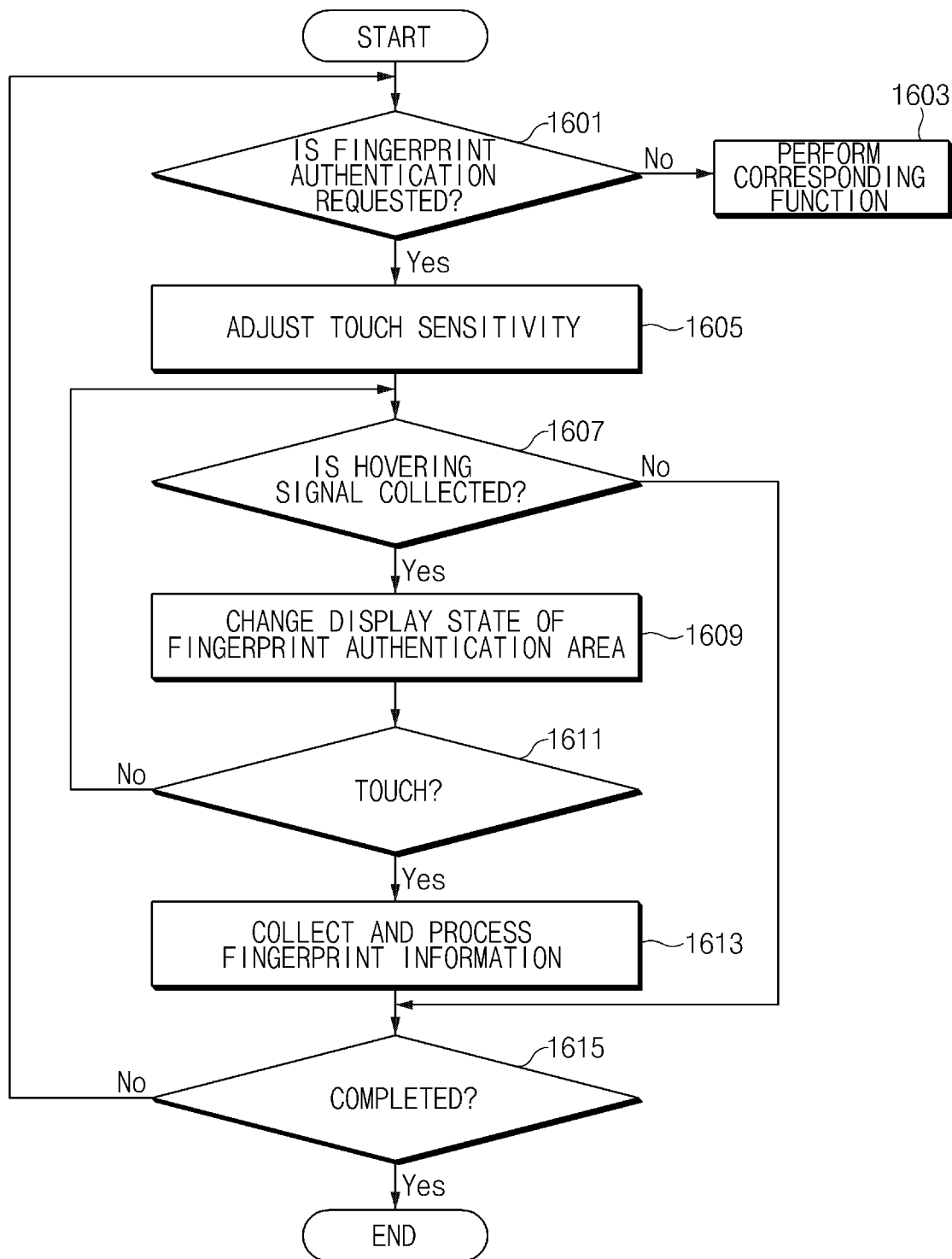
FIG. 16 is a flowchart of a hovering signal based fingerprint operating method according to an embodiment of the present disclosure.

FIG. 16 is a flowchart of a hovering signal based fingerprint operating method according to an embodiment of the present disclosure.

Referring to FIG. 16, in relation to the fingerprint operating method, in step 1601, if an event occurs, a processor 120 (e.g., the sensor control unit 121) of the electronic device 100 may identify whether the event is an event related to a request of fingerprint authentication. If the event is not an event related to a request of fingerprint authentication, in step 1603, the processor 120 may execute a function related to the event occurring similarly to step 1503 in FIG. 15A described above.

If an event related to a request of fingerprint authentication occurs, in step 1605 in FIG. 16, the processor 120 (e.g., the sensor control unit 121) may adjust the sensitivity of the touch sensor. For example, the processor 120 may increase the sensitivity of the whole touch sensor or increase the touch sensor of the fingerprint authentication area such that the touch sensor of the fingerprint authentication area is greater than that of the peripheral portion of the fingerprint authentication area. The fingerprint authentication area is an area in which the fingerprint sensor 180 is disposed, and the location information of the fingerprint authentication area may be written in the memory 130. The processor 120 may refer to location information of the fingerprint authentication area written in the memory 130 to process the touch sensitivity of the corresponding area differently from the peripheral area. Prior to adjustment of the touch sensitivity, the processor 120 (e.g., the display control unit 123) may output guide information to guide a fingerprint authentication area on the display 160.

In step 1607, the processor 120 (e.g., the display control unit 121) may identify whether a hovering signal is collected. For example, the processor 120 may identify whether a specified hovering signal (e.g., a hovering signal based on an approach of a finger) in at least a partial area of the touch sensor or a specified hovering signal is collected in the fingerprint authentication area.

If the specified hovering signal is not detected, the processor 120 (e.g., the sensor control unit 121) may skip the steps that follow and may return to step 1615. In step 1615, if an event to indicate completion of the fingerprint verification function does not occur, the processor 120 may identify whether the request for fingerprint authentication in step 1601 is available. If the request for fingerprint authentication is available (e.g., within a preset limit time in relation to fingerprint authentication), the processor 120 (e.g., the sensor control unit 121) may maintain the touch sensitivity in the previous state. Further, the processor 120 (e.g., the sensor control unit 121) may change the sensitivity of the touch sensor such that the sensitivity of the touch sensor is more sensitive than the previous state. According to the situation, a step of inspecting the availability of the request for fingerprint authentication may be omitted.

If a specified hovering signal is collected, in step 1609, the processor 120 (e.g., the display control unit 123) may change the display state of the fingerprint authentication area again. The processor 120 may display at least one of the luminance, the color, and the form of the fingerprint authentication area different from the previous state. For example, the processor 120 may process the fingerprint authentication area such that the luminance of the fingerprint authentication area is greater than before. The processor 120 may re-perform fingerprint authentication based on image information collected based on the light produced according to the relatively high luminance.

In step 1611, the processor 120 (e.g., the sensor control unit 121) may identify whether a touch occurs in a specified area (e.g., the fingerprint authentication area). When a touch does not occur, the processor 120 may be branched to step 1607 to identify whether a specified hovering signal is collected, and may perform processing based on the identification.

If a touch occurs in the fingerprint authentication area, in step 1613, the processor 120 (e.g., the display control unit 123) may collect and process fingerprint information. The fingerprint sensor 180 may collect image information based on light, which is reflected by a touched object and received by the fingerprint sensor 180, of the light of the pixel corresponding to the fingerprint authentication area, and may deliver the collected image information to the processor 120 (e.g., the fingerprint information processing unit 125). The processor 120 (e.g., the fingerprint information processing unit 125) perform fingerprint authentication based on the received image information, similarly to the processing of fingerprint information in step 1509.

In step 1615, the processor 120 may identify whether an event related to completion of the fingerprint authentication function occurs. If an event related to completion of the fingerprint authentication function occurs, the processor 120 may perform processing such that the state of the fingerprint authentication area returns to the state before execution of the function or is branched to a specified state (e.g., a standby screen display state). In step 1615, the processor 120 (e.g., the sensor control unit 121) may deactivate the activated fingerprint sensor 180. Further, the processor 120 (e.g., the display control unit 123) may restore the fingerprint authentication area having a specified display state to a previous state. In step 1615, if an event related to completion of the fingerprint authentication function does not occur, for example, if the fingerprint authentication fails, the processor 120 may be branched to an operation before step 1601 to re-perform the steps that follow. Further, if a touch is maintained in step 1611, the processor 120 may be branched to step 1613 to re-perform collection and processing of fingerprint information. Further, the processor 120 may be branched to step 1609 to change the display state of the fingerprint authentication area differently from the previous state, and may re-perform the steps that follow.

Figure 17:
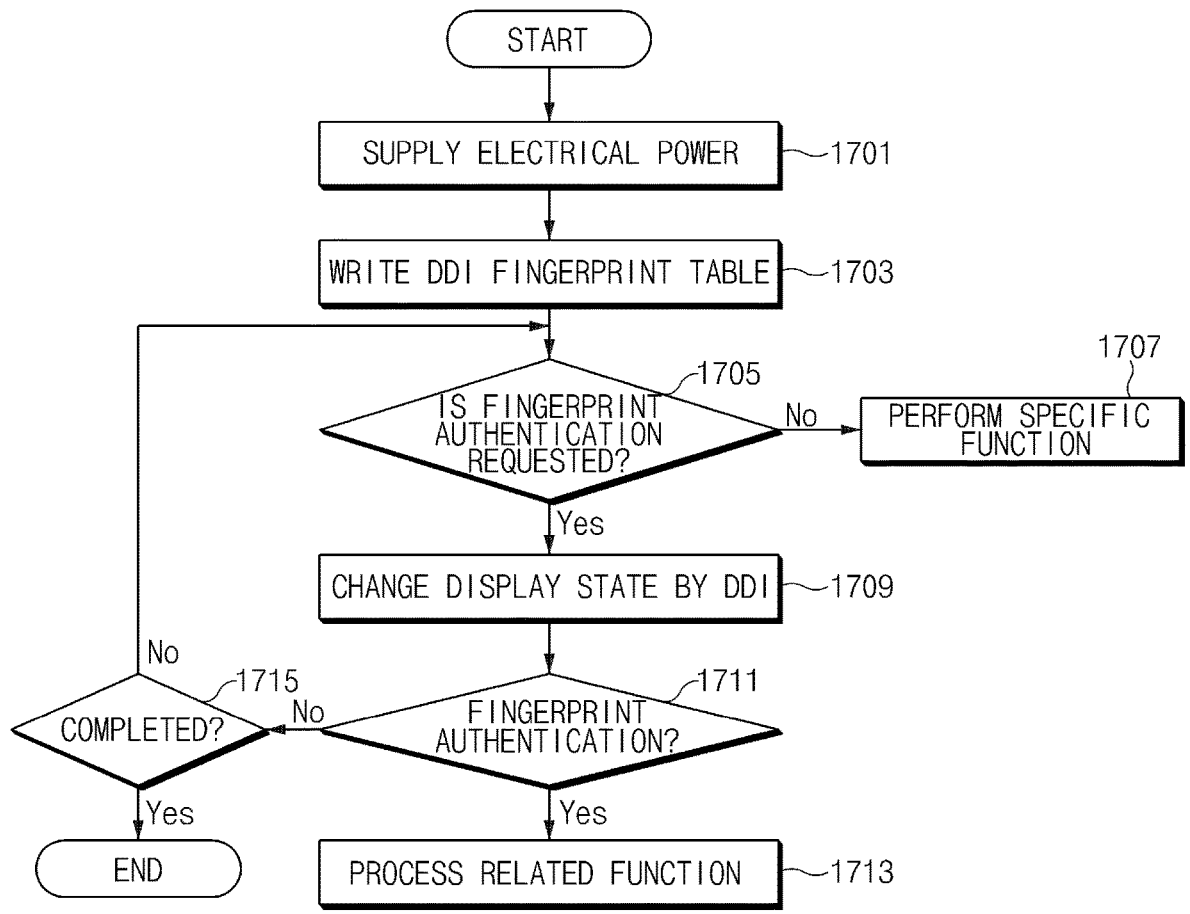
FIG. 17 is a flowchart of a fingerprint operating method using a display driver integrated-circuit (DDI) according to an embodiment of the present disclosure.

FIG. 17 is a flowchart of a fingerprint operating method using a DDI according to an embodiment of the present disclosure.

Referring to FIG. 17, in relation to a fingerprint operating method, in step 1701, the processor 120 of the electronic device 100 may receive electrical power. For example, a user input (e.g., a physical button input) is made while electric power is turned off, the electronic device 100 may be booted by using electrical power stored in a battery. After booting is completed or as in step 1703 during the booting, the processor 120 (e.g., the display control unit 123) may perform writing of a DDI fingerprint table. For example, the processor 120 may write a DDI fingerprint table stored in the memory 130 (e.g., an embedded multimedia card eMMC or a universal flash storage (UFS) device) in a DDI RAM.

In step 1705, the processor 120 (e.g., the sensor control unit 121, the display control unit 123, or the fingerprint information processing unit 125) may identify whether the fingerprint authentication function is executed. If there is no request for execution of a fingerprint authentication function, the processor 120 may perform a specified function based on occurrence of an event in step 1707. In this case, the processor 120 may execute at least one application related to a fingerprint authentication function in correspondence to a user input or according to an event of specified scheduling information.

If execution of the fingerprint authentication function is requested, the processor 120 (e.g., the sensor control unit 121) may activate the fingerprint sensor 180 and the touch sensor. In step 1709, the processor 120 (e.g., the display control unit 123) may control a change of the display state by the DDI. For example, if a touch event at a specified location (e.g., the fingerprint authentication area) is collected, the processor 120 may deliver a change request signal (or the corresponding touch event) to request a change of the display state to the DDI 169 in correspondence to the collected touch event. The DDI 169 may output fingerprint guide information stored in a RAM on the display 160, in correspondence to reception of the received change request signal (or the touch event). Further, the DDI 160 may fingerprint guide information having a specified luminance (e.g., 300 nit to 1000 nit, for example, 600 nit or 1000 nit) and a specified color (e.g., a color corresponding to at least one of red light of 650 to 780 nm, green light of 490 to 570 nm, NIR of 780 to 1100 nm) stored in a RAM on the display 160.

In step 1711, the processor 120 (e.g., the fingerprint information processing unit 125) may collect fingerprint information in correspondence to a user touch, and may identify whether the collected fingerprint information is authenticated. If the fingerprint authentication is normally performed, in step 1713, the processor 120 (e.g., the fingerprint information processing unit 125) may process a function related to the fingerprint authentication.

If the fingerprint authentication fails, in step 1715, the processor 120 may identify whether an event related to completion of the fingerprint authentication function occurs. If an event related to completion of a fingerprint authentication function occurs, the processor 120 may complete the fingerprint authentication function. If an event related to the completion of the fingerprint authentication function does not occur, the processor 120 may return to the steps before step 1709 to re-perform the steps that follow. In the step, the DDI 169 may receive a change request signal from the processor 120 (e.g., the display control unit 123) in response to a failure of authentication of a fingerprint, and may process the fingerprint recognition area such that the fingerprint recognition area may be displayed in a display state (e.g., a luminance of 600 nit and the same color or a color corresponding to green light of 490 to 570 nm or NIR of a wavelength of 780 to 1100 nm) that is different from the previous display state (e.g., a luminance of 400 nit and a color of a wavelength of 650 to 780 nm) based on the received change request signal. Further, if a specified fingerprint processing time (e.g., 1 to 10 seconds, for example, 3 seconds) elapses, the DDI 169 may automatically change the display state of the fingerprint authentication area.

As described above, according to the fingerprint operating method of an embodiment of the present disclosure, the display state of the fingerprint authentication area may be changed more promptly by processing the set values, by which the display state of the fingerprint authentication area may be controlled, directly by the DDI.

According to various embodiments of the present disclosure, the fingerprint operating method of the present disclosure may include an operation of receiving a request for fingerprint authentication, an operation of outputting a guide UI adapted to guide a contact of a finger to a fingerprint authentication area of a display corresponding to a location in which a fingerprint sensor is disposed, an operation of collecting a specified event in the fingerprint authentication area, by the fingerprint sensor, an operation of delivering the specified event to a DDI (e.g., the DDI) adapted to output the guide UI, by the fingerprint sensor, and an operation of changing a display state of the fingerprint authentication area such that the fingerprint authentication area has a specified luminance and a specified color in response to the specified event, by the DDI.

According to various embodiments of the present disclosure, a method for operating an electronic device may include receiving a request to authenticate a fingerprint, outputting a user interface (UI) via a display in response to the request, the user interface to guide an approach of an object to a fingerprint recognition area formed in at least one portion of the display and adjusting at least one display attribute to be used the fingerprint recognition area based at least in part on an occurrence of a specified event with respect to the approach of the object.

According to various embodiments of the present disclosure, adjusting the at least one display attribute comprises radiating, using at least one pixel of the display corresponding to the fingerprint recognition area, a light having a specified luminance or a specified color to be used to acquire image information corresponding to the object.

Figure 18:
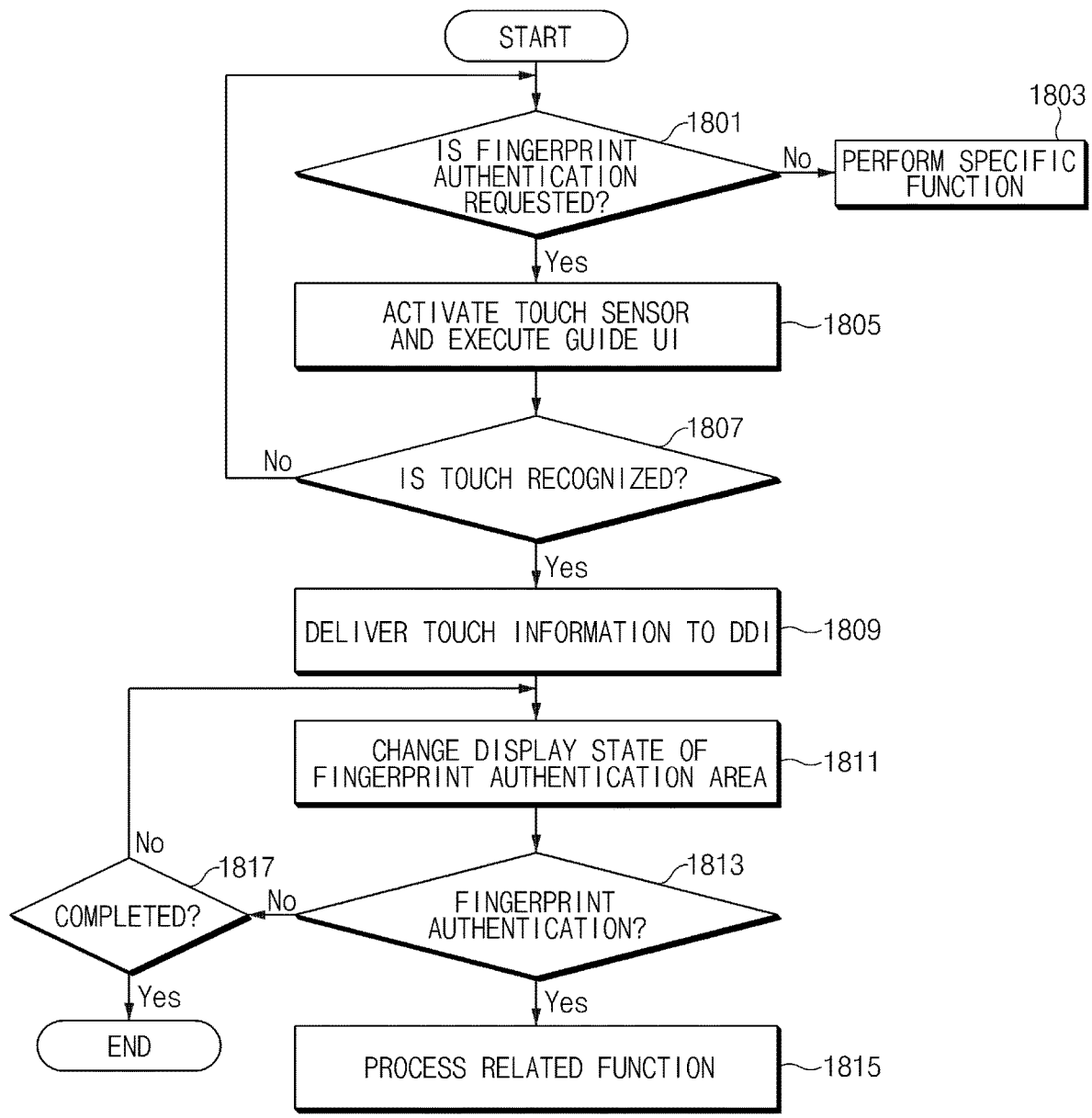
FIG. 18 is a flowchart of a fingerprint operating method of changing a display state value by using a DDI according to an embodiment of the present disclosure.

FIG. 18 is a flowchart of a fingerprint operating method of changing a display state value by using a DDI according to an embodiment of the present disclosure.

Referring to FIG. 18, in relation to the fingerprint operating method, as in step 1601 in FIG. 16 described above, in step 1801 in FIG. 18, the processor 120 may identify whether an event related to a request for fingerprint authentication occurs. If an event to request fingerprint authentication does not occur, as in step 1603 in FIG. 16, in step 1803 in FIG. 18, the processor 120 may execute a specified function.

In step 1805, if a fingerprint authentication request event occurs, the processor 120 (e.g., the sensor control unit 121) may activate the touch sensor. The processor 120 (e.g., the display control unit 123) may output a guide UI related to display of the fingerprint authentication area.

In step 1807, the processor 120 (e.g., the sensor control unit 121) may identify whether a touch is recognized. For example, the processor 120 may identify whether a touch input is made in a fingerprint authentication area. If a touch input is not made, the processor 120 may be branched to a step before step 1801 to identify whether a request for fingerprint authentication is available, and if the request for fingerprint authentication is available, may perform step 1807 while maintaining an activated state of the touch sensor.

If an available touch input is made in the fingerprint authentication area, in step 1809, the processor 120 (e.g., the sensor control unit 121) may perform a control such that the touch information collected by the touch sensor may be delivered to the DDI. In this case, the touch sensor and the DDI may have signal lines, through which the touch information may be transmitted and received. In step 1809, the processor 120 (e.g., the sensor control unit 121) may activate the fingerprint sensor 180.

In step 1811, the DDI 169 may change the display state of the fingerprint authentication area in correspondence to the touch information delivered by the touch sensor. For example, the DDI 169 may radiate light with reference to values set in the DDI fingerprint table such that the fingerprint authentication area has a first luminance, a first color, and a first form.

In step 1813, the processor 120 (e.g., the fingerprint information processing unit 125) may perform fingerprint authentication and may identify whether the collected fingerprint information is available. If the collected fingerprint information is available, in step 1815, the processor 120 (e.g., the fingerprint information processing unit 125) may process a function related to the fingerprint authentication. If the fingerprint authentication fails, in step 1817, the processor 120 may identify whether the function is completed. If an event related to completion of the function does not occur, in step 1811, the processor 120 (e.g., the display control unit 123) may request a change of the display state of the fingerprint authentication area from the DDI 169.

As described above, according to the fingerprint operating method of an embodiment of the present disclosure, touch information may be directly delivered to the DDI to control the display state of the fingerprint authentication area without the control of the processor 120. Accordingly, the display state of the fingerprint authentication area may be changed more promptly.

Figure 19:
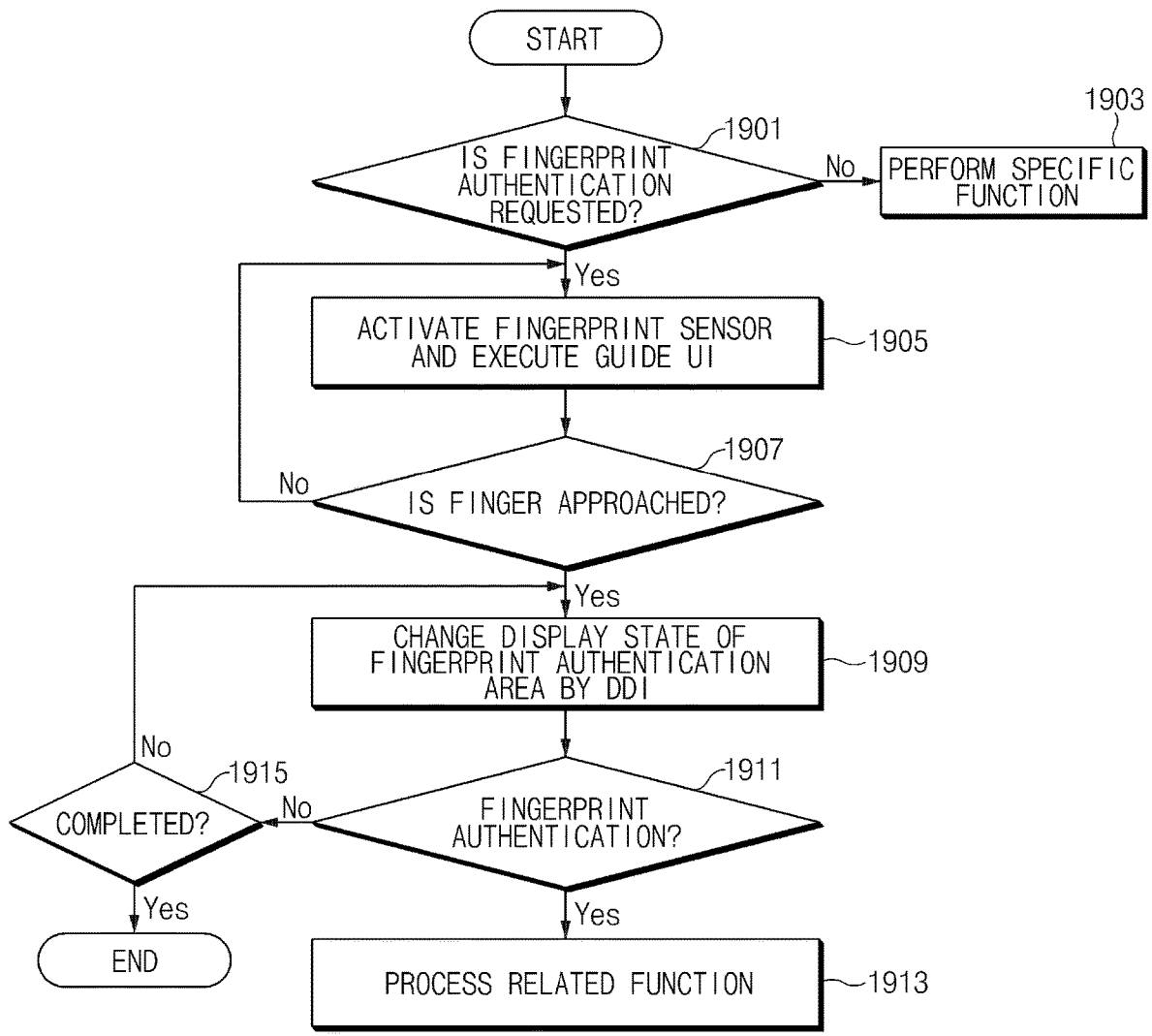
FIG. 19 is a flowchart of a fingerprint operating method of changing a display state value by using a fingerprint sensor according to an embodiment of the present disclosure.

FIG. 19 is a flowchart of a fingerprint operating method of changing a display state value by using a fingerprint sensor according to an embodiment of the present disclosure.

Referring to FIG. 19, and prior to a description of the example, step 1901 and step 1903 may be the same as or similar to step 1801 and step 1803 in FIG. 18 described above. In step 1905 in FIG. 19, if a fingerprint authentication request event occurs, the processor 120 (e.g., the sensor control unit 121) may activate the fingerprint sensor 180 and process a guide UI output.

In step 1907, the processor 120 may identify whether the fingerprint sensor 180 receives a signal on an approach of a finger. In this regard, the activated fingerprint sensor 180 may collect light at a specified cycle or in real time, and produce image information based on the collected light to deliver the produced image information to the processor 120. Further, the fingerprint sensor 180 may analyze the produced image information and determine whether the produced image information corresponds to an approach of a finger. In relation to performance of the above-described operation, the processor 120 may perform a control such that the pixels disposed in the specified display area (e.g., the fingerprint authentication area) radiate light of a specified luminance and a specified color. The light radiated by the pixels may be condensed by the light receiving unit of the fingerprint sensor 180. Further, the fingerprint sensor 180 may emit light by using the light emitting unit and may collect light by using the light receiving unit.

If image information corresponding to an approach of a finger is not collected, the processor 120 may be branched to an operation before step 1905 and may re-perform the steps that follow. In this regard, the processor 120 may identify an approach of a finger while maintaining the activated fingerprint sensor. The processor 120 may identify an approach of a finger for a specified time period, and if the specified time period (e.g., 1 to 10 seconds, for example, 3 seconds or 5 seconds) elapses, may determine whether an availability of the fingerprint authentication is completed.

If an image information corresponding to an approach of a finger is acquired, in step 1909, the processor 120 (e.g., the display control unit 123) may process a change of the display state of the fingerprint authentication area by the DDI 169. The fingerprint sensor 180 may deliver a result based on the analysis of image information (information determined to be an approach of a finger) to the DDI 169, and the DDI 169 may process the fingerprint authentication area such that the fingerprint authentication area is in a specified display state based on information of the received fingerprint sensor 180.

In step 1911, the processor 120 may identify whether the fingerprint authentication succeeds. If the fingerprint authentication succeeds, in step 1913, the processor 120 may process a function related to the fingerprint authentication. If the fingerprint authentication fails, in step 1915, the processor 120 may identify whether the fingerprint authentication function is completed, and if not completed, may be branched to an operation before step 1905 to re-perform the steps that follow.

According to various embodiments of the present disclosure, a method for operating an electronic device may include an operation of receiving a request for fingerprint authentication, an operation of outputting a guide UI adapted to guide a contact of a finger to a display area corresponding to a location in which a fingerprint sensor is disposed, and an operation of, if a specified event related to a fingerprint authentication area in which the guide UI is output occurs, outputting a display state of the fingerprint authentication area with a specified luminance and a specified color, by the guide UI.

According to various embodiments of the present disclosure, the method may further include, if a specified hovering signal is received from the fingerprint authentication area, outputting a color of a specified wavelength (e.g., at least one of a wavelength of red light of 650 to 780 nm, a wavelength of green light of 490 to 570 nm, or a wavelength of NIR of 780 to 1100 nm) of a specified.

According to various embodiments of the present disclosure, the method may further include an operation of comparing image information acquired by the fingerprint sensor and stored fingerprint information, and an operation of, when the fingerprint authentication fails or acquisition of image information having a minimum quality of a specified value fails, outputting the display state of the display area, in which the object in contact is disposed, differently from the previous state.

According to various embodiments of the present disclosure, the method may further include an operation of a guide UI to guide disposition of a user finger in the fingerprint authentication area of the display corresponding to an area in which the fingerprint sensor is disposed, based on the request for the fingerprint authentication.

According to various embodiments of the present disclosure, the method may further include an operation of processing the touch sensitivity of the fingerprint authentication area differently from a peripheral portion.

According to various embodiments of the present disclosure, the method may further include, if a specified hovering signal is received from the fingerprint authentication area, outputting a color f a specified wavelength (e.g., at least one of a wavelength of red light of 650 to 780 nm, a wavelength of green light of 490 to 570 nm, or a wavelength of NIR of 780 to 1100 nm) of a specified luminance (e.g., one of 300 nit to 1000 nit).

According to various embodiments of the present disclosure, the method may further include, if a specified touch signal is received from the fingerprint authentication area, outputting a color f a specified wavelength (e.g., at least one of a wavelength of red light of 650 to 780 nm, a wavelength of green light of 490 to 570 nm, or a wavelength of NIR of 780 to 1100 nm) of a specified luminance.

According to various embodiments of the present disclosure, the method may further include, recognizing approach of a finger based on the image information acquired by the fingerprint sensor, and if the approach of the finger is recognized, outputting the area in which the finger is recognized, in a color of a specified wavelength band (e.g., 490 nm to 570 nm, 650 nm to 780 nm, 780 nm to 1100 nm, or 500 nm to 800 nm).

According to various embodiments of the present disclosure, the method may further include an operation of increasing the luminance of an area of the display, which an object contacts, by a specified value.

According to various embodiments of the present disclosure, a method for operating an electronic device according to an embodiment may include an operation of receiving a request for fingerprint authentication, an operation of outputting a guide UI adapted to guide a contact of a finger to a display area corresponding to a location in which a fingerprint sensor is disposed, and an operation of, if a specified event related to a fingerprint authentication area in which the guide UI is output occurs, outputting a display state of the fingerprint authentication area with a specified luminance and a specified color, by the guide UI.

Figure 20:
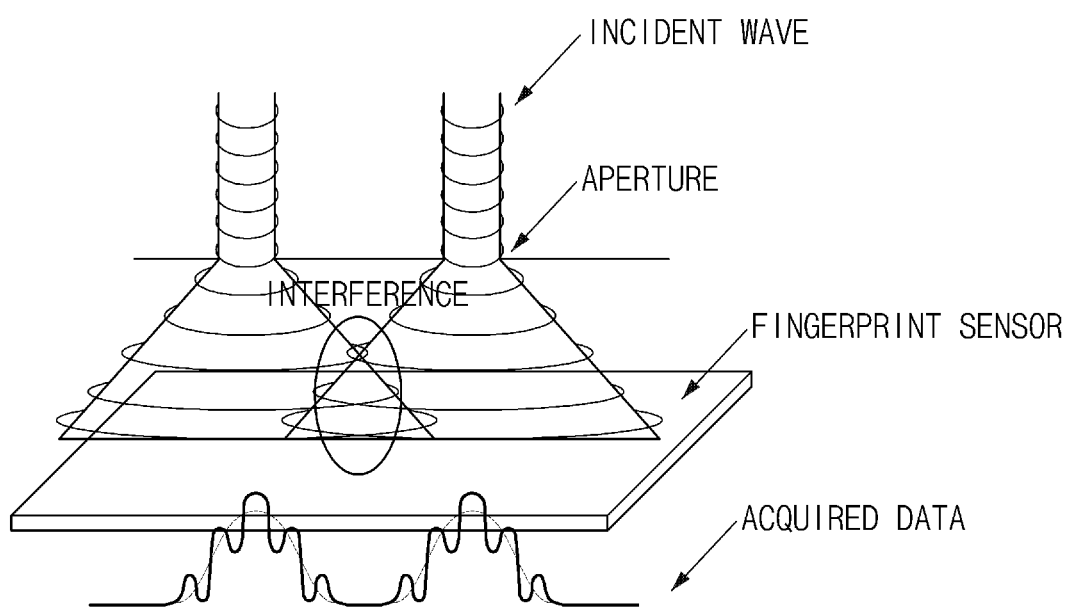
FIG. 20 is a view of a condensing light waveform according to an embodiment of the present disclosure.

FIG. 20 is a view of a condensing light waveform according to an embodiment of the present disclosure.

Figure 21A:
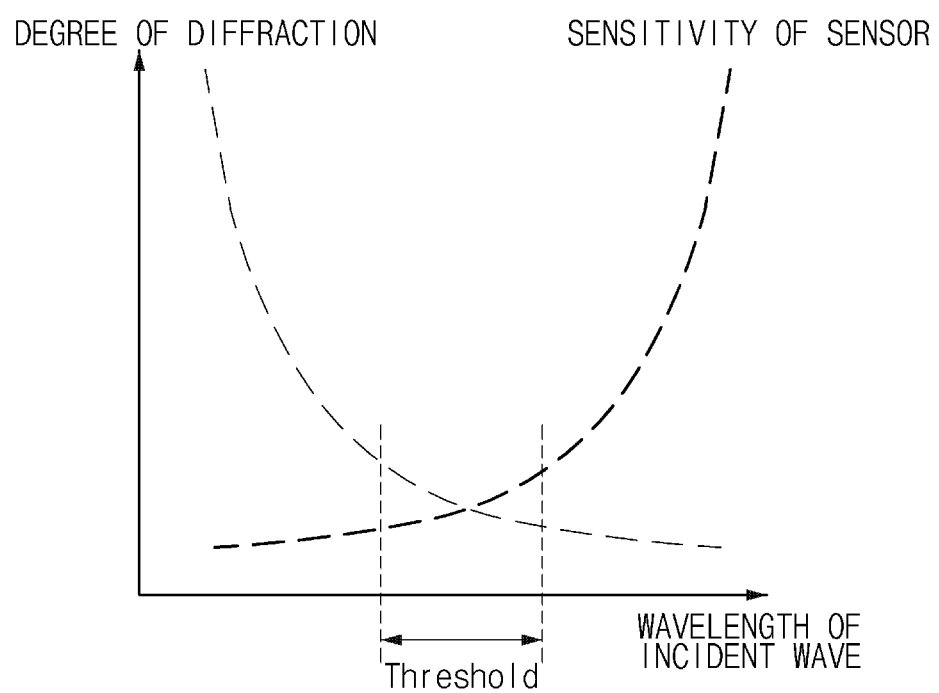
FIG. 21A is a chart of a display state value changing range according to an embodiment of the present disclosure.

FIG. 21A is a chart of a display state value changing range according to an embodiment of the present disclosure.

Figure 21B:
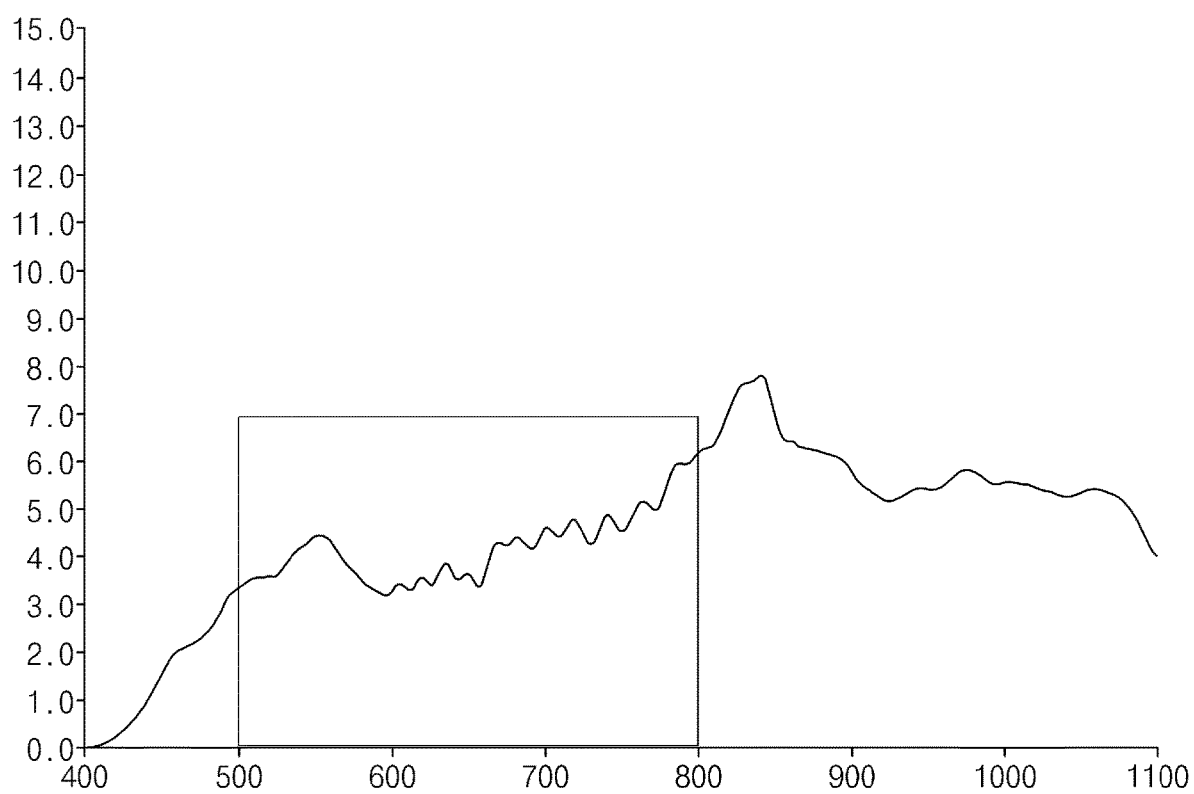
FIG. 21B is a chart indicating a specified range of wavelength bands according to an embodiment of the present disclosure.

FIG. 21B is a chart indicating a specified range of wavelength bands according to an embodiment of the present disclosure.

Referring to FIGS. 20 to 21B, the quality of the fingerprint image collected by the fingerprint sensor may be influenced by the diffraction and optical energy of the light input to the fingerprint sensor. The light reflected by the fingerprint of the user in contact with the display 160 may diffract incident light when the incident light is provided to the fingerprint sensor while passing through apertures of the wiring lines and the pixels of the display 160. Accordingly, the incident light that passed the apertures may mutually generate constructive interferences/destructive interferences.

Then, if a diffraction degree is θ, a relationship of Equation (1) for θ may be established as follows.

$$\sin\Theta = \frac{\text{Wavelength of incident light}}{\text{Area of aperture}} \quad (1)$$

Accordingly, when the apertures (e.g., transparent areas of the display 160) of the electronic device 100 are constant, diffractions become severe and constructive interferences/destructive interferences become severe if the wavelength of the incident wave is longer, and thus the acquired image quality may deteriorate.

Due to the property of a photodiode, the sensitivity of the fingerprint sensor is determined by energy of incident light, that is, optical power as illustrated in FIG. 21A, and accordingly, may be related to the wavelength of the incident wave as in Equations (2) to (4) as follows.

$$\text{Number of electrons generated by incident wave} = \quad (2)$$
$$\text{Efficiency} \times \frac{\text{Optical power} \times \text{Wavelength of incident wave}}{\text{Plank constant} \times \text{Speed of light}}$$

$$\text{Current} = \quad (3)$$
$$e \times \text{Efficiency} \times \frac{\text{Optical power} \times \text{Wavelength of incident wave}}{\text{Plank constant} \times \text{Speed of light}}$$

$$\text{Sensitivity of photodiode} = \frac{\text{Current}}{\text{Optical power}} \text{ or}$$

$$\text{Sensitivity of photodiode} = \text{Probability of generating electrons} \quad (4)$$
$$\text{by incident photon} \times \frac{\text{Wavelength of incident wave}}{1.24}$$

As illustrated, because an amount of generated currents increases as the wavelength of incident wave becomes longer and the sensitivity of the photodiode increases, it may be advantageous to radiate incident wave of a specified frequency band to acquire a suitable quality of the fingerprint information. Accordingly, the electronic device may improve a quality of fingerprint information as illustrated in FIG. 21B by controlling pixels disposed in the fingerprint authentication area or the light emitting unit of the fingerprint sensor such that the pixels disposed in the fingerprint authentication area or the light emitting unit of the fingerprint sensor may radiate a color of a specified wavelength (e.g., at least one of a wavelength of red light of 650 to 780 nm, a wavelength of green light of 490 to 570 nm, or a wavelength of NIR of 780 to 1100 nm) as illustrated in FIG. 21B.

Figure 22:
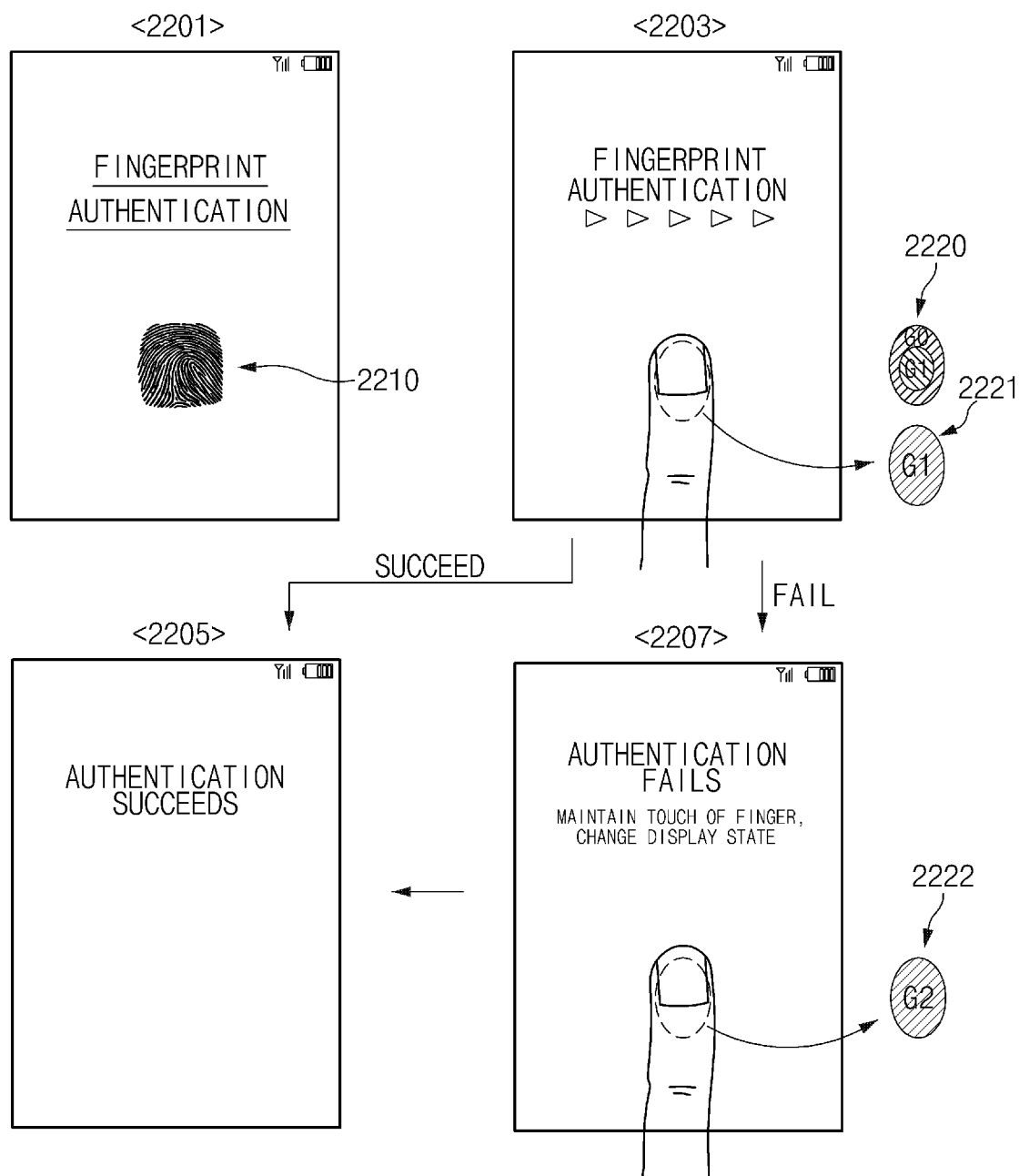
FIG. 22 is a view illustrating a screen interface related to an operation of an electronic device according to an embodiment of the present disclosure.

FIG. 22 is a view illustrating a screen interface related to an operation of an electronic device according to an embodiment of the present disclosure.

Referring to FIG. 22, the display 160 according to an embodiment of the present disclosure may output a screen related to a request for fingerprint authentication as in state 2201. For example, if an application that is necessary for a fingerprint authentication function is executed, the display 160 may output a screen to request fingerprint authentication as illustrated. The screen related to a request for fingerprint authentication, for example, may include a guide UI 2210. The guide UI 2210, for example, may be displayed in a specified fingerprint authentication area of the display 160. The specified fingerprint authentication area may correspond to a location at which a specified finger may be located in consideration of a gripped state of the electronic device 100. The guide UI 2210, for example, may include a circular periphery, and may include a specified image (e.g., a virtual default fingerprint image) inside the circular periphery. The shape and image contents of the guide UI 2210 may be changed according to settings.

While the guide UI 2210 is output on the display 160, the processor 120 of the electronic device 100 may selectively adjust the sensitivity of the touch sensor. For example, the processor 120 may adjust the touch sensitivity (e.g., 5 or less when the entire value of the sensitivity is defined as 10) of an area including a fingerprint authentication area output by the guide UI 2210 to have a higher sensitivity than the previous state (e.g., not less than 6). When an object approaches, the touch area is adjusted to have a higher sensitivity than the previous state, the touch sensor may acquire a hovering event or the like earlier than the peripheral area. If the guide UI 2210 is output, the processor 120 may determine an approach of a finger by using the fingerprint sensor 180 disposed under the fingerprint authentication area. The approach of the finger may include various gesture motions. For example, the gesture motion may include a short touch, a long press, a double tap, and a force touch motion. The short touch motion may include an operation of touching a touch object (e.g., a finger) in a touch area within 150 ms. The long press motion may include an operation of touching a touch object in a touch area within 500 ms. The double tab motion may include an operation of touching a touch object twice in a touch area within 500 ms. The force touch motion may include an operation of touching a touch area with a pressure of a specified value.

When a finger approaches the fingerprint sensor 180, as in state 2203, the processor 120 may display the fingerprint authentication area in a first display state 2221. The first display state 2221, for example, may include a state in which the fingerprint authentication area has a first luminance (e.g., not less than 600 nit) and a color of green series. Further, the processor 120 may display the fingerprint authentication area in a second display state 2220 according to settings. The second display state 2220, for example, may divide the fingerprint authentication area to two areas, and may include a state in which different areas have different colors or different luminance. The second display state 2220 may include a state in which the luminance of the central portion is greater than that of the peripheral portion.

In state 2203, if a finger contact occurs (e.g., a touch is recognized), the processor 120 may perform fingerprint authentication based on image information acquired by the fingerprint sensor 180. If the fingerprint authentication succeeds, as in state 2205, the processor 120 may output a message related to the success of authentication on the display 160. Further, the processor 120 may execute an application function (e.g., release of a locked screen, or approval of a payment) based on the success of authentication, and may output a screen corresponding to the application function on the display 160.

If the fingerprint authentication fails (or acquisition of image information of a specified resolution or a quality or higher) in state 2203, as in state 2207, the processor 120 may output a message corresponding to the failure of fingerprint authentication (or a message indicating that acquisition of image information of a specified resolution fails). Further, the processor 120 may output information to guide in repeating fingerprint authentication. The processor 120 may display the display state of the fingerprint authentication area in a third display state 2222 that is different from the previous state. For example, the third display state 2222 may include a display state in which at least one of a luminance or a color of the first display state 2221 is different. Further, the third display state 2222 may include a state in which a color (e.g., green series) having a luminance that is greater than the luminance of the first display state 2221 is output. The processor 120 may perform a control such that image information is acquired by using the fingerprint sensor 180 if the fingerprint authentication area is in the third display state 2222, and may re-perform fingerprint authentication for the acquired fingerprint information. The processor 120 may repeat the fingerprint authentication operation a specified number of times.

Figure 23:
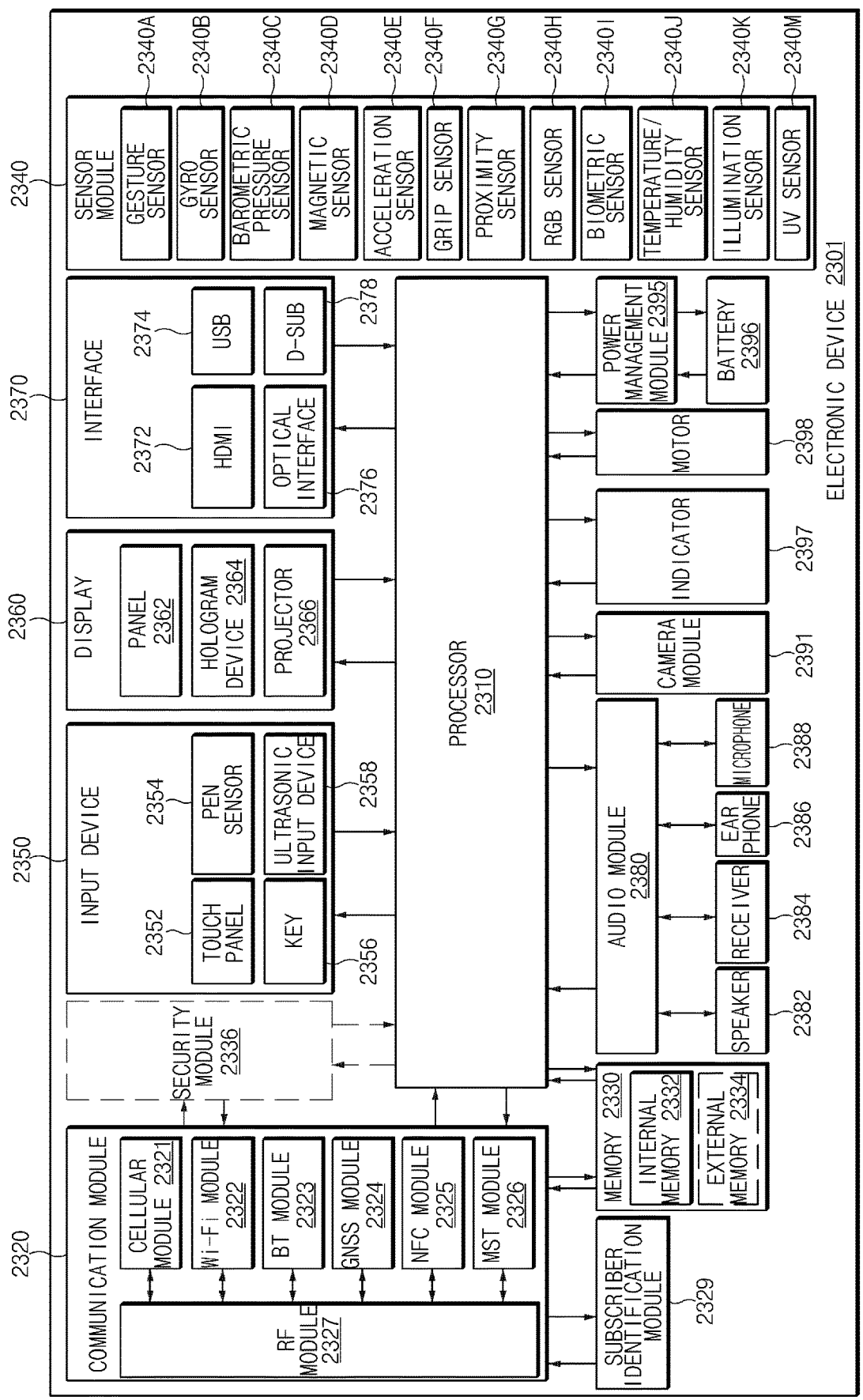
FIG. 23 is a block diagram of an electronic device according to an embodiment of the present disclosure.

FIG. 23 is a block diagram of an electronic device 2301 according to an embodiment of the present disclosure.

Referring to FIG. 23, the electronic device 2301 may include, for example, all or part of an electronic device 100 shown in FIGS. 1 and 13 described above. The electronic device 2301 in FIG. 23 may include one or more processors 2310 (e.g., application processors (APs)), a communication module 2320, a subscriber identification module (SIM) 2329, a memory 2330, a security module 2336, a sensor module 2340, an input device 2350, a display 2360, an interface 2370, an audio module 2380, a camera module 2391, a power management module 2395, a battery 2396, an indicator 2397, and a motor 2398.

The processor 2310 may operate or drive, for example, an OS or an application program to control a plurality of hardware or software components connected thereto and may process and compute a variety of data. The processor 2310 may be implemented with, for example, a system on chip (SoC). The processor 2310 may include a graphics processing unit (GPU) and/or an image signal processor. The processor 2310 may include at least some (e.g., a cellular module 2321) of the components shown in FIG. 23. The processor 2310 may load a command or data received from at least one of other components (e.g., a non-volatile memory) into a volatile memory to process the data and may store various data in a non-volatile memory.

The communication module 2320 may have the same or similar configuration to a communication interface 170 of FIG. 13 described above. The communication module 2320 in FIG. 23 may include, for example, the cellular module 2321, a Wi-Fi module 2322, a BT module 2323, a global navigation satellite system (GNSS) module 2324 (e.g., a GPS module, a Glonass module, a Beidou module, or a Galileo module), an NFC module 2325, an MST module 2326, and a radio frequency (RF) module 2327.

The cellular module 2321 may provide, for example, a voice call service, a video call service, a text message service, or an Internet service, and the like through a communication network. The cellular module 2321 may identify and authenticate the electronic device 2301 in a communication network using the SIM 2329 (e.g., a SIM card). The cellular module 2321 may perform at least part of functions which may be provided by the processor 2310. The cellular module 2321 may include a CP.

The Wi-Fi module 2322, the BT module 2323, the GNSS module 2324, the NFC module 2325, and the MST module 2326 may include, for example, a processor for processing data transmitted and received through the corresponding module. At least some (e.g., two or more) of the cellular module 2321, the Wi-Fi module 2322, the BT module 2323, the GNSS module 2324, the NFC module 2325, and the MST module 2326 may be included in one IC or one IC package.

The RF module 2327 may transmit and receive, for example, a communication signal (e.g., an RF signal). The RF module 2327 may include, for example, a transceiver, a power amplifier module (PAM), a frequency filter, a low noise amplifier (LNA), an antenna, and the like. At least one of the cellular module 2321, the Wi-Fi module 2322, the BT module 2323, the GNSS module 2324, the NFC module 2325, and the MST module 2326 may transmit and receive an RF signal through a separate RF module.

The SIM 2329 may include, for example, a card which includes a SIM and/or an embedded SIM. The SIM 2329 may include unique identification information (e.g., an integrated circuit card identifier (ICCID)) or subscriber information (e.g., an international mobile subscriber identity (IMSI)).

The memory 2330 (e.g., a memory 130 of FIG. 13 described above) may include, for example, an embedded memory 2332 or an external memory 2334. The embedded memory 2332 may include at least one of, for example, a volatile memory (e.g., a DRAM, a static RAM (SRAM), a synchronous DRAM (SDRAM), and the like), or a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, and the like), a hard drive, or a solid state drive (SSD)).

The external memory 2334 may include a flash drive, for example, a compact flash (CF) drive, a secure digital (SD) card, a micro-SD card, a mini-SD card, an extreme digital (xD) card, a multimedia card (MMC), a memory stick, and the like. The external memory 2334 may operatively and/or physically connect with the electronic device 2301 through various interfaces.

The security module 2336 may be a module which has a relatively higher secure level than the memory 2330 and may be a circuit which stores secure data and guarantees a protected execution environment. The security module 2336 may be implemented with a separate circuit and may include a separate processor. The security module 2336 may include, for example, an embedded secure element (eSE) which is present in a removable smart chip, a removable SD card, or is embedded in a fixed IC or chip of the electronic device 2301. In addition, the security module 2336 may be driven by an OS different from the OS of the electronic device 2301. For example, the security module 2336 may operate based on a java card open platform (JCOP) OS.

The sensor module 2340 may measure, for example, a physical quantity, may detect an operational state of the electronic device 2301, and may convert the measured or detected information to an electrical signal. The sensor module 2340 may include at least one of, for example, a gesture sensor 2340A, a gyro sensor 2340B, a barometric pressure sensor 2340C, a magnetic sensor 2340D, an acceleration sensor 2340E, a grip sensor 2340F, a proximity sensor 2340G, a color sensor 2340H (e.g., a red, green, blue (RGB) sensor), a biometric sensor 2340I, a temperature/humidity sensor 2340J, an illumination sensor 2340K, or an ultraviolet (UV) light sensor 2340M. Additionally or alternatively, the sensor module 2340 may further include, for example, an electronic nose (e-nose) sensor, an electromyography (EMG) sensor, an electroencephalogram (EEG) sensor, an electrocardiogram (ECG) sensor, an infrared (IR) sensor, an iris sensor, and/or a fingerprint sensor, and the like. The sensor module 2340 may further include a control circuit for controlling at least one or more sensors included therein. The electronic device 2301 may further include a processor adapted to control the sensor module 2340, as part of the processor 2310 or to be independent of the processor 2310. While the processor 2310 is in a sleep state, the electronic device 2301 may control the sensor module 2340.

The input device 2350 may include, for example, a touch panel 2352, a (digital) pen sensor 2354, a key 2356, or an ultrasonic input device 2358. The touch panel 2352 may use at least one of, for example, a capacitive type touch panel, a resistive type touch panel, an infrared type touch panel, or an ultrasonic type touch panel. In addition, the touch panel 2352 may further include a control circuit. The touch panel 2352 may further include a tactile layer and may provide a tactile reaction to a user.

The (digital) pen sensor 2354 may be, for example, part of the touch panel 2352 or may include a separate sheet for recognition. The key 2356 may include, for example, a physical button, an optical key, or a keypad. The ultrasonic input device 2358 may allow the electronic device 2301 to detect a sound wave using a microphone 2388 and to verify data through an input tool generating an ultrasonic signal.

The display 2360 (e.g., a display 160 of FIG. 13 described above) may include a panel 2362, a hologram device 2364, or a projector 2366. The panel 2362 may include the same or similar configuration as the display 160. The panel 2362 may be implemented to be, for example, flexible, transparent, or wearable. The panel 2362 and the touch panel 2352 may be integrated into one module. The hologram device 2364 may provide a stereoscopic image in the air using the interference of light. The projector 2366 may project light onto a screen to display an image. The screen may be positioned, for example, inside or outside of the electronic device 2301. The display 2360 may further include a control circuit for controlling the panel 2362, the hologram device 2364, or the projector 2366.

The interface 2370 may include, for example, an HDMI 2372, a USB 2374, an optical interface 2376, or a D-sub-miniature (D-sub) connector 2378. The interface 2370 may be included in, for example, a communication interface 170 in FIG. 1 or 2. Additionally or alternatively, the interface 2370 may include, for example, a mobile high definition link (MHL) interface, an SD card/MMC interface, or an Infrared Data Association (IrDA) interface standard.

The audio module 2380 may convert a sound and an electrical signal in dual directions. At least part of components of the audio module 2380 may be included in, for example, an input and output interface 150 (or a user interface) in FIG. 13 described above. The audio module 2380 may process sound information input or output through, for example, a speaker 2382, a receiver 2384, an earphone 2386, the microphone 2388, and the like.

The camera module 2391 may be a device which captures a still image and a moving image. The camera module 2391 may include one or more image sensors (e.g., a front sensor or a rear sensor), a lens, an image signal processor (ISP), or a flash (e.g., an LED or a xenon lamp).

The power management module 2395 may manage, for example, power of the electronic device 2301. The power management module 2395 may include a power management integrated circuit (PMIC), a charger IC or a battery gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 2396 and voltage, current, or temperature thereof while the battery 2396 is charged. The battery 2396 may include, for example, a rechargeable battery or a solar battery.

The indicator 2397 may display a specified state of the electronic device 2301 or part (e.g., the processor 2310) thereof, for example, a booting state, a message state, or a charging state, and the like. The motor 2398 may convert an electrical signal into a mechanical vibration, generate a vibration or a haptic effect, and the like. The electronic device 2301 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a mediaFlo™ standard, and the like.

Each of the above-mentioned elements of the electronic device according to various embodiments of the present disclosure may be adapted with one or more components, and names of the corresponding elements may be changed according to the type of the electronic device. The electronic device may include at least one of the above-mentioned elements, where some elements may be omitted from the electronic device, or other additional elements may be further included in the electronic device. In addition, some of the elements of the electronic device may be combined with each other to form one entity, thereby making it possible to perform the functions of the corresponding elements in the same manner as before the combination.

The term "module" used in the present disclosure may include a unit adapted in hardware, software, or firmware, and for example, may be used interchangeably with terms such as "logic," "a logic block," "a component," and "a circuit." The term "module" may indicate an integral component, a minimum unit, or a part which performs one or more functions. The term "module" may indicate a device that may be implemented mechanically or electronically, and for example, may include an application-specific integrated circuit (ASIC), field-programmable gate arrays (FPGSs), or a programmable logic device that is known or will be developed in the future, which performs some operations.

At least some of the devices (e.g., modules or functions) or methods (e.g., steps) according to various embodiments of the present disclosure may be implemented by an instruction stored in a non-transitory computer-readable recording medium (e.g., the memory 130), for example, in the form of a program module. If the instruction is executed by a processor, the processor may perform a function corresponding to the instruction. The non-transitory computer-readable recording medium may include a hard disk, a floppy disk, a magnetic medium (e.g., a magnetic tape), an optical recording medium (e.g., a compact disc ROM (CD-ROM) or a DVD), a magneto-optical medium (e.g., a floptical disk), and an embedded memory. The instruction may include code generated by a compiler or code that may be executed by an interpreter.

A module or program module according to various embodiments of the present disclosure may include at least one of the above-mentioned elements, omit some of them, or further include other elements. The operations performed by a module, a program module, or another element may be executed sequentially, in parallel, repeatedly, or heuristically, or at least some operations may be executed in another sequence, may be omitted, or another operation may be added.

As described above, various embodiments may provide a structure by which a finger may be easily disposed for fingerprint authentication while an electronic device is gripped.

Further, various embodiments facilitate fingerprint authentication with an intuitive and simple operation.

Further, various embodiments help improve a fingerprint verification rate of a fingerprint sensor disposed on a rear surface of a display.

While the present disclosure has been shown and described with reference to various embodiments thereof, it will be understood by those skilled in the art that various changes in form and detail may be made therein without departing from the scope of the present disclosure as defined by the appended claims and their equivalents.

What is claimed is:
1. An electronic device, comprising:
    a display comprising a plurality of pixels to be used for displaying a screen;
    a rear panel, formed under the display, comprising a first hole corresponding to a portion of the plurality of pixels;
    a bracket, disposed under the rear panel to support the display, comprising a sensor accommodating area corresponding to the portion of the plurality of pixels for disposing a fingerprint sensor;
    the fingerprint sensor, disposed in the sensor accommodating area, configured to acquire image information corresponding to a fingerprint of an external object in proximity of the display based at least in part on a light radiated by at least the portion of the plurality of pixels and reflected by the external object; and
    a printed circuit board disposed under the bracket, wherein the printed circuit board is electronically connected,
        wherein the sensor accommodating area in the bracket has a second hole passing through the bracket, and the fingerprint sensor is affixed to the sensor accommodating area such that an air gap between the display and the fingerprint sensor is formed at least by a portion of the second hole.
2. The electronic device of claim 1, further comprising:
    a sealing member disposed below the rear panel and disposed above the bracket and the fingerprint sensor.
3. The electronic device of claim 1, further comprising:
    a bonding layer disposed between the rear panel and the fingerprint sensor.

4. The electronic device of claim 1, further comprising:
a bonding layer disposed between the fingerprint sensor and the bracket.

5. The electronic device of claim 1, further comprising:
a processor configured to:
   control the display to display a guide user interface on the display at a location corresponding to the first hole;
   based on the external object being placed on the guide user interface, control the display to emit the light using the plurality of pixels of the display, the emitted light to be reflected by the external object being placed on the guide user interface and received by the fingerprint sensor such that the fingerprint sensor acquires the fingerprint information from the received light and provides the fingerprint information to the processor, and
   perform a function based on the fingerprint information provided by the fingerprint sensor, wherein a display surface area of the plurality of pixels used for the emitted light is greater than a sensing surface area of the fingerprint sensor
wherein the processor is further configured to control the display to display the guide user interface over the first hole of the rear panel and the sensor accommodating area.

6. The electronic device of claim 1, further comprising:
a wavelength selecting element disposed in at least part of the first hole and configured to pass only a portion of the reflected light by the external object of having a specified wavelength band.

7. The electronic device of claim 1, further comprising:
a wavelength selecting element disposed between the display and the fingerprint sensor and configured to pass only a portion of the reflected by the external object light having a specified wavelength band.

8. The electronic device of claim 1,
wherein the processor is configured to control the display to output the light in a color having a specified wavelength band, in response to a request to authenticate the fingerprint.

9. The electronic device of claim 1, further comprising a processor configured to control the display to output the light at a specified luminance, in response to a request to authenticate the fingerprint.

10. The electronic device of claim 1, further comprising a processor configured to at least part of emitting of the light, adjust a luminance of at least part of the plurality of pixels of the display higher than another set of pixels of the display.

11. The electronic device of claim 5, further comprising a processor configured to:
   control the plurality of pixels to display a screen;
   control a part of the plurality of pixels to display a guide user interface; and
   control at least a portion of the part of the plurality of pixels to radiate light for a fingerprint recognition while the fingerprint recognition is being performed.

12. An electronic device, comprising:
a display comprising a plurality of pixels;
a rear panel comprising a protective layer disposed directly below the display and having a first hole;
a bracket disposed below the rear panel and having a second hole aligned with at least portion of the first hole;
a fingerprint sensor disposed at the second hole of the bracket to receive, through an air gap between the display and the fingerprint sensor provided by the first hole, light reflected by an object placed on the display, the fingerprint sensor being configured to acquire fingerprint information corresponding to the object from the received light;
the air gap between the rear panel and the fingerprint sensor; and
a processor configured to:
   control the display to display a guide user interface on the display at a location corresponding to the first hole;
   based on an object being placed on the guide user interface, control the display to emit light using a set of pixels of the display, the emitted light to be reflected by the object being placed on the guide user interface and received by the fingerprint sensor such that the fingerprint sensor acquires the fingerprint information from the received light and provides the fingerprint information to the processor; and
   perform a function based on the fingerprint information provided by the fingerprint sensor,
wherein a display surface area of the set of pixels used for the emitted light is greater than a sensing surface area of the fingerprint sensor.

13. The electronic device of claim 12, further comprising:
a sealing member disposed below the rear panel and disposed above the bracket and the fingerprint sensor.

14. The electronic device of claim 12, further comprising:
a bonding layer disposed between the rear panel and the fingerprint sensor.

15. The electronic device of claim 12, further comprising:
a bonding layer disposed between the fingerprint sensor and the bracket.

16. The electronic device of claim 12, further comprising:
wherein the bracket includes a sensor accommodating area in which at least one portion of the fingerprint sensor is accommodated.

17. The electronic device of claim 16,
wherein the first hole of the rear panel and the sensor accommodating area correspond to at least part of the display surface area of the set of pixels used for the emitted light, and
wherein the processor is further configured to control the display to display the guide user interface over the first hole of the rear panel and the sensor accommodating area.

18. The electronic device of claim 12, further comprising:
a wavelength selecting element disposed in at least part of the first hole and configured to pass only a portion of the reflected light of having a specified wavelength band.

19. The electronic device of claim 12, further comprising:
a wavelength selecting element disposed between the display and the fingerprint sensor and configured to pass only a portion of the reflected light having a specified wavelength band.

20. The electronic device of claim 12,
wherein the processor is configured to control the display to output the light in a color having a specified wavelength band, in response to a request to authenticate the fingerprint.

21. The electronic device of claim 12,
wherein the processor is further configured to control the display to output the light at a specified luminance, in response to a request to authenticate the fingerprint.

22. The electronic device of claim 12,
wherein the processor is configured to:
at least part of the emitting of the light, adjust a luminance of at least part of the set of pixels of the display higher another set of pixels of the display.

23. The electronic device of claim 12, wherein the processor is further configured to:
control a plurality of pixels to display a screen;
control a part of the plurality of pixels to display the guide user interface; and
control at least a portion of the part of the plurality of pixels to radiate light for a fingerprint recognition while the fingerprint recognition is being performed.

* * * * *